(12) United States Patent
Leonavicius et al.

(10) Patent No.: US 12,436,088 B2
(45) Date of Patent: Oct. 7, 2025

(54) INTEGRATED PLATFORM FOR SELECTIVE MICROFLUIDIC PARTICLE PROCESSING

(71) Applicant: Droplet Genomics, UAB, Vilnius (LT)

(72) Inventors: Karolis Leonavicius, Vilnius (LT); Dalius Kuciauskas, Vilnius (LT); Juozas Nainys, Vilnius (LT); Rytis Kisielius, Vilnius (LT); Dangiras Lukosius, Silale (LT); Jonas Gasparavicius, Vilnius (LT)

(73) Assignee: Droplet Genomics, UAB, Vilnius (LT)

( * ) Notice: Subject to any disclaimer, the term of this patent is extended or adjusted under 35 U.S.C. 154(b) by 145 days.

(21) Appl. No.: 18/250,601

(22) PCT Filed: Oct. 22, 2021

(86) PCT No.: PCT/EP2021/079435
§ 371 (c)(1),
(2) Date: Apr. 26, 2023

(87) PCT Pub. No.: WO2022/096294
PCT Pub. Date: May 12, 2022

(65) Prior Publication Data
US 2024/0068928 A1    Feb. 29, 2024

Related U.S. Application Data

(60) Provisional application No. 63/216,149, filed on Jun. 29, 2021, provisional application No. 63/109,112, filed on Nov. 3, 2020.

(51) Int. Cl.
| | | |
|---|---|---|
| *G01N 15/14* | (2024.01) | |
| *G01N 15/02* | (2024.01) | |
| *G01N 15/0205* | (2024.01) | |
| *G01N 15/1433* | (2024.01) | |
| *G01N 15/1434* | (2024.01) | |
| *G01N 15/149* | (2024.01) | |
| *G01N 21/64* | (2006.01) | |

(52) U.S. Cl.
CPC ..... *G01N 15/1459* (2013.01); *G01N 15/0205* (2013.01); *G01N 15/1433* (2024.01);
(Continued)

(58) Field of Classification Search
CPC .......... G01N 15/1459; G01N 15/0205; G01N 15/1433; G01N 15/1434; G01N 15/149;
(Continued)

(56) References Cited

U.S. PATENT DOCUMENTS

| | | |
|---|---|---|
| 6,922,279 B2 | 7/2005 | Sun et al. |
| 8,660,332 B2 | 2/2014 | Ortyn et al. |

(Continued)

FOREIGN PATENT DOCUMENTS

| | | |
|---|---|---|
| EP | 3214430 A1 | 9/2017 |
| WO | 2019217846 A1 | 11/2019 |

*Primary Examiner* — Jennifer D Bennett
(74) *Attorney, Agent, or Firm* — Garrett H. Anderson

(57) ABSTRACT

The instrument for processing microscopic particles may include a combination of modules integrated into a functional system. The system may be composed of synchronized subsystems including pneumatic modules, fluorometers, multi-wavelength lasers, dual view microscopy, high-voltage generators and other subsystems designed to analyze and control microfluidic processes occurring on a chip. The system performs the combined functions of microfluidic particle generation, analysis, and selection, making it possible for the user to create custom integrated workflows for molecular and cell biology processing. Creating the integrated platform requires an innovative and multi-disciplinary approach for module mechanical integration, electronic synchronization and user interface design for controlling diverse microfluidic processes at high speed.

18 Claims, 30 Drawing Sheets

(52) U.S. Cl.
CPC . *G01N 15/1434* (2013.01); *G01N 2015/0294* (2013.01); *G01N 15/149* (2024.01); *G01N 2021/6419* (2013.01); *G01N 2021/6421* (2013.01); *G01N 21/6456* (2013.01)

(58) Field of Classification Search
CPC ....... G01N 21/6456; G01N 2015/0294; G01N 2021/6419; G01N 2021/6421; G01N 2015/1006; G01N 2015/1493; G01N 2015/1497; G01N 15/1429; G01N 15/147; G01N 2021/6482
See application file for complete search history.

(56) References Cited

U.S. PATENT DOCUMENTS

| | | | |
|---|---|---|---|
| 8,703,457 | B2 | 4/2014 | Yasuda et al. |
| 9,730,649 | B1 | 8/2017 | Jepsen |
| 2002/0025529 | A1 | 2/2002 | Quake et al. |
| 2004/0209354 | A1 | 10/2004 | Mathies et al. |
| 2006/0140462 | A1 | 6/2006 | Saggau et al. |
| 2010/0014068 | A1* | 1/2010 | Padmanabhan ........ A61B 5/157 356/450 |
| 2010/0214654 | A1 | 8/2010 | Birk et al. |
| 2010/0284024 | A1 | 11/2010 | Vucinic et al. |
| 2012/0281271 | A1 | 11/2012 | Sandström et al. |
| 2014/0113324 | A1* | 4/2014 | Di Carlo ............ G01N 15/1436 435/29 |
| 2015/0132766 | A1 | 5/2015 | Yasuda et al. |
| 2015/0338718 | A1 | 11/2015 | Zhang et al. |
| 2016/0231575 | A1 | 8/2016 | Shoham et al. |
| 2016/0327779 | A1 | 11/2016 | Hillman |
| 2017/0182321 | A1 | 6/2017 | Kass et al. |
| 2019/0119624 | A1* | 4/2019 | Tandon ................. C12M 23/16 |
| 2019/0153511 | A1 | 5/2019 | Unger et al. |
| 2021/0123098 | A1* | 4/2021 | Previte ................ C12Q 1/6869 |
| 2021/0161385 | A1* | 6/2021 | Ben-Yakar ......... G02B 21/0076 |

* cited by examiner

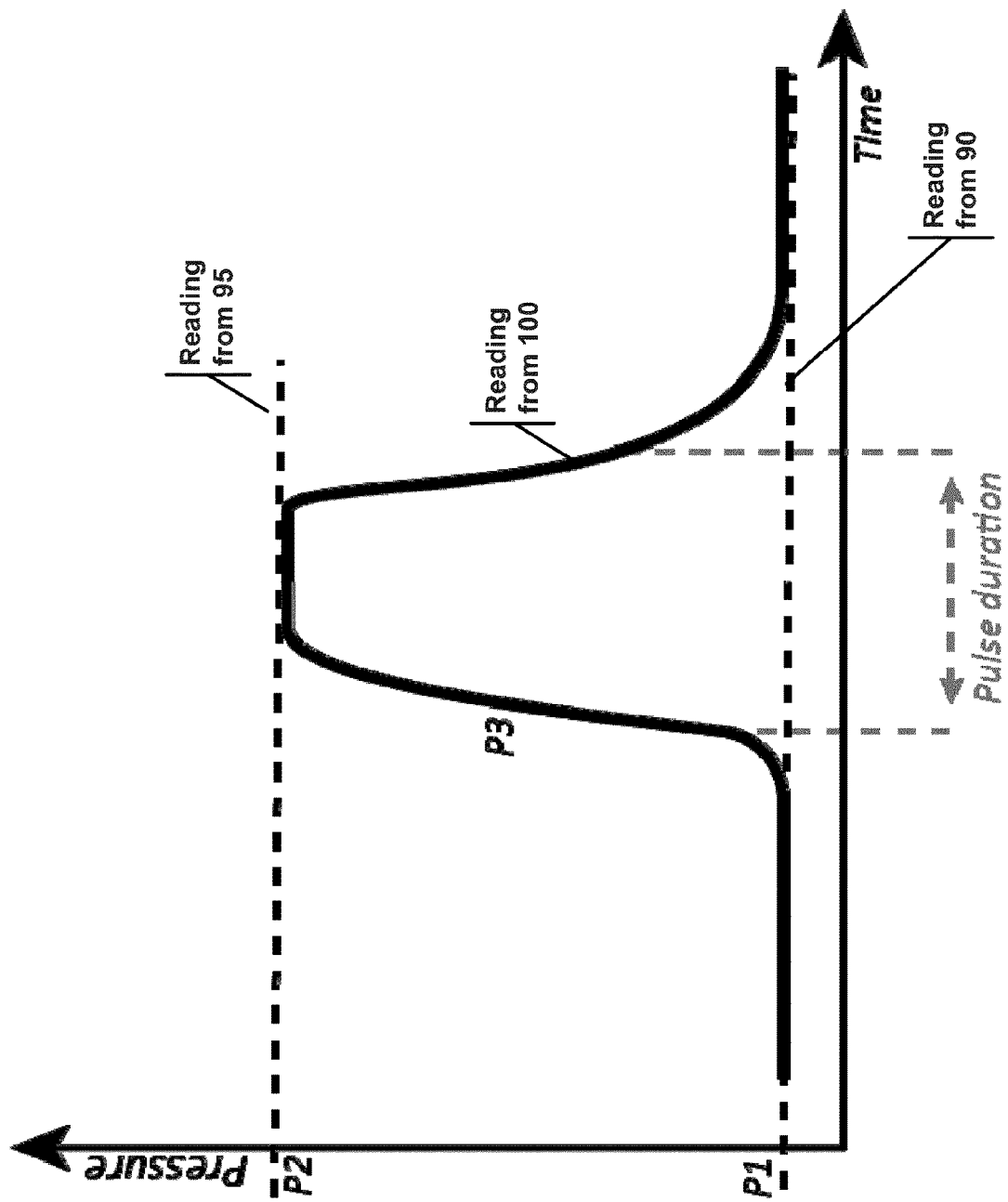

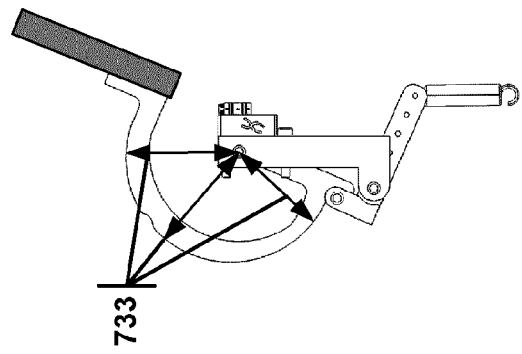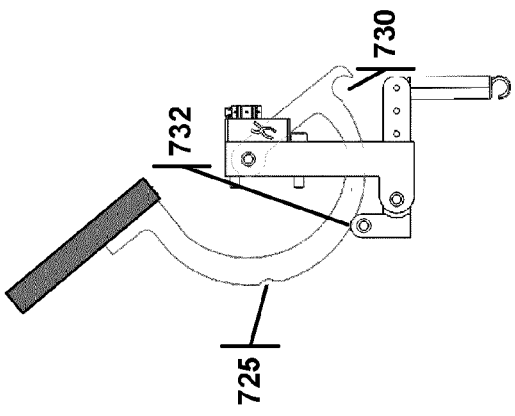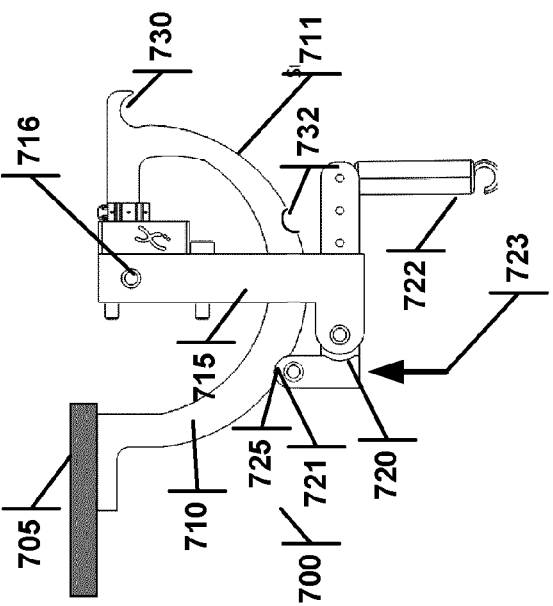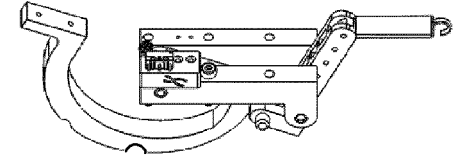
FIG. 14A  FIG. 14B  FIG. 14C

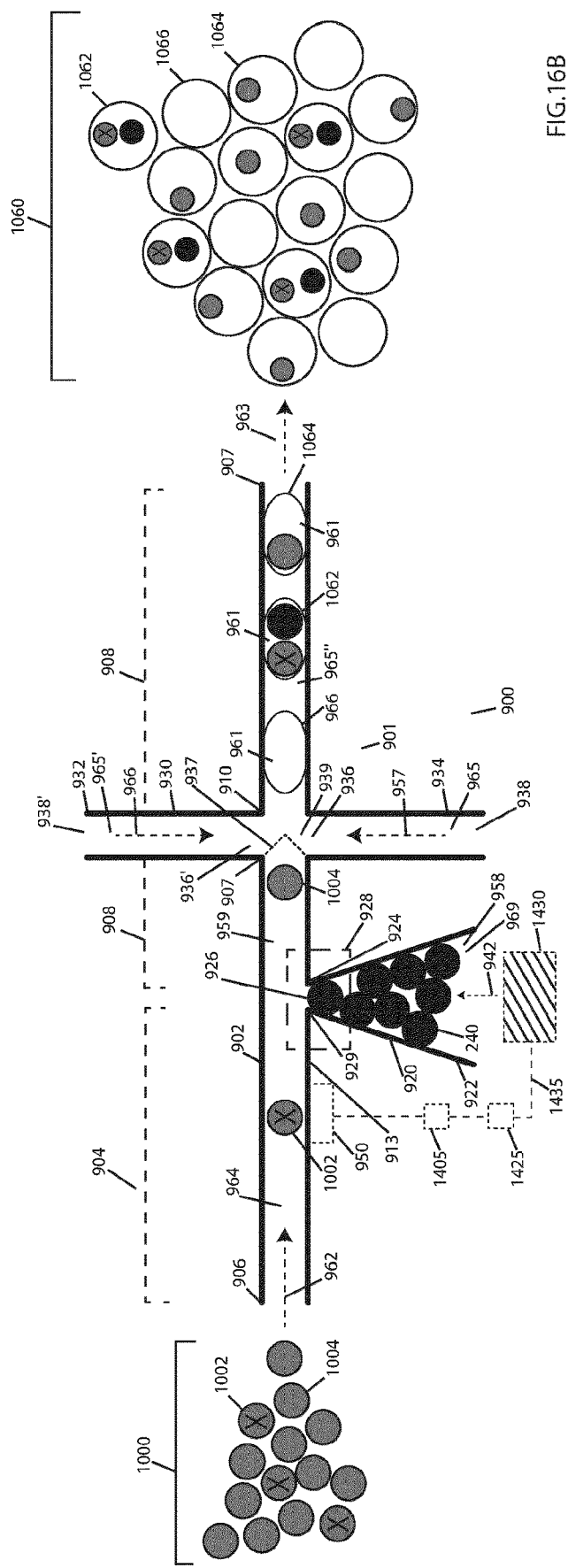

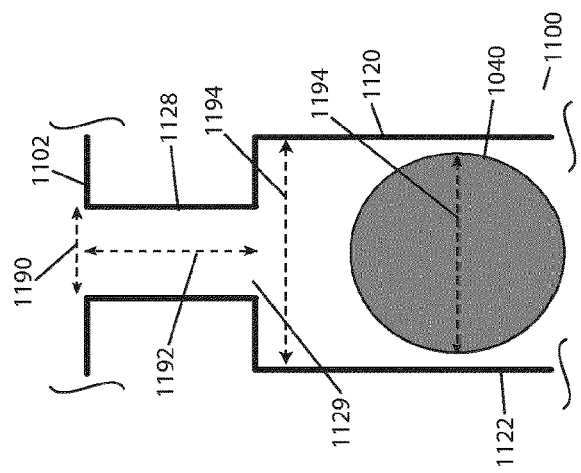
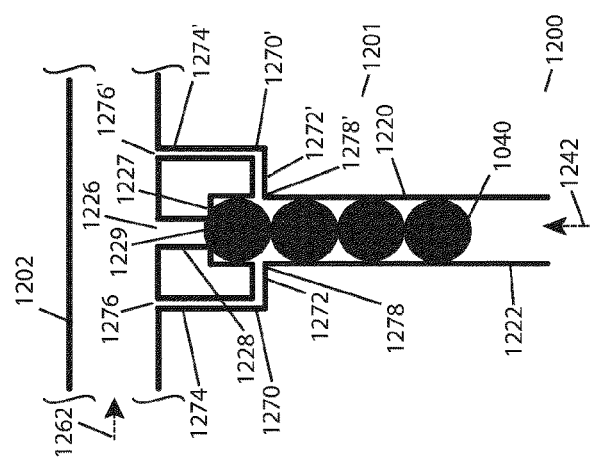
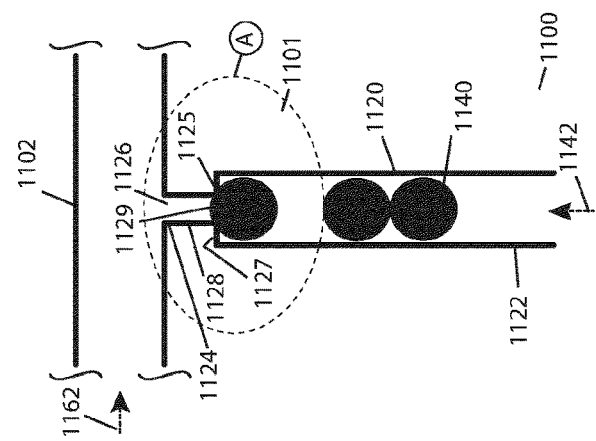

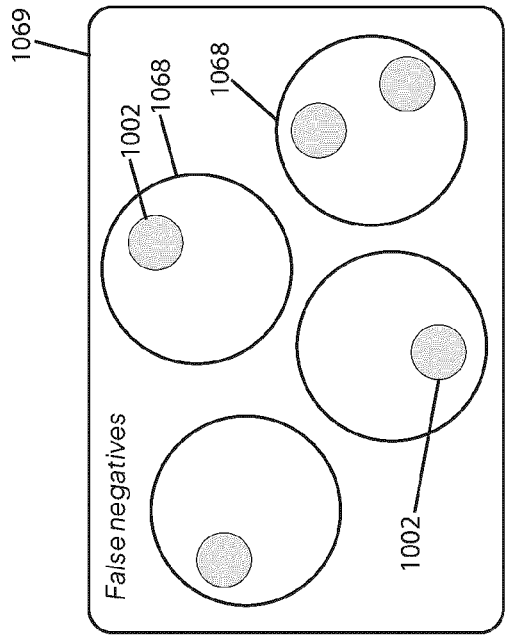
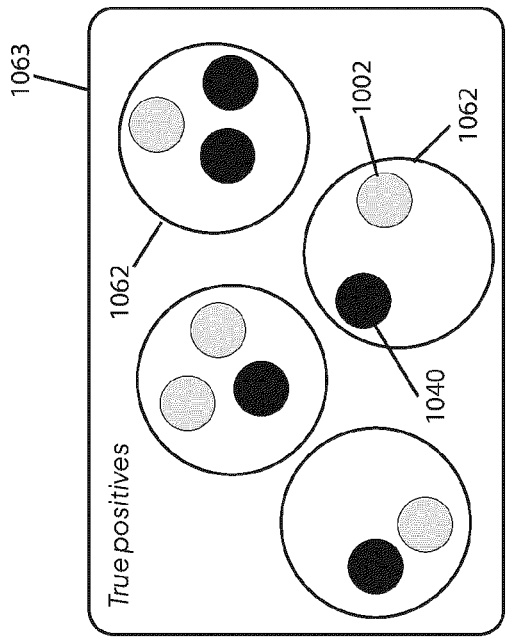
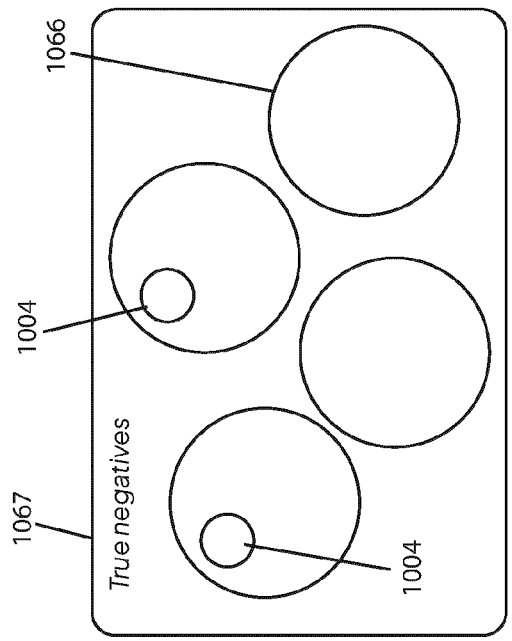
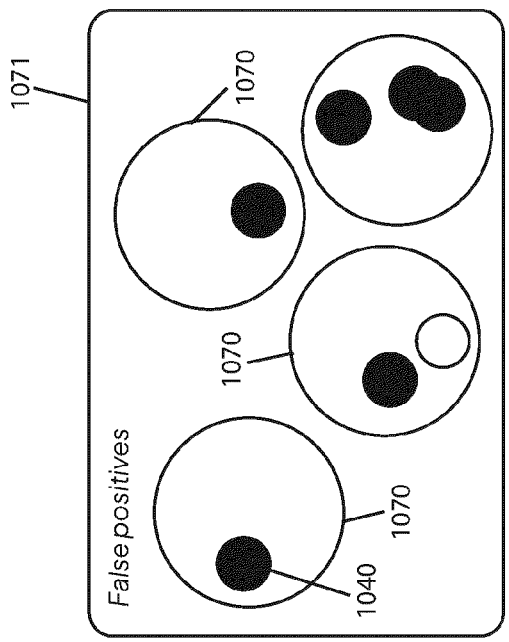
FIG. 25A
FIG. 25B
FIG. 25C
FIG. 25D

INTEGRATED PLATFORM FOR SELECTIVE MICROFLUIDIC PARTICLE PROCESSING

RELATED PATENT APPLICATION

This patent application claims priority to U.S. provisional patent application No. 63/109,112 filed on Nov. 3, 2020, entitled INTEGRATED PLATFORM FOR SELECTIVE MICROFLUIDIC PARTICLE PROCESSING, and to U.S. provisional patent application No. 63/216,149 filed on Jun. 29, 2021, entitled SELECTIVE MICROFLUIDIC PARTICLE COUPLING PROCESSES AND DEVICES. The entire content of the each of these patent applications is incorporated herein by reference for all purposes.

FIELD

The present invention relates to a system for microfluidic particle imaging and processing.

BACKGROUND

Biological systems are inherently complex, and we address this complexity by creating increasingly high-resolution and high-throughput tools for tackling this challenge. The development of single-molecule and single-cell analysis methods made it possible to break through the diversity of biological samples. Microfluidics also made it possible to analyze and to practically sort millions of droplets for isolating cells, selected by fluorescence. The advances in microfluidic liquid handling, in commercial availability of molecular biology tools and in accessibility to next-generation analysis techniques make it possible to gain unforeseen insight into biological systems. In addition to widespread sample analysis platforms, microfluidics also ushered in new possibilities for micromanipulation and biological system design. The fields of synthetic biology, antibody discovery and cell therapy, all benefited from the ability to tackle biological diversity with high-resolution tools and to deliver significant value in the forms of new disease treatments or industrial processes.

The rise of modern methods and the progress in unravelling biological complexity also created a new set of challenges. In many cases, microfluidic process integration challenges limit the scope of adoption, and methods aiming at high-resolution analysis suffer from decreasing information depth and rising analysis costs for large samples. Therefore, the field trends towards increasingly integrated systems, which would be able to manipulate selected biological particles for focused analysis. This in turn requires new tools, which would be able to analyze, select and manipulate biological species contained within microfluidic particles at high speed and efficiency. However, designing instruments to meet such requirements often results in narrow use cases or difficult integration within established workflows.

The present invention describes the systems and processes to solve the challenges of targeted high-resolution biological analysis by providing the highly integrated tools necessary to perform customizable molecular biology workflows reliably.

SUMMARY

An optics module for use with a microfluidic chip is disclosed. The optics module includes a first image sensor, a plurality of lasers, a fluorescence detector assembly and a second image sensor. The first image sensor defines a first image sensor optical path that intersects the selection zone of a microfluidic chip, and is constructed to capture images of the particles in that zone. The first image sensor optical path includes an objective with a numeric aperture of less than 0.3. The plurality of lasers define a laser optical path that intersects the detection zone of the microfluidic chip, and are constructed to induce fluorescence excitation in the particles. The fluorescence detector assembly defines a fluorescence detector optical path that intersects the detection zone, and is constructed to detect the fluorescence excitation in the particles. The second image sensor defines a second image sensor optical path that intersects the detection zone, and is constructed to capture images of the particles in that zone. The second image sensor optical path includes an objective with a numeric aperture of greater than 0.3. A portion of the fluorescence detector optical path is along the laser optical path 130, and likewise, a portion of the second image sensor optical path 140 is along the laser optical path 130.

The optics module may have multiple fluorescence detectors within the fluorescence detector assembly to detect the particle fluorescence excitation at a plurality of wavelengths, including but not limited to the wavelengths of 405 nm, 452 nm, 525 nm, 600 nm, and 680 nm. The fluorescence detectors may be made of a silicon photomultiplier (SiPM). The lasers may emit laser light at a plurality of wavelengths, including but not limited to the wavelengths of 405 nm, 488 nm, 561 nm, and 638 nm. Separate light sources may be used to illuminate particles in the selections and detection zones, and those light sources may emit infrared light.

The image sensors may be constructed to capture and to transmit at least 2000 image frames/s with a latency time of less than 100 us.

A processor may be connected to the image sensors, the lasers and the fluorescence detector assembly. The processors may be programmed to perform the following steps: (a) determine when the SiPM detects a pulse of fluorescence excitation in excess of a discrimination threshold; (b) when the threshold is exceeded, (1) determine the number of photons detected by the SiPM during which the threshold is exceeded; (2) determine analog signal measurements detected by the SiPM at sample intervals during which the threshold is exceeded; and (3) determine a time during which the threshold is exceeded; (c) sum the analog signal measurements of step b(2); (d) normalize the sum of step (c) by the time in step b(3); (e) if the normalized sum of step (d) exceeds a threshold, then output the normalized sum in step (d) and the time in step b(3); and (f) if the normalized sum of step (d) does not exceed a threshold, then: (1) normalize the number of photos in step b(1) by the time in step b(3); (2) based on the normalized photon count of step f(1), estimate an analog measurement; and (3) output the estimated analog measurement and the time in step b(3). Step f(2) is based on a lookup table associating total photon counts to estimated analog measurements, wherein the association is not linear. Based on the fluorescence measurements, the size and morphology of the particle can be estimated.

A pressure pulse generator module for use with a microfluidic chip is also disclosed. The pressure pulse generator module includes a processor, and a plurality of subassemblies, with one of the plurality connected to the chip inlet and one to the chip outlet. Each in the plurality of subassemblies includes a first pump, a second pump, a first solenoid valve, a second solenoid valve, an outlet and valve control circuits for each solenoid valve. The first pump creates a pressure that is lower than the pressure created by the second pump. The first pump connected to the processor and delivers a pressure to the first solenoid valve, which is constructed to allow fluid communication between the first pump and either a vent or the second solenoid valve. The second pump is connected to the processor and delivers a pressure to the second solenoid valve. The outlet is connected to the second solenoid valve, the second solenoid valve is further constructed to allow fluid communication between the outlet and either the second pump or the first solenoid valve.

A pressure pulse generator module may include four subassemblies, three of which are connected to the microfluidic chip inlets and one of which is connect to the outlet. Each subassembly may have pressure sensors and expansion volume to better control the released pressure.

The processor may be programed to actuate the first solenoid valve and the second solenoid valve to create a pressure pulse that starts at substantially the first pressure (i.e., pressure from the first pump) and increases to substantially the second pressure (i.e., pressure from the second pump) and returns to substantially the first pressure.

A high-voltage pulse generator module for use with a microfluidic chip is also disclosed. The high-voltage pulse generator module includes a direct digital synthesis (DDS) module constructed to produce a modulated wave form; a power amplifier connected to the DDS constructed to receive and amplify the modulated wave form; a high-voltage transformer constructed to produce a high-voltage pulse based on the amplified modulated wave form; and a processor connected to the DDS module, the power amplifier and the high-voltage transformer, the processor constructed to perform the following steps: provide a control signal to the DDS module; receive current data from the power amplifier; receive voltage data from the high-voltage transformer; and adjust the control signal to the DDS module based on the current and voltage data. The high-voltage pulse generator module may also have an analog switch constructed to interrupt the reception of the modulated wave form by the power amplifier, wherein the analog switch is connected to and controlled by the processor.

Image processing methods are also disclosed. These methods may be used with a system for selective microfluidic particle processing that includes a microfluidic chip with a particle flow through a detection zone, an optics module with an image sensor constructed to capture and transmit images of particles in the detection zone and a processor connected to the optics module and configured to perform the method. The first method, performed by the processor, includes the steps of: (a) obtaining a plurality of images from the image sensor; (b) identifying a line within the plurality of images that is central to the flow of the particles; (c) from each image in the plurality of images, extracting a portion of the images corresponding to the line identified in step (b); (d) plotting the portions from step (c) as a kymograph; (e) performing a radon transform on the kymograph; and (f) estimating the particle speed based on a dominant line angle in the transformed kymograph. The second method, performed by the processor, includes the steps of: (a) obtaining an image from the image sensor; (b) resizing the image; (c) applying a regression-based channel segmentation model to the resized image; (d) based on the post-modeled image of step (c), identifying within the resized image a channel in the microfluidic chip that contains particles; (e) applying a semantic segmentation model to the identified channel; and (f) based on the post-modeled image of step (e), identifying within the resized image the boundary of the particles 630.

Any one, or a combination of two or more, three or more, four or more, or all of the foregoing optics module, pressure pulse generator module, high voltage generator module, image processing methods and novel hinge may be used in systems, instruments and/or methods for operation of a microfluidic device, such as, for example, a microfluidic chip. In some embodiments of systems and instruments provided herein, one or more of the foregoing optics module, pressure pulse generator module, high voltage generator module, image processing methods and novel hinge may be integrated into a larger, multicomponent system for selective microfluidic particle processing.

Further, problems associated with microfluidic device particle coupling have been identified and overcome by the processes and devices described herein. Certain problems concern devices and processes that passively couple input particles containing target particles and non-target particles with a second set of particles (also referred to as second particle(s)) and output vesicles. Microfluidic devices and processes that passively couple particles often combine a continuous stream of input particles with a continuous stream of the second set of particles. Output vesicles produced include (i) a first output vesicle subpopulation that includes a target particle and a second particle, but also includes (ii) a significant second output vesicle subpopulation that includes a second particle but no target particle. The particular second output vesicle subpopulation often is more significant in instances where the set of input particles includes a minority of target particles and a majority of non-target particles (e.g., less than 50% target particle in the set of input particles). Such devices and processes result in a significant amount of the second set of particles not being incorporated into output vesicles that contain a target particle, and thereby inefficiently utilize the second set of particles. For implementations in which the second set of particles contains a diverse detectable feature (e.g., a population containing a significant number of different detectable features), the diversity is not efficiently leveraged as many of the second particles are not coupled with target particles in output vesicles.

These problems associated with inefficient coupling have been solved by development of devices and processes that actively couple target particles with a second particle. In such devices and processes the second particle can be coupled to the target particle after first detecting the target particle and then releasing the second particle in proximity to the target particle detected. Second particles can be released discontinuously when target particles are detected. Such devices and processes reduce the second output vesicle subpopulation referenced above (i.e., including a second particle but no target particle), resulting in efficient utilization of the second set of particles and, in specific implementations, enhanced utilization of second particle detectable feature diversity.

Thus, provided in one aspect is a process for combining a target particle that includes a first detectable feature (also referred to as a "first particle") with a second particle in an output vesicle, that includes:

flowing a first particle from an inlet in a first fluidic channel of a fluidic device, where: the fluidic device includes the first fluidic channel and a second fluidic channel each disposed in a substrate; the first fluidic channel includes a proximal region, a distal region and an outlet; the target particle flows in a direction from the inlet to the outlet in the first fluidic channel; and the second fluidic channel includes a distal region and a proximal terminus disposed at an interface of the first fluidic channel between the inlet and an outlet of the first fluidic channel;

detecting the first detectable feature of the target particle in the first fluidic channel at a detection zone, whereby there is a detection of the target particle, where: the detection zone is disposed between the inlet and the interface; and the second fluidic channel includes a second particle in proximity to the interface;

releasing, in response to the detection of the target particle, the second particle from the second fluidic channel into the first fluidic channel in proximity to the target particle detected (i.e., in proximity to the same target particle detected in the detection event at the detection zone); and combining the target particle with the second particle in an output vesicle.

The target particle sometimes is contained in a vesicle prior to being flowed into the first fluidic channel, in which case the vesicle often is a member of a plurality of input vesicles. The target particle sometimes is not contained in a vesicle prior to being flowed into the first fluidic channel, in which case the target particle often is a member of a plurality of input particles.

The second particle can be released from the second channel by a suitable motivation. In certain aspects the second particle is maintained at the interface by a first pressure and is released from the second channel by a second pressure greater than the first pressure (e.g., by application of a pressure differential pulse). The first pressure and the second pressure can be delivered to the second channel of the fluidic device by a pressure generator module of an instrument that contains the fluidic device.

In certain aspects, the second particle is released by an electric field. The electric field sometime is applied at or near the interface (e.g., by application of an alternating electric field pulse). An electric field can be applied by an electric field generator module of an instrument that contains the fluidic device. For implementations in which a set of input vesicles containing target particles are flowed into the first channel of a fluidic device, application of an electric field can cause an input vesicle containing a target particle to capture the released second particle.

An instrument containing a fluidic device described herein can include an optics module manufactured to detect the target particle at the detection zone of the fluidic device. An instrument containing a fluidic device described herein can include a computer/processor module manufactured to process a detection event at the detection zone, and actuate a pressure generator module and/or an electric field generator module present in the instrument for coordinated release of the second particle from the second fluidic channel.

In certain aspects, the second fluidic channel of a fluidic device includes a minimum width and a maximum width, where the minimum width serves as a constriction. The constriction sometimes is disposed at the proximal terminus of the second fluidic channel, and sometimes is disposed between the distal region and the proximal terminus of the second fluidic channel. The second particle typically passes through the constriction as part of being released from the second channel in the process described above. The constriction can be selected according to the following features: (i) a maximum constriction width that retains a second particle in the second channel prior to releasing the second particle into the first channel (e.g., by application of a pressure differential pulse or electric field pulse), and (ii) a minimum constriction width that permits release of a second particle from the second fluidic channel upon application of a releasing motivator. Expected performance of second particle release was simulated in silico for different constriction widths, and the expected performance did not match actual performance. Smaller constriction widths than predicted resulted in favorable release performance of a second particle from a second fluidic channel.

Another problem identified concerns efficiency of discontinuous coupling of the second particle with the target particle when utilizing a pressure differential as a releasing motivation. After a second particle from the second set of particles is released from the second fluidic channel, another second particle in the fluidic channel may not orient sufficiently for timely release and coupling with another incoming target particle in the first fluidic channel. Without being limited by theory, it is expected that pressure can accumulate in the second fluidic channel containing the second set of particles, thereby inhibiting the ability of the second particles to orient in the channel for release. This problem can be resolved by including a pressure relief line in the microfluidic device that is in fluid association with the second fluidic channel that contains the second set of particles.

Certain implementations are described further in the following description, examples and claims, and in the drawings.

Additional aspects, alternatives and variations as would be apparent to persons of skill in the art are also disclosed herein and are specifically contemplated as included as part of the invention. The invention is set forth only in the claims as allowed by the patent office in this or related applications, and the summary descriptions of certain examples are not in any way to limit, define or otherwise establish the scope of legal protection.

BRIEF DESCRIPTION OF THE DRAWINGS

The invention can be better understood with reference to the following figures. The components within the figures are not necessarily to scale, emphasis instead being placed on clearly illustrating example aspects of the invention. In the figures, like reference numerals designate corresponding parts throughout the different views and/or embodiments. It will be understood that certain components and details may not appear in the figures to assist in more clearly describing the invention.

FIG. 4A presents a graph of an ideal pressure profile.

FIG. 14A illustrates a novel hinge in the closed configuration. FIG. 14B illustrates a novel hinge in the partially-opened configuration. FIG. 14C illustrates a novel hinge in the fully-opened configuration.

FIG. 15A illustrates fluidic device 800 with optional fluids, In FIG. 15B, the target particle is illustrated as incorporated within an input vesicle, which is a member of a plurality of input vesicles, into which a second particle is incorporated to yield an output vesicle.

FIG. 16A illustrates fluidic device 900 with optional fluids, and FIG. 16B illustrates fluidic device 900 in use. In FIG. 16B, the target particle is illustrated as a member of a plurality of input particles, to which a second particle is coupled, after which the target particle and second particle are incorporated into an output vesicle.

FIG. 17 illustrates a configuration of a second channel that contains and releases a second particle (black particle) into a first channel.

FIG. 18 illustrates a particular configuration of a second channel that includes two relief lines.

FIG. 19 shows an expanded view of the portion of FIG. 17 delineated by the broken-line oval A and illustrates dimensions of certain elements.

FIG. 25A, FIG. 25B, FIG. 25C and FIG. 25D depict certain output vesicle subpopulations. FIG. 25A depicts True Negative output vesicles. FIG. 25B depicts False Negative output vesicles. FIG. 25C depicts False positive vesicles. FIG. 25D depicts True Positive vesicles.

FIG. 26A and FIG. 26B illustrate different output vesicle subpopulations generated by passive coupling devices and processes and FIG. 26C and FIG. 26D illustrate different output vesicle subpopulations generated by active coupling devices and processes described herein.

DETAILED DESCRIPTION

Figure 1A:
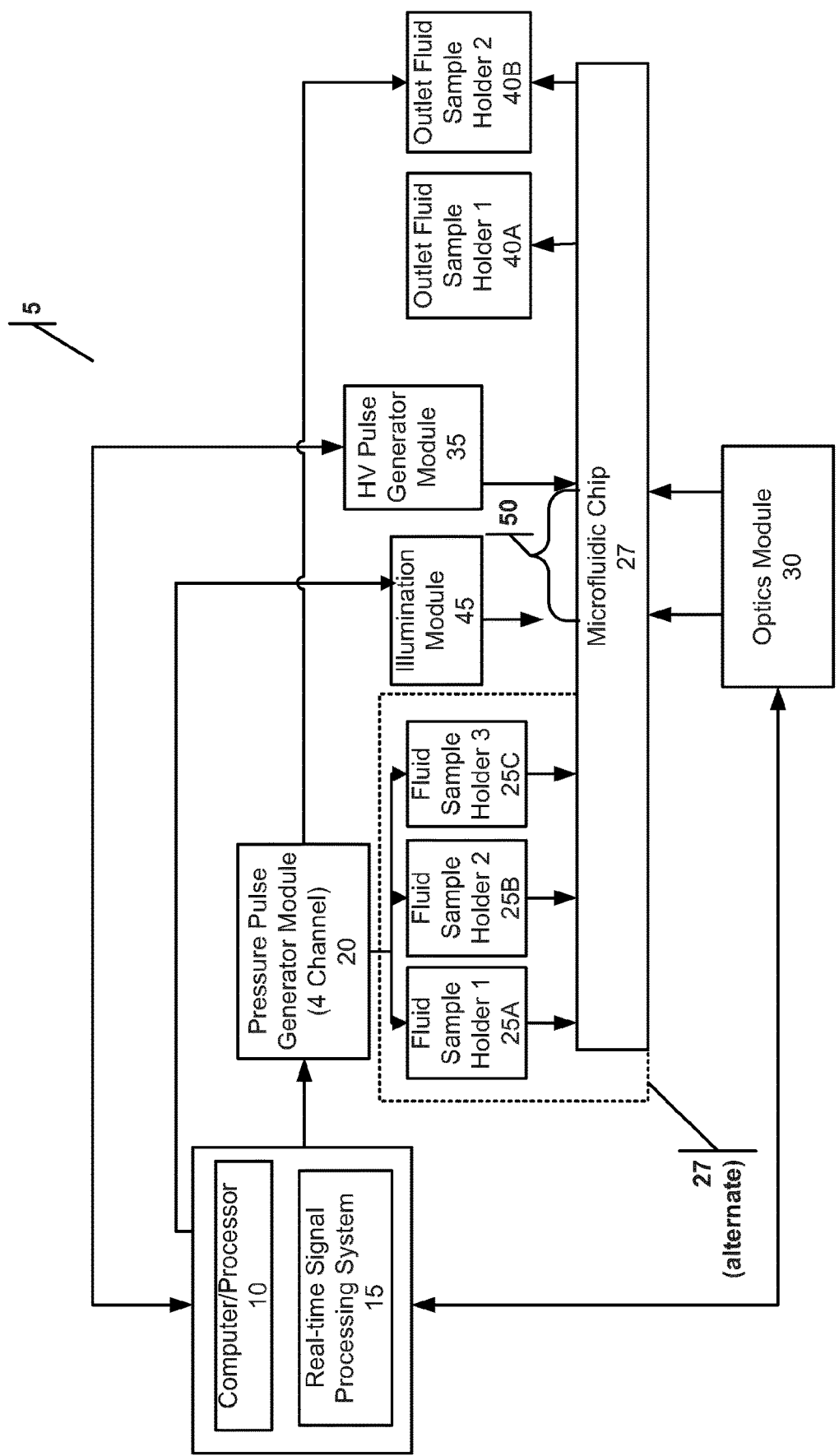
FIG. 1A provides an overview of a system for selective microfluidic particle processing.

Devices and processes described herein actively couple a target particle (also referred to as a "first particle") with a second particle. Such devices and processes are useful for a wide range of applications that include coupling one particle with another particle. In certain implementations, a target particle exists in the set of input particles among other non-target particles, the input particles are coupled with a second particle containing a second detectable feature, and the device outputs output vesicles. In certain instances the second detectable feature on the second particle facilitates characterization of the target particles from the set of input particles. In a non-limiting example, a target particle is a biological cell that has been fluorescently labeled, the second particle is a hydrogel bead that includes a barcode polynucleotide, the target cell and the second particle are coupled and captured in an output vesicle, and the barcode facilitates sequencing analysis of nucleic acid in the target cell captured in the output vesicle. In another non-limiting example, a target particle is a biological cell that has been fluorescently labeled and the second particle is a bead associated with a polypeptide antigen to which a binding molecule specifically binds, the target cell and the second particle are coupled and captured in an output vesicle, and the polypeptide antigen associated with the second particle facilitates target cell identification or sorting (e.g., B-cell or T-cell sorting) or antibody sorting of antibodies that bind to the antigen.

In devices and processes described herein the second particle can be coupled to the target particle after first detecting the target particle and then releasing the second particle in proximity to the target particle detected. Second particles can be released discontinuously after target particles are detected. As described herein, active coupling devices and processes can result in efficient utilization of the second set of particles. Active coupling devices and processes (i) efficiently couple the second particles with target particles, (ii) do not significantly couple the second particles with non-target particles, and (iii) do not significantly capture second particles into vesicles not containing a target particle, for example.

Efficient utilization of the second set of particles is particularly advantageous when the amount of target particle is a minor population in a set of input particles or input vesicles, as passive approaches will result in significant wasting of the second particles. Efficient utilization of the second set of particles also can be particularly advantageous when a second detectable feature of the second particles includes diversity. In a non-limiting example, a second detectable feature can be a polynucleotide barcode, where each second particle includes a polynucleotide species, the plurality of second particles utilized includes a significant number of different polynucleotide species (e.g., different polynucleotide sequences), and there is a relatively low occurrence of the same polynucleotide species linked to different particles in the plurality of second particles (i.e., relatively low redundancy). Efficient utilization of the second set of particles enhances utilization of second particle detectable feature diversity by ensuring that the majority of particles in a plurality of second particles utilized are coupled to target particles and not wasted in vesicles not containing target particles. Passive approaches do not afford these advantages, as described in greater detail hereafter.

Efficient utilization of the second set of particles is described in greater detail in the "Output vesicle" section herein. Particular aspects of active coupling devices and processes are described in further detail hereafter.

Fluidic Devices

In certain implementations, a fluidic device includes a first fluidic channel and a second fluidic channel each disposed in a substrate. The first fluidic channel can include a proximal region, a distal region, an inlet in the proximal region and an outlet in the distal region. The second fluidic channel can include a distal region, a proximal region and a proximal terminus, and often intersects the first fluidic channel at an interface disposed between the inlet and outlet. The second fluidic channel generally includes a minimum width and a maximum width, where the minimum width can serve as a constriction that can be disposed (i) at the proximal terminus, or (ii) between the proximal terminus and the distal region, of the second fluidic channel. The second fluidic channel sometimes is perpendicular to the first fluidic channel.

A fluidic device can include any suitable substrate. In certain implementations, the substrate contains a polymer, sometimes a mineral-organic polymer, sometimes a polymer containing carbon and silicon, and sometimes a polydimethylsiloxane (PDMS) polymer. A fluidic device sometimes is a chip (e.g., a PDMS chip) containing fluidic channels and one or more optional containment structures (described herein).

A set of input particles sometimes is contained in a first containment structure (e.g., a well) disposed in a fluidic device, where the first containment structure typically is in fluid communication with the inlet of the first fluidic channel of the fluidic device. A set of input particles can be contained outside the fluidic device, for example in a first containment structure (e.g., a well or laboratory container) existing in an instrument in which the fluidic device is mounted. Non-limiting examples of laboratory containers include a tube (e.g., on the order of 1 milliliter, 2 milliliter, 15 milliliter and 50 milliliter volume tubes), a well contained in a plate, and a tray (e.g., containing a reservoir or trough). Such a first containment structure existing in an instrument typically is in fluid communication with the inlet of the first fluidic channel of the fluidic device. Input particles can exist in a first fluid (described herein), and the first fluid can include the set of input particles. Input particles can be flowed in the first fluidic channel by application of a force (e.g., pressure), which can be applied solely or in part by a pump that is in fluid communication with the first containment structure, for example. The force can be applied in a direction towards the outlet of first fluidic channel. The first containment structure sometimes is directly connected to the inlet of the first fluidic channel and sometimes is connected via one or more intermediary fluidic lines and/or channels.

A set of second particles sometimes is contained in a second containment structure (e.g., a well) disposed in a fluidic device, where the second containment structure typically is in fluid communication with the distal region of the second fluidic channel of the fluidic device. A set of second particles can be contained outside the fluidic device, for example in a second containment structure (e.g., a well or laboratory container) existing in an instrument in which the fluidic device is mounted. Such a second containment structure existing in an instrument typically is in fluid communication with the distal region of the second channel of the fluidic device. A set of second particles can exist in a second fluid (described herein), and the second fluid can include the set of second particles. A set of second particles can be flowed in the second fluidic channel by application of a force (e.g., pressure), which can be applied solely or in part by a pump that is in fluid communication with the second containment structure, for example. The force can be applied in a direction towards the first fluidic channel. The second containment structure sometimes is directly connected to the distal region of the second fluidic channel and sometimes is connected via one or more intermediary fluidic lines and/or channels.

A set of input particles generally includes or consists essentially of a set of particles that includes a subpopulation of target particles. A set of input particles sometimes includes or consists essentially of a set of particles that are not contained in vesicles (e.g., see FIG. 16B). A set of input particles sometimes includes or consists essentially of a set of particles contained in vesicles (e.g., see FIG. 15B). A set of second particles often includes or consists essentially of a set of particles that are not contained in vesicles. A set of second particles can include or consist essentially of a set of particles that are contained in vesicles.

A fluidic device sometimes includes a third fluidic channel. For example, a fluidic device utilized for implementations that process a set of input particles not contained in vesicles can include a third channel (e.g., see FIG. 16A). A third channel typically intersects the first fluidic channel and typically includes an opening at an interface with the first fluidic channel. An interface between the third fluidic channel and the first fluidic channel often is disposed between (i) the interface of the second fluidic channel with the first fluidic channel and (ii) the outlet of the first fluidic channel. A third fluidic channel sometimes is perpendicular.

A third fluidic channel can traverse the first fluidic channel and exist on either side of the first fluidic channel (e.g., a third fluidic channel proximal region existing on one side of the first fluidic channel and a third fluidic channel distal region existing on the other opposing side of the first fluidic channel). A third fluidic channel can include a proximal region and a distal region, where the proximal region of the third fluidic channel can include a first interface with the first fluidic channel, the distal region of the third fluidic channel can include a second interface with the first fluidic channel, and the first interface opposes the second interface. A third channel sometimes is in fluid communication with one or more containment structures existing in the fluidic device (e.g., a well) or outside the fluidic device (e.g., a well, laboratory container). In certain implementations, a containment structure is in fluid communication with an inlet of a third fluidic channel on a side of the third fluidic channel opposite the interface with the first fluidic channel. A containment structure in fluid communication with a third fluidic channel sometimes is in association with a device that can apply a fluidic force in the third fluidic channel (e.g., a pump). The force can be applied in a direction towards the first fluidic channel. A third fluidic channel and/or containment structure in fluid communication with the third fluidic channel sometimes includes a third fluid, described herein. A third fluidic channel can be directly connected to a containment structure and sometimes is connected via one or more intermediary fluidic lines and/or channels.

In certain implementations, the first fluidic channel, or the second fluidic channel, or the third fluidic channel, or two or more of the foregoing, independently include or consist essentially of a tubular structure, which sometimes includes or consists essentially of a cylindrical member (i.e., having a circular cross section), a member having an oval cross-section, and/or a member having a polygonal cross-section (e.g., regular polygon, irregular polygon, concave polygon, convex polygon, trigons, quadrilateral polygon, pentagon polygon, hexagon polygon). In certain implementations, the first fluidic channel width, or the second fluidic channel width, or the third fluidic channel width, or two or more of the foregoing channel widths, independently (a) is about 5% to about 20% larger than the larger diameter of (i) the first particle diameter and (ii) the second particle diameter, and/or (b) independently is about 20 micrometers to about 100 micrometers.

Figure 15A:
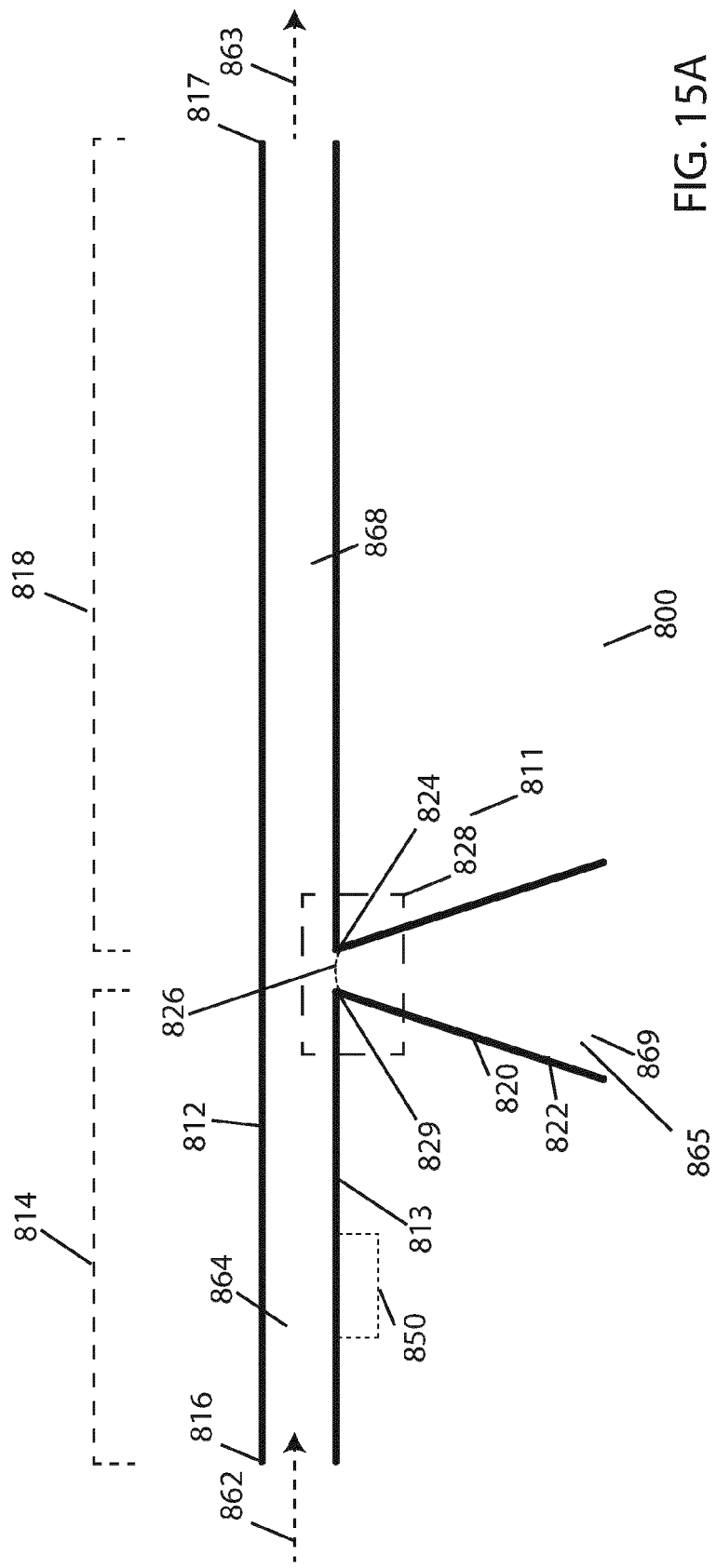
FIG. 15A illustrates fluidic device 800 that can actively couple a target particle with a second particle in an output vesicle.

A specific implementation of a fluidic device that includes a first fluidic channel and a second fluidic channel is illustrated in FIG. 15A. Fluidic device 800 illustrated in FIG. 15A includes a first fluidic channel 812 and a second fluidic channel 820 each disposed in a substrate 811. The first fluidic channel 812 includes a proximal region 814, a distal region 818, an inlet 816 in the proximal region 814 and an outlet 817 in the distal region 818. The second fluidic channel 820 includes a distal region 822, a proximal region 821 and a proximal terminus 824. The second fluidic channel 820 intersects the first fluidic channel 812 at an interface 826 disposed between the inlet 816 and outlet 817. The second fluidic channel 820 includes interior 869, and includes a minimum width and a maximum width, the minimum width functioning as a constriction 829 of the second fluidic channel 820. The constriction 829 is disposed (i) at the proximal terminus 824, or (ii) between the proximal terminus 824 and the distal region 822, and located in a trap 828 region of the fluidic device 800.

The fluidic device 800 includes a detection zone 850 at the first fluidic channel 812 disposed between the inlet 816 and the interface 826, and includes a delay region 813 in the first fluidic channel 812 disposed between the detection zone 850 and the interface 826.

Figure 15B:
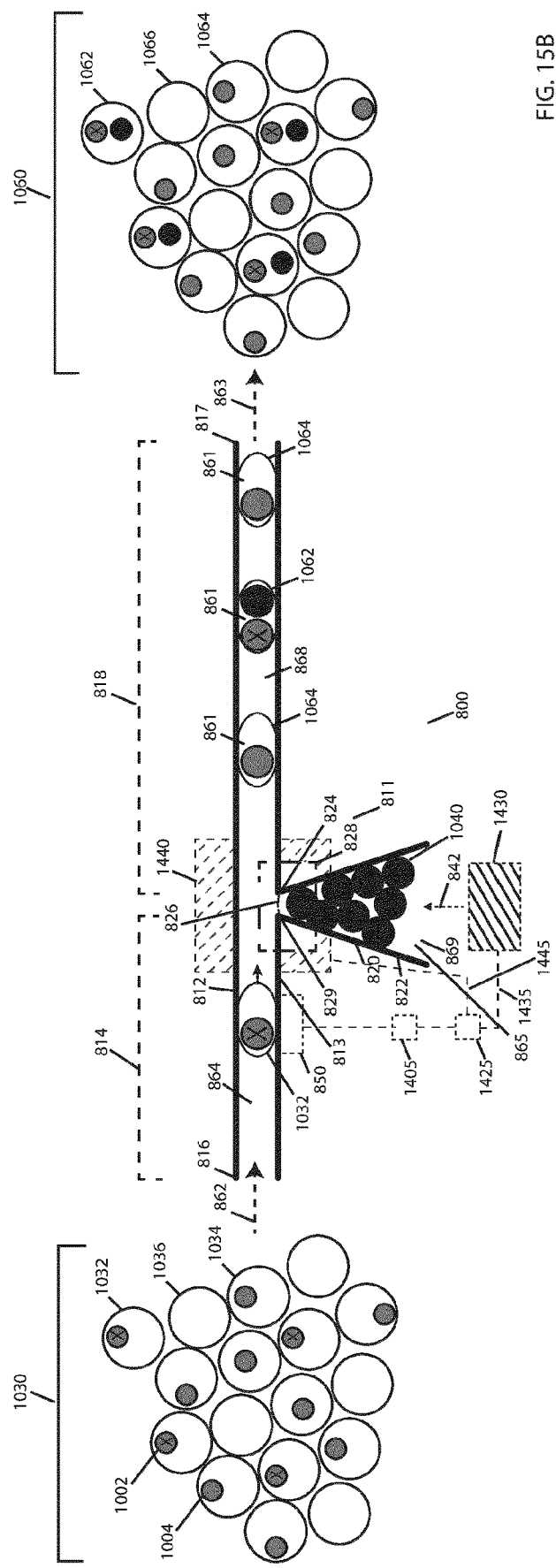
FIG. 15B illustrates fluidic device 800 in use.

Certain elements are shown in FIG. 15B when fluidic device 800 is in use. As shown in FIG. 15B, a set of input vesicles 1030 (e.g., input droplets), containing a plurality of vesicle 1032 containing a target particle 1002, a plurality of vesicle 1034 containing a non-target particle 1004 and a plurality of vesicle 1036 containing no target particle and no non-target particle, is illustrated as being flowed into the first channel 812 of the device 800. In certain implementations, a set of particles not contained within vesicles instead can be utilized as input particles and can be flowed into the first fluidic channel 812 of device 800 (e.g., set of input particles 1000 illustrated in FIG. 16B).

When device 800 is in use, shown in FIG. 15B are an interior fluid 860 of input vesicle 1032 (e.g., aqueous fluid), fluid flow direction 862 in the proximal region 814 of the first fluidic channel 812, fluid flow direction 863 in the distal region 818 of the first fluidic channel 812, a first fluid 864 in proximal region 814 of the first fluidic channel 812 (e.g., non-aqueous fluid (e.g., oil)), a second fluid 865 in second fluidic channel 820 (e.g., aqueous fluid), and an interior fluid 861 of output vesicle 1064 (e.g., aqueous fluid). Fluid 868 in the distal region 818 of the first fluidic channel 812 often is the same or substantially the same as first fluid 864, and interior fluid 860 of input vesicle 1032 often is the same or substantially the same as interior fluid 861 of output vesicles 1062 and 1064.

Figure 16A:
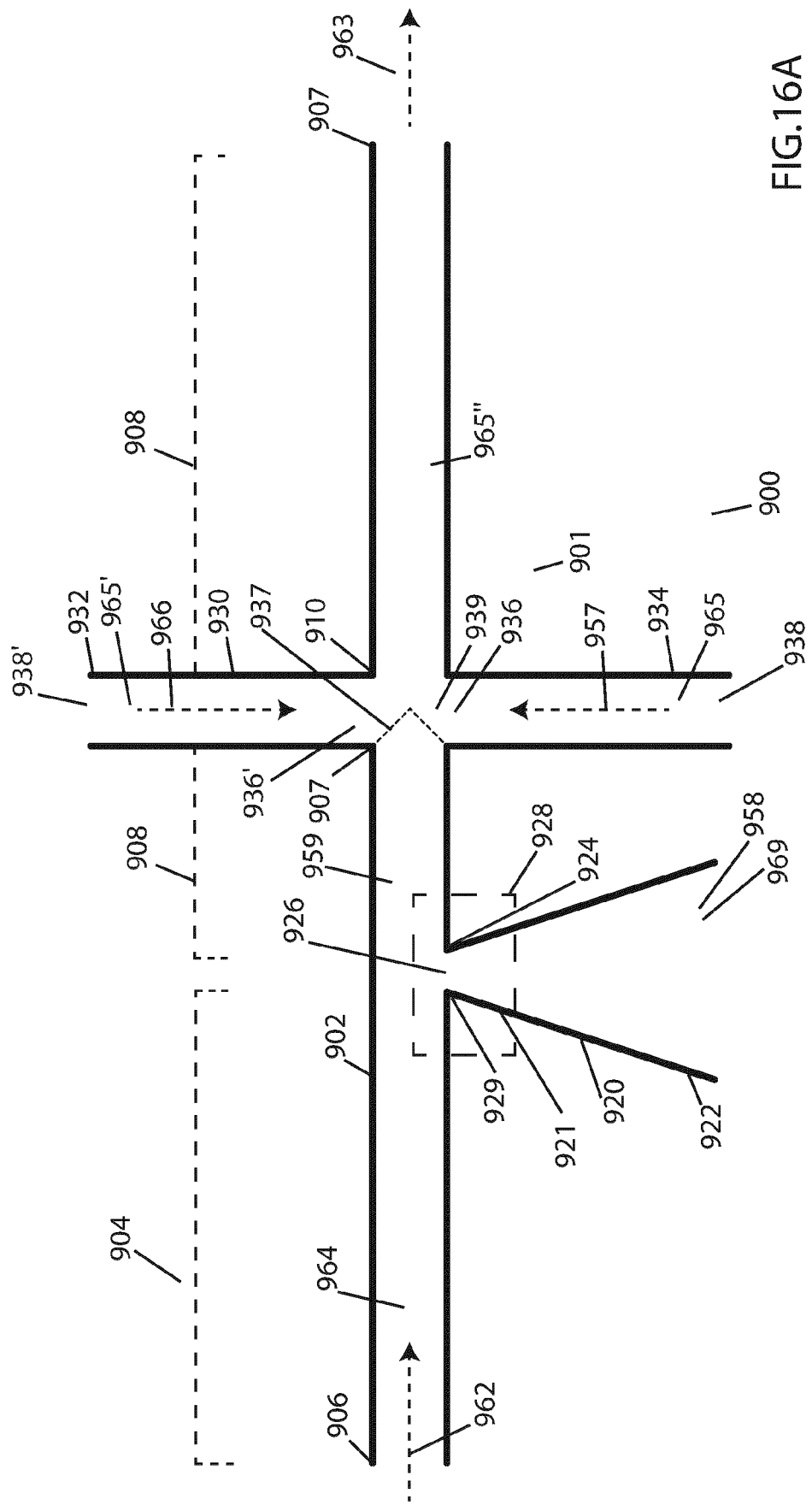
FIG. 16A illustrates fluidic device 900 that also can actively couple a target particle with a second particle in an output vesicle.

A specific implementation of a fluidic device containing a first fluidic channel, a second fluidic channel and a third fluidic channel is illustrated in FIG. 16A. Fluidic device 900 illustrated in FIG. 16A includes a first fluidic channel 902, a second fluidic channel 920, and a third fluidic channel 930 each disposed in a substrate 901. The first fluidic channel 902 includes a proximal region 904, an inlet 906 in the proximal region 904, a distal region 908, and an outlet 807 in the distal region 908. The second fluidic channel 920 includes a distal region 922, a proximal region 921 and a proximal terminus 924. The second fluidic channel 920 intersects the first fluidic channel 902 at an interface 926 disposed between the inlet 916 and outlet 917. The third fluidic channel 930 intersects the first fluidic channel 902 at an interface 936 disposed between (i) the interface 926 of the second fluidic channel 920 and the first fluidic channel 902, and (ii) outlet 917. The second fluidic channel 920 includes interior 969, and includes a minimum width and a maximum width, the minimum width functioning as a constriction of the second fluidic channel 920. The constriction 929 is disposed (i) at the proximal terminus 924, or (ii) between the proximal terminus 924 and the distal region 922 of the second fluidic channel 920, and located in a trap region 928 of the fluidic device 900. The fluidic device 900 includes a detection zone 950 at the first fluidic channel 902 disposed between the inlet 906 and the interface 926; and a delay region 913 in the first fluidic channel 902 disposed between the detection zone 950 and the interface 926. The first fluidic channel 902 includes region 959 disposed between the second fluidic channel 920 and third fluidic channel 930

The third fluidic channel 930 includes a proximal region 932 disposed on one side of the first fluidic channel 902 and a distal region 934 disposed on the other side of the first fluidic channel 902. Interface 936 and 936' exist at the junction 939 between the distal region 934 of the third fluidic channel 930 and the first fluidic channel 902, and at the junction of the proximal region 932 of the third fluidic channel 930 and the first fluidic channel 902, respectively. The distal region 934 and the proximal region 932 of the third fluidic channel 930 include inlets 938 and 938', respectively.

Certain elements are shown in FIG. 16B when fluidic device 900 is in use. Shown in FIG. 16B are: the first fluid 964 in proximal region 904 of first fluidic channel 902 (e.g., aqueous fluid), fluid flow direction 962 in proximal region 904 of the first fluidic channel 902, and fluid flow direction 963 in distal region 908 of the first fluidic channel 902. Also shown in FIG. 16B are: the second fluid 958 in the second fluidic channel 920 (e.g., aqueous fluid often containing a surfactant), and fluid flow and fluid pressure direction 942 for the second fluid 958. Shown also in FIG. 16B are: the third fluid 965, 965' in the third fluidic channel 930 (e.g., non-aqueous fluid (e.g., oil)), the third fluid 965" in distal region 908 of the first fluidic channel 902 downstream of the third fluidic channel intersection, fluid flow direction 957 in the distal region 934 of third fluidic channel 930, and fluid flow direction 966 in the proximal region 932 of third fluidic channel 930.

When device 900 is in use, there is a fluid interface 937 between the fluid in the first fluidic channel 902 from region 959 and the third fluid from the third fluidic channel 930 at junction 939. The fluid at region 959 of the first fluidic channel 902 can include a mixture of the first fluid 964 and the second fluid 958 after release of a second particle 940 from the second fluidic channel 920. The fluid at interface 937 generally is captured in the plurality of output vesicles 1060, and is illustrated as interior fluid 961 in output vesicles 1066 and 1064 in the distal region 908 of the first fluidic channel 902 in FIG. 16B.

As shown in FIG. 16B, a set of input particles 1000, containing a plurality of target particle 1002 and a plurality of non-target particle 1004, is illustrated as being flowed into the first channel 902 when device 900 is in use. In certain implementations, a set of particles contained within vesicles instead can be utilized as input particles and can be flowed into the first fluidic channel 902 of device 900 (e.g., set of input vesicles 1030 illustrated in FIG. 15B).

Processes for manufacturing fluidic devices are known. For example, see McDonald et al., Fabrication of microfluidic systems in poly(dimethylsiloxane), Electrophoresis. 2000 January; 21(1):27-40; Anderson et al., Fabrication of topologically complex three-dimensional microfluidic systems in PDMS by rapid prototyping, Anal. Chem. 2000, 72, 3158-3164; and Sciambi et al., Generating electric fields in PDMS microfluidic devices with salt water electrodes, Lab Chip, 2014, 14, 2605-2609

Constriction and Second Fluidic Channel Configurations

A fluidic device typically includes a constriction in the second fluidic channel, which serves as a second particle trap that facilitates discontinuous flow and release of a second particle from the second fluidic channel into the first fluidic channel. In certain implementations, a constriction is in the proximal region of the second fluidic channel, sometimes at the proximal terminus of the second fluidic channel. In certain instances, a constriction is disposed at a junction between the proximal region and the distal region of the second fluidic channel. A constriction often is not disposed in the distal region of the second fluidic channel. As shown in FIG. 15A, the constriction 829 of trap 828 is disposed at the proximal terminus 824 of the second fluidic channel 820, and coincides at the first fluidic channel 812, in fluidic device 800. Similarly, as shown in FIG. 16A, the constriction 929 of trap 928 is disposed at the proximal terminus 924 of the second fluidic channel 920, and coincides at the first fluidic channel 902, in fluidic device 900.

A second fluidic channel can include any suitable configuration that permits retention of a second particle and discontinuous release of a second particle through a constriction. In FIG. 15A and FIG. 16A a second fluidic channel containing a frustum region, having walls that taper from the distal region to the proximal terminus (e.g., pyramidal or conical frustum), is illustrated for fluidic device 800 and fluidic device 900. The constriction coincides with the minimum width of the frustum and at the junction between the second fluidic channel and the first fluidic channel.

Other second channel configurations can be incorporated into a fluidic device. For example, the proximal region of the second fluidic channel can be a first cylinder having a first diameter, the distal region is a second cylinder having a second diameter adjoining the first cylinder, where the first diameter is less than the second diameter, and where the constriction occurs at the junction between the first cylinder and the second cylinder. The axial length of the proximal region first cylinder can be any suitable length. A non-limiting second channel configuration is illustrated in FIG. 17 for fluidic device 1100. Fluidic device 1100 includes a first fluidic channel 1102 and a second fluidic channel 1120 disposed in substrate 1101. The second fluidic channel 1120 includes a distal region 1122, a proximal region 1128 and a proximal terminus 1124. The proximal region 1128 is a first cylinder having a first diameter and distal region 1122 is a second cylinder having a second diameter, where the first diameter is less than the second diameter. The proximal region 1128 first cylinder and the distal region 1122 second cylinder are adjoined, and the second cylinder transitions to the first cylinder in a step 1127 at junction 1125 between the first cylinder and the second cylinder. Constriction 1129 is disposed between the proximal region 1128 first cylinder and the distal region 1122 second cylinder, and an interface 1126 exists in the interior of the second fluidic channel 1120 at the constriction. When in use, fluid flow and fluid pressure are in direction 1142, and fluid flows in direction 1162 in the first fluidic channel 1102. As illustrated in FIG. 19, the first cylinder can have an axial length 1192, the constriction 1129 can have a width 1190, and a second particle 1040 can have a diameter 1094.

In certain implementations, fluidic device 1100 is an alternative to fluidic device 800 and includes all elements of fluidic device 800 except that the second fluidic channel 1120 in fluidic device 1100 replaces the second fluidic channel 820 in fluidic device 800. In certain implementations, fluidic device 1100 is an alternative to fluidic device 900 and includes all elements of fluidic device 900 except that the second fluidic channel 1120 in fluidic device 1100 replaces the second fluidic channel 920 in fluidic device 900.

Figure 22:
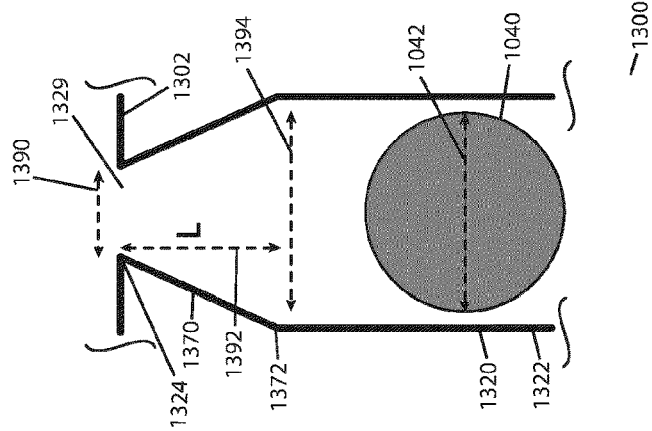
FIG. 22 illustrates dimensions of certain elements of the configuration shown in FIG. 21.
Figure 21:
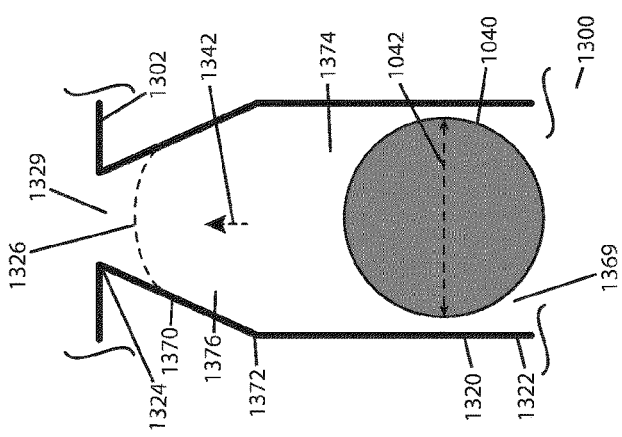
FIG. 21 shows an expanded view of the portion of FIG. 20 delineated by the broken-line circle B.
Figure 20:
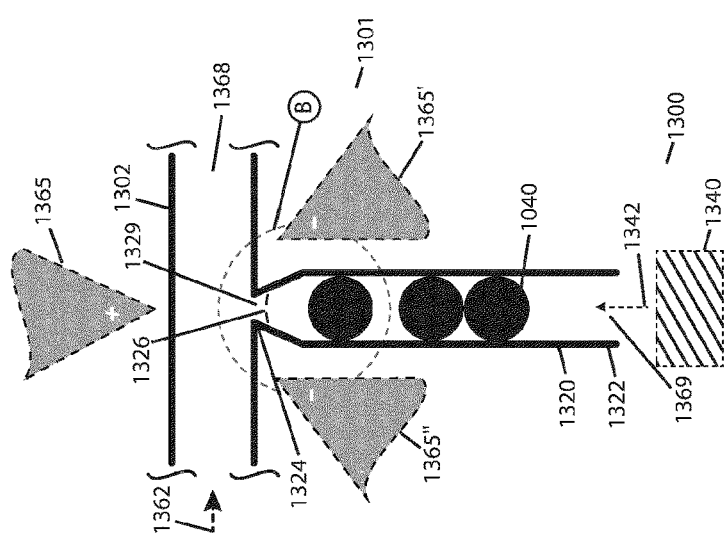
FIG. 20 illustrates another particular configuration of a second channel.

Another second channel configuration that can be incorporated into a fluidic device can include the following features: the proximal region of the second fluidic channel can be a frustum (e.g., pyramidal or conical frustum), the distal region can be a cylinder adjoining the frustum, where the width of the frustum tapers from the distal region to the proximal terminus. The axial length of the proximal region frustum can be any suitable length. A non-limiting second channel configuration is illustrated in FIG. 20 for fluidic device 1300. Fluidic device 1300 includes a first fluidic channel 1302 and a second fluidic channel 1320 disposed in substrate 1301. The second fluidic channel 1320 includes a distal region 1322, proximal region 1370 and proximal terminus 1324. The proximal region 1370 is a conical frustum and the distal region 1322 is an adjoining cylinder. The frustum and the cylinder are adjoined at junction 1372. The cylinder has an interior 1374 in which the set of second beads are disposed during use. The frustum tapers from the distal region 1322 to the proximal terminus 1324 and includes a minimum width disposed at the first fluidic channel 1302. The constriction 1329 coincides with the minimum width of the frustum at the first fluidic channel 1302, at or near which an interface 1326 within the interior 1376 of the proximal region 1370 of the second fluidic channel 1320 is disposed. During use of fluidic device 1300, fluid 1368 flows in direction 1362 in the first fluidic channel 1302 and fluid pressure and fluid flow are in direction 1342 in the second fluidic channel 1320. As illustrated in FIG. 22, the frustum can have an axial length 1392, the frustum can have a minimum width 1390, which is equal to the width of constriction 1329, the frustum can have a maximum width 1394 at junction 1372 between the proximal region 1370 and distal region 1322, and a second particle 1040 can have a diameter 1042.

In certain implementations, fluidic device 1300 is an alternative to fluidic device 800 and includes all elements of fluidic device 800 except that the second fluidic channel 1320 in fluidic device 1300 replaces the second fluidic channel 820 in fluidic device 800. In certain implementations, fluidic device 1300 is an alternative to fluidic device 900 and includes all elements of fluidic device 900 except that the second fluidic channel 1320 in fluidic device 1300 replaces the second fluidic channel 920 in fluidic device 900.

A constriction in a fluidic device can have a suitable width (e.g., diameter) that permits retention of a second particle and discontinuous release of a second particle through the constriction. In certain implementations, a constriction has a width (W), a second particle that traverses the restriction has a diameter (D), and the width (W) of the constriction equals the product of y*D, where y is about 0.1 to about 0.75. Width (W) is a diameter for constrictions having a circular cross section. In certain instances, y is about 0.2 to about 0.5. In certain instances diameter (D) is about 20 micrometers to about 100 micrometers and sometimes is about 30 micrometers to about 60 micrometers. In certain instances, width (W) is about 5 micrometers to about 75 micrometers, about 5 micrometers to about 50 micrometers, about 5 micrometers to about 45 micrometers about 10 micrometers to about 30 micrometers, or about 15 micrometers to about 25 micrometers. As addressed herein, the width (W) is smaller than expected as actual performance did not match expected performance. In certain instances, the width (W) of a constriction incorporated into a fluidic device is applicable when utilizing flexible beads as the second particles, such as hydrogel beads, for example, and to beads having a stiffness of about 3 kPa to about 100 kPa, or a stiffness of about 5 kPa to about 10 kPa. In certain instances, a width (W) determined by constraints addressed in this paragraph in particular is applicable to a second fluidic channel having a first cylinder proximal region and a second cylinder distal region, where the diameter of the first cylinder is less than the diameter of the second cylinder, and in particular applicable to implementations in which pressure is utilized to release a second bead form the second fluidic channel. For example, for a fluidic device 1100, FIG. 19 illustrates width 1190 of the proximal region 1128, which is equal to the width (W) of constriction 1129; axial length 1192 of proximal region 1128; and diameter 1194 (D) of second particle 1040.

A width of a portion of a second fluidic channel not including a constriction can be any suitable width for discontinuously flowing second particles. In certain implementations, a constriction is in a proximal region of a second fluidic channel, the distal region of the second fluidic channel has a minimum width (W2), the constriction has a width (W), a second particle that traverses the restriction has a diameter (D), and the minimum width (W2) is between (a) the product of 2*W, and (b) the larger value of: (i) about the product of 2*D, or (ii) about the product of 4*W. Width (W) sometimes is about 10 micrometers to about 30 micrometers. Diameter (D) sometimes is about 20 micrometers to about 100 micrometers and sometimes is about 30 micrometers to about 60 micrometers. The width of a second fluidic channel in a distal region (e.g., W2) sometimes is about 20 micrometers to about 200 micrometers, or about 40 micrometers to about 120 micrometers or about 60 micrometers to about 120 micrometers. In certain instances, a width (W2) determined by constraints addressed in this paragraph in particular is applicable to a second fluidic channel having a frustum proximal region and a cylinder distal region, and in particular applicable to implementations in which an electric field is utilized to release a second bead form the second fluidic channel. For example, for a fluidic device 1300, FIG. 22 illustrates minimum frustum width 1390 of the proximal region 1370, which is equal to the width (W) of constriction 1329; axial length 1392 of proximal region 1370, diameter 1042 (D) of second particle 1040; and width (W2) 1394 of the distal region 1322, which coincides with the maximum width of the frustum-shaped proximal region 1370.

An axial length of a portion of a second fluidic channel adjacent to a constriction can be any suitable length for discontinuously flowing second particles. In certain implementations, a constriction is in a proximal region of a second fluidic channel, the distal region of the second fluidic channel has a minimum width (W2), the constriction has a width (W), a second particle that traverses the restriction has a diameter (D), and the axial length (L) of the proximal region of the second fluidic channel is between (a) W2, and (b) the larger value of: (i) about the product of 2*D, or (ii) about the product of 4*W. Width (W) sometimes is about 10 micrometers to about 30 micrometers. Diameter (D) sometimes is about 20 micrometers to about 100 micrometers and sometimes is about 30 micrometers to about 60 micrometers. Width (W2) sometimes is about 20 micrometers to about 200 micrometers, or about 40 micrometers to about 120 micrometers or about 60 micrometers to about 120 micrometers. The axial length (L) of the proximal region of a second fluidic channel sometimes is about 20 micrometers to about 200 micrometers, or about 40 micrometers to about 120 micrometers or about 60 micrometers to about 120 micrometers. In certain instances, the axial length (L) for a second fluidic channel proximal region, as determined by constraints addressed in this paragraph, in particular is applicable to a second fluidic channel having a frustum proximal region and a cylinder distal region, and in particular applicable to implementations in which an electric field is utilized to release a second bead form the second fluidic channel. For example, for a fluidic device 1300, FIG. 22 illustrates axial length (L) 1392 of proximal region 1370; minimum frustum width 1390 of the proximal region 1370, which is equal to the width (W) of constriction 1329; diameter 1042 (D) of second particle 1040; and width (W2) 1394 of the distal region 1322, which coincides with the maximum width of the frustum-shaped proximal region 1370.

Relief Channel(s)

In certain implementations, a fluidic device includes a relief channel in fluid communication with the second fluidic channel. Without being limited by theory, a relief channel can facilitate positioning of a second particle in the second fluidic channel at the constriction in a trap for timely release after another second particle earlier was released. Inclusion of a relief channel in a fluidic device may be particular advantageous for second particle positioning in implementations that release a second particle by a pressure differential (e.g., pressure differential pulse).

A fluidic device sometimes includes a relief channel disposed between the first fluidic channel and the second fluidic channel that is in fluid communication with the first fluidic channel and the second fluidic channel. A relief channel can include an opening to the second fluidic channel and can include an opening to the first fluidic channel. An opening of a relief channel to the second fluidic channel sometimes is disposed between the constriction and a distal portion of the second fluidic channel. An opening of a relief channel to the second fluidic channel sometimes is disposed in a distal region of the second fluidic channel when the constriction is disposed in the proximal region of the second fluidic channel. An opening of a relief channel sometimes is disposed in the first fluidic channel between the first fluidic channel inlet and the second fluidic channel interface, or between the first fluidic channel outlet and the second fluidic channel interface. Each relief channel in a fluidic device independently is a single line or a branched line that can include multiple openings in the second fluidic channel, the first fluidic channel, or both the first fluidic channel and the second fluidic channel.

A relief channel can include any suitable width (e.g., a diameter for a relief channel having a circular cross section) that permits orientation of a second particle for timely discontinuous coupling with a target particle. In certain instances a relief channel has a width (w), the second particle 1040 includes a diameter (D), the width (w) of each of the relief channels is greater than 5 micrometers and less than the product of z*D, and z is about 0.1. Diameter (D) sometimes is about 20 micrometers to about 100 micrometers and sometimes is about 30 micrometers to about 60 micrometers. A relief channel sometimes has a width of about 5 micrometers to about 10 micrometers, and sometimes a width of about 5 micrometers to about 6 micrometers.

A non-limiting implementation of a fluidic device that includes a relief channel is illustrated in FIG. 18. In FIG. 18, fluidic device 1200 includes a first fluidic channel 1202 and a second fluidic channel 1220 disposed in substrate 1201. Fluidic device 1200 includes an interface 1226 at the first fluidic channel 1202 and second fluidic channel 1220 intersection. The second fluidic channel 1220 includes a first cylinder proximal region 1228 having a first diameter and an adjoining second cylinder distal region 1222 having a second diameter, where the first diameter is less than the second diameter. The second cylinder transitions to the first cylinder at step 1227, at which the construction 1229 in the second fluidic channel 1220 is disposed. Relief channels 1270 and 1270' each are unbranched single lines each including a distal region 1272 or 1272' and a proximal region 1274 or 1274'. The relief channels 1270 and 1270' each include a proximal terminus 1276 or 1276' disposed at the first fluidic channel 1202 on either side of interface 1226, and a distal terminus 1278 or 1278' disposed in the distal region 1222 on either side of the second fluidic channel 1220 and oppositely disposed. When fluidic device 1200 is in use, fluid flow is in direction 1262 in the first fluidic channel 1202 and fluid flow and fluid pressure is in direction 1242 in the second fluidic channel 1220.

In certain implementations, fluidic device 1200 is an alternative to fluidic device 800 and includes all elements of fluidic device 800 except that the second fluidic channel 1220 in fluidic device 1200 replaces the second fluidic channel 820, and relief channels 1270, 1270' are included, in fluidic device 800. In certain implementations, fluidic device 1200 is an alternative to fluidic device 900 and includes all elements of fluidic device 900 except that the second fluidic channel 1220 in fluidic device 1200 replaces the second fluidic channel 920, and relief channels 1270 and 1270' are included, in fluidic device 900.

Particles

In certain implementations, particles flowed in a first fluidic channel of a fluidic device are from a plurality of input particles. In certain implementations, the plurality of input particles (e.g., input particles 1000) includes about 1,000 particles to about 10 million particles, or sometimes about 10,000 particles to about 1 million particles. A plurality of particles sometimes includes one particle species only, and sometimes includes multiple sets of different particle species. A plurality of particles that includes multiple sets of different particle species sometimes includes as one set a plurality of target particles (i.e., a plurality of the first particle that includes the first detectable feature) and at least one other set of different non-target particle species (i.e., a plurality of a particle that does not include the first detectable feature). The at least one other set of different particle species may or may not include a detectable feature different than the first detectable feature. Referring to FIG. 16B, for example, a plurality of input particles sometimes includes: (i) a plurality 1003 of the first particle 1002 comprising the first detectable feature, and (ii) a plurality 1005 of particle 1004 not containing the first detectable feature. A target particle sometimes is about 50% or less of the plurality of input particles 1000, and sometimes is about 10% or less of the plurality of input particles 1000. A target particle sometimes exists in a plurality of input particles at a ratio of target particles to non-target particles of about 1:1 or less than about 1:1 (e.g., a ratio of about 1:5 or less, 1:10 or less, 1:20 or less, 1:50 or less, 1:100 or less, 1:500 or less, 1:1000 or less, 1:5000 or less or 1:10000 or less of target particles to non-target particles).

Input particles flowed in the first channel of a fluidic device can be any suitable type of particle for coupling with a second particle. Non-limiting examples of input particles include beads, biological cells and microfluidic capsules. A plurality of the input particles flowed in the first channel of a fluidic device sometimes include one type of particle (e.g., mammalian cells of one cell type), and sometimes include a mixture of two or more different types of particles (e.g., mammalian cells of different cell types; mammalian cells and microfluidic capsules). Referring to FIG. 16B, for example, (i) the first particle 1002 can be a biological cell, (ii) the particle 1004 can be a biological cell, (iii) the plurality 1003 of the first particle 1002 can include biological cells, (iv) the plurality 1005 of particle 1004 can include biological cells, (v) the plurality of input particles 1000 can include biological cells, (vi) the plurality of input particles 1000 can consist essentially of biological cells (i.e., biological cells and optionally one or more non-cell components that do not alter the structure of the cells), and (vii) combination of any two or more of (i), (ii), (iii), (iv), (v) and (vi).

Input particles flowed in the first channel of a fluidic device sometimes are not contained in a vesicle. Referring to FIG. 16B, for example (i) the first particle 1002 sometimes is not contained in a vesicle, (ii) the particle 1004 sometimes is not contained in a vesicle, (iii) the plurality 1003 of the first particle 1002 sometimes is not contained in a vesicle, (iv) the plurality 1005 of particle 1004 sometimes is not contained in a vesicle, or (v) the plurality of input particles 1000 sometimes is not contained in a vesicle.

Input particles flowed in the first channel of a fluidic device sometimes are contained in a vesicle. Referring to FIG. 15B, for example, the first particle 1002 sometimes is contained in a vesicle 1032, and sometimes is from a plurality of vesicles 1030 comprising: (i) a plurality 1033 of the first vesicle 1032 containing the first particle 1002, (ii) a plurality 1035 of vesicle 1034 comprising a particle 1004 not containing the first detectable feature, and (iii) a plurality 1037 of vesicle 1036 not comprising the first particle 1002 and not containing the particle 1004. In instances where a target particle is contained in a vesicle, a first detectable feature of the target particle is detected when the particle is contained in the input vesicle at the detection zone of the first fluidic channel, and at the same time the input vesicle containing the target particle is detected. In certain implementations, a plurality of input vesicles contains biological cells.

Input particles, contained in input vesicles or not contained in input vesicles, generally are in continuous flow in the first fluidic channel. Referring to FIG. 16B, for example, the plurality of input particles 1000 is in continuous flow in the first fluidic channel 902. Referring to FIG. 15B, for example, the plurality of input vesicles 1030 is in continuous flow in the first fluidic channel 812. Input particles can flow through the first fluidic channel at a rate of about 1 particle per second to about 1000 particles per second, or at a rate of about 10 particles per second to about 100 particles per second, for example. Input vesicles can flow through the first fluidic channel at a rate of about 1 vesicle per second to about 1000 vesicles per second, or at a rate of about 10 vesicles per second to about 100 vesicles per second, for example.

A second fluidic channel in a fluidic device can include any suitable number of second particles for coupling with the first particles in the first fluidic channel. Referring to FIG. 15B and FIG. 16B, for example, the second particle 1040 is from or is in a plurality 1041 of the second particle 1040, and the plurality 1041 of the second particle 1040 includes a second detectable feature. In certain instances, the plurality 1041 of the second particle 1040 includes about 100 particles to about 10 million particles, and sometimes the plurality 1041 of the second particle 1040 includes about 100 particles to about 100,000 particles. The plurality of the second particle generally is not continuously flowed into the first fluidic channel, and the second particles are discontinuously released into the first fluidic channel according to detection of a target particle in the first fluidic channel. In certain implementations, about 80% to about 100% of the plurality 1041 of the second particle 1040 is released from the second fluidic channel (e.g., channel 820, 920) into the first fluidic channel (e.g., channel 812, 902).

A second set of particles in the second fluidic channel of a fluidic device can include any type of particle suitable for coupling with a particle in the first fluidic channel. Non-limiting examples of such particles include beads, biological cells, and microfluidic capsules, and such particles optionally are contained in vesicles (e.g., vesicles containing beads, vesicles containing biological cells, vesicles containing microfluidic capsules) or are not contained in vesicles. A plurality of the second particle in the second fluidic channel sometimes includes one type of particle (e.g., one type of beads), and sometimes includes a mixture of two or more different types of particles (e.g., different types of beads). In certain implementations, a plurality of second particles in or from a second fluidic channel of a device contains or consists essentially of beads.

Biological Cells and Microfluidic Capsules

For implementations in which an input particle and/or second particle is a biological cell, any suitable biological cell can be utilized. A biological cell can be a primary cell from an organism, can be a cloned cell and sometimes is from a group of cultured cells. A biological cell can be from any suitable organism, including without limitation, a vertebrate (e.g., mammalian cell) or an invertebrate (e.g., insect cell, bacterial cell). A set of input cells flowed into a fluidic device may include a single cell type or multiple cell types (e.g., different cell types from one or more tissues). A set of input cells flowed into a fluidic device can include (i) cells from a subject or subjects having a disease or condition, (ii) cells from a subject or subjects not having the disease or condition, (iii) cells from a tissue or tissues affected by the disease or condition, (iv) cells from a tissue or tissues not affected by the disease or condition, or (v) a combination of two or more of (i), (ii), (iii) and (iv). A set of input cells flowed into a fluidic device can include single cells, separated cells, multi-cell units (e.g., bacterial colonies) or combinations thereof.

For implementations in which an input particle and/or second particle is a microfluidic capsule, any suitable microfluidic capsule can be utilized. A microfluidic capsule can include one or components of a biological cell but not all components of the cell. A microfluidic capsule can include one or more of the following: lipids, lipid layer (e.g., lipid bilayer), fatty acids, other fatty substances (e.g., cholesterol), polypeptides and polynucleotides. A microfluidic capsule sometimes is naturally occurring and sometimes is synthetic.

Processes for preparing biological cells and microfluidic capsules for processing in a fluidic device are known. For example, see Leonaviciene et al., Multi-step processing of single cells using semi-permeable capsules, Lab Chip, 2020, 20, 4052-4062; US20140155295A1; US20100187705A1; EP2809440B1; U.S. Pat. No. 9,277,759B2 and U.S. Pat. No. 7,759,111B2.

Vesicles

Input particles and/or second particles sometimes are contained in vesicles. Output vesicles are generated after coupling of the first particle with the second particle. A vesicle generally includes an interior and an exterior boundary. A vesicle interior sometimes is a first fluid and the exterior boundary is defined by an exterior second fluid in which a set of vesicles exists. In such instances the first fluid generally is not substantially miscible with the second fluid (e.g., the first fluid is aqueous and the second fluid is non-aqueous). A vesicle can include one or more layers and/or shells. A vesicle boundary sometimes is a permeable, semi-permeable or substantially impermeable layer. A layer can include one material or combination of materials described herein. Particles can exist within a vesicle interior, sometimes exist in a layer of a vesicle (e.g., exist in an inner layer, exist in an outer layer), or can exist in a vesicle interior and vesicle layer. A vesicle sometimes is a droplet or an emulsion.

Generally, vesicles include materials having the ability to form vesicles of a desired shape and size and that are compatible with the molecules stored in the vesicles. Vesicles sometimes include one or more polymers, non-limiting examples of which include: heat sensitive polymers, photosensitive polymers, magnetic polymers, pH sensitive polymers, salt-sensitive polymers, chemically sensitive polymers, polyelectrolytes, polysaccharides, peptides, proteins, and/or plastics. Polymers may include but are not limited to materials such as poly(N-isopropylacrylamide) (PNIPAAm), poly(styrene sulfonate) (PSS), poly(allyl amine) (PAAm), poly(acrylic acid) (PAA), poly(ethylene imine) (PEI), poly(diallyldimethyl-ammonium chloride) (PDADMAC), poly(pyrolle) (PPy), polyvinylpyrrolidone) (PVPON), poly(vinyl pyridine) (PVP), poly(methacrylic acid) (PMAA), poly(methyl methacrylate) (PMMA), polystyrene (PS), poly(tetrahydrofuran) (PTHF), poly(phthaladehyde) (PTHF), poly(hexyl viologen) (PHV), polyp lysine) (PLL), poly(L-arginine) (PARG), poly(lactic-co-glycolic acid) (PLGA).

A vesicle may include a polymer within the interior of the vesicle. In some instances, this polymer may be a porous polymer bead that may entrap interior molecules. In certain instances, the polymer may be a bead that has been previously swollen to create a gel. Non-limiting examples of polymer-based gels that may be used as inner emulsions of vesicles include sodium alginate gel, or poly acrylamide gel swelled with oligonucleotide bar codes or the like.

In certain instances, a vesicle is a gel bead comprising any of the polymer-based gels described herein. Gel bead vesicles may be generated, for example, by encapsulating one or more polymeric precursors into droplets. Upon exposure of the polymeric precursors to an accelerator (e.g., tetramethylethylenediamine (TEMED)), a gel bead may be generated.

A vesicle can include a surfactant, such as an emulsifying surfactant, non-limiting examples of which include non-ionic surfactants, anionic surfactants, hydrocarbon surfactants and fluorosurfactants. A surfactant may increase the stability of one or more components of a vesicle, such as an inner compartment that includes an oil.

A component of a vesicle, particularly a shell of a vesicle, may enable the vesicle to be disrupted with an applied stimulus. For example, a vesicle may be prepared from one or more heat sensitive polymers and/or may include one or more shells each including one or more heat-sensitive polymers. A heat-sensitive polymer may be stable under conditions used for storage or loading. Upon exposure to heat, a heat-sensitive polymer component may undergo depolymerization, resulting in disruption to the integrity of the shell and release of the inner materials of the vesicle to the outside environment. Non-limiting examples of heat-sensitive polymers include NIPAAm or PNIPAM hydrogel. A vesicle may also include one or more types of oil, non-limiting examples of which include hydrocarbon oils, fluorinated oils, fluorocarbon oils, silicone oils, mineral oils and vegetable oils.

Processes for preparing vesicles (e.g., droplets, emulsions) for use with a fluidic device are known (see, for example, US20140199731A1 and US20200400538A1).

Beads

A bead sometimes is porous, non-porous, solid, semi-solid, semi-fluidic, or fluidic. A bead sometimes is dissolvable, disruptable, non-degradable or degradable. Non-limiting examples of degradable beads include a photodegradable bead, a chemically degradable bead, and/or a thermally degradable bead. A bead sometimes is a gel bead, such as a hydrogel bead, for example. A gel bead may be formed from molecular precursors, such as a polymeric or monomeric species. A semi-solid bead may be a liposomal bead. Solid beads may include one or more metals including iron oxide, gold, and silver. In some cases, the beads are silica beads. In certain instances, a bead is substantially rigid (e.g., input particles flowed into the first fluidic channel sometimes may be rigid beads), and in certain implementations, a bead is flexible (e.g., second particle released from the second channel through a constriction). A bead sometimes is characterized by a stiffness of about 3 kPa to about 100 kPa, and sometimes is characterized by a stiffness of about 5 kPa to about 10 kPa.

In certain instances, a bead contains one or more molecular precursors (e.g., monomers or polymers), which may form a polymer network via polymerization of the precursors. In some cases, a precursor may be an already polymerized species capable of undergoing further polymerization via, for example, a chemical cross-linkage. In some cases, a precursor includes one or more of an acrylamide or a methacrylamide monomer, oligomer, or polymer. In some cases, a bead includes one or more prepolymers, which are oligomers capable of further polymerization. For example, polyurethane beads may be prepared using prepolymers. In some cases, the bead may contain individual polymers that may be further polymerized together. In some cases, beads may be generated via polymerization of different precursors, such that they include mixed polymers, co-polymers, and/or block co-polymers.

A bead may include natural and/or synthetic materials, including natural and synthetic polymers. Examples of natural polymers include proteins and sugars such as deoxyribonucleic acid, rubber, cellulose, starch (e.g. amylose, amylopectin), proteins, enzymes, polysaccharides, silks, polyhydroxyalkanoates, chitosan, dextran, collagen, carrageenan, ispaghula, acacia, agar, gelatin, shellac, sterculia gum, xanthan gum, Corn sugar gum, guar gum, gum karaya, agarose, alginic acid, alginate, or natural polymers thereof. Examples of synthetic polymers include acrylics, nylons, silicones, spandex, viscose rayon, polycarboxylic acids, polyvinyl acetate, polyacrylamide, polyacrylate, polyethylene glycol, polyurethanes, polylactic acid, silica, polystyrene, polyacrylonitrile, polybutadiene, polycarbonate, polyethylene, polyethylene terephthalate, poly(chlorotrifluoroethylene), poly(ethylene oxide), poly(ethylene terephthalate), polyethylene, polyisobutylene, poly(methyl methacrylate), poly(oxymethylene), polyformaldehyde, polypropylene, polystyrene, poly(tetrafluoroethylene), poly(vinyl acetate), poly(vinyl alcohol), poly(vinyl chloride), poly(vinylidene dichloride), poly(vinylidene difluoride), poly(vinyl fluoride) and combinations (e.g., co-polymers) thereof. Beads may also be formed from materials other than polymers, including lipids, micelles, ceramics, glass-ceramics, material composites, metals, other inorganic materials, and others.

In some cases, a chemical cross-linker may be a precursor used to cross-link monomers during polymerization of the monomers and/or may be used to functionalize a bead with a species. In some cases, polymers may be further polymerized with a cross-linker species or other type of monomer to generate a further polymeric network. Cross linking sometimes is permanent and sometimes is reversible depending on the crosslinker incorporated into a bead. Non-limiting examples of chemical cross-linkers (also referred to as a "crosslinker" or a "crosslinker agent" herein) include cystamine, gluteraldehyde, dimethyl suberimidate, N-Hydroxysuccinimide crosslinker BS3, formaldehyde, carbodiimide (EDC), SMCC, Sulfo-SMCC, vinylsilane, N,N'diallyltartardiamide (DATD), N,N'-Bis(acryloyl)cystamine (BAC), or homologs thereof. In some cases, a cross-linker includes cystamine. In certain instances, precursors (e.g., monomers, cross-linkers) that are polymerized to form a bead may include acrydite moieties, such that when a bead is generated, the bead also includes acrydite moieties. Acrydite moieties sometimes are attached to a polynucleotide that is incorporated into the bead.

A number of bead types can be obtained commercially, and processes for preparing beads are known. For example, see U.S. Pat. No. 2,474,911A; CA2563836C; and U.S. Pat. No. 6,372,813B1.

Output Vesicles

Active coupling devices and processes described herein can output a vesicle population comprising several vesicle subpopulations. In certain instances, the plurality of output vesicles includes: (i) a plurality of output vesicles comprising the target particle and the second particle, (ii) a plurality of output vesicles comprising target particle and not containing the second particle, (iii) a plurality of output vesicle containing no target particle and comprising the second particle, and (iv) a plurality of output vesicles not containing the target particle or the second particle 1040.

FIG. 15B illustrates a plurality of output vesicles 1060 produced by fluidic device 800 from a plurality of input vesicles 1030, and FIG. 16B illustrates a plurality of output vesicles 1060 produced by fluidic device 900 from a plurality of input particles 1000. Certain output vesicle subpopulations generated by devices and processes described herein are illustrated in FIG. 25A, FIG. 25B, FIG. 25C and FIG. 25D.

FIG. 25A illustrates a plurality 1067 of an output vesicle 1066 not containing the first particle 1002 or the second particle 1040. The amount of the plurality 1067 of an output vesicle 1066 compared to the fraction of the plurality of vesicles 1060 not containing the first particle 1002 can be considered a "true negative" subpopulation of the plurality of output particles 1060.

FIG. 25B illustrates a plurality 1069 of an output vesicle 1068 comprising first particle 1002 and not containing the second particle 1040. The amount of the plurality 1069 of an output vesicle 1068 compared to the fraction of the plurality of output vesicles 1060 comprising the first particle 1002 can be considered a "false negative" subpopulation of the plurality of output particles 1060.

FIG. 25C illustrates a plurality 1071 of an output vesicle 1070 containing no first particle 1002 and comprising the second particle 1040. The amount of the plurality 1071 of an output vesicle 1070 compared to the fraction of the plurality of output vesicles 1060 not containing the first particle 1002 can be considered a "false positive" subpopulation of the plurality of output particles 1060.

FIG. 25D depicts a plurality 1063 of the output vesicle 1062 comprising the first particle 1002 and the second particle 1040. The amount of the plurality 1063 of output vesicle 1062 compared to the fraction of the plurality of output vesicles 1060 comprising the first particle 1002 can be considered a "true positive" subpopulation of the plurality of output particles 1060.

Devices and processes described herein that actively couple a target particle with a second particle can significantly reduce the "false positive" subpopulation of the plurality of output particles 1060 compared to passive coupling approaches. In certain instances, devices and processes described herein can reduce the "false positive" plurality 1071 of the vesicle 1070 to about 0.1% to about 10% of the fraction of the plurality of output vesicles 1060 not containing the first particle 1002. At the same time, devices and processes described herein can yield (i) a "true positive" plurality 1063 of the output vesicle 1062 of about 80% to about 99.9% of the fraction of the plurality of output vesicles 1060 comprising the first particle 1002; (ii) a "true negative" plurality 1067 of output vesicle 1066 of about 80% to about 99.9% of the fraction of the plurality of vesicles 260 not containing the first particle 1002; and (iii) a "false negative" plurality 1069 of the vesicle 1068 of about 0.1% to about 10% of the fraction of the plurality of output vesicles 1060 comprising the first particle 1002.

Figure 26A:
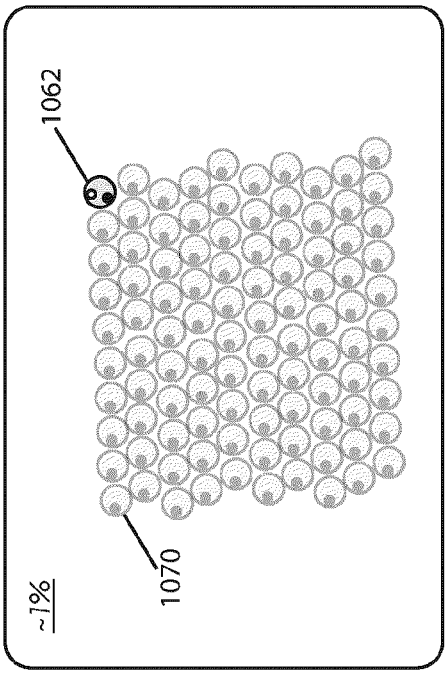
FIG. 26A, FIG. 26B, FIG. 26C and FIG. 26D illustrate different output vesicle subpopulations generated by devices and processes described herein.
Figure 26B:
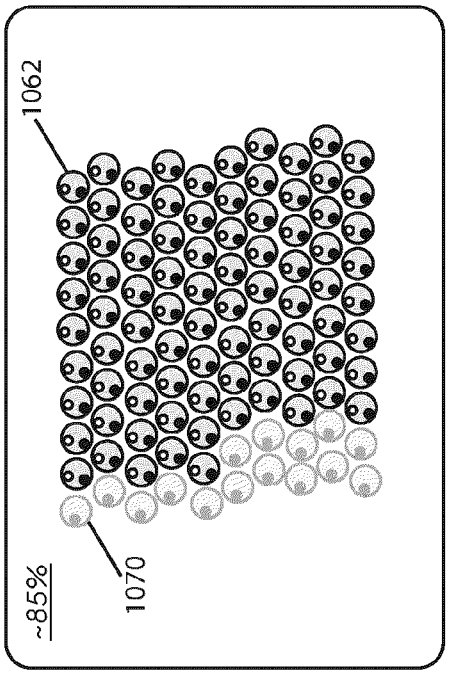
Figure 26C:
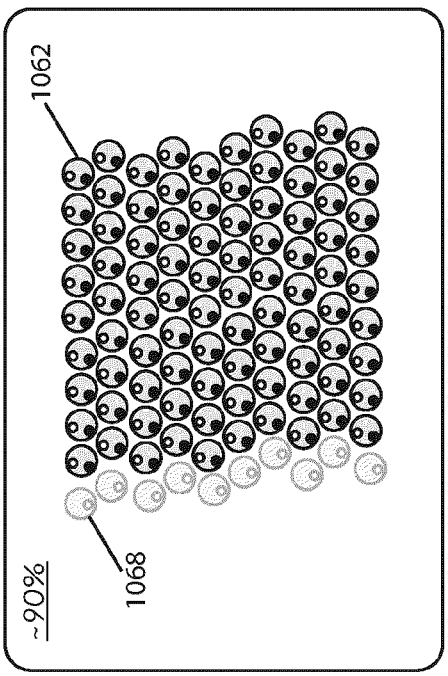
Figure 26D:
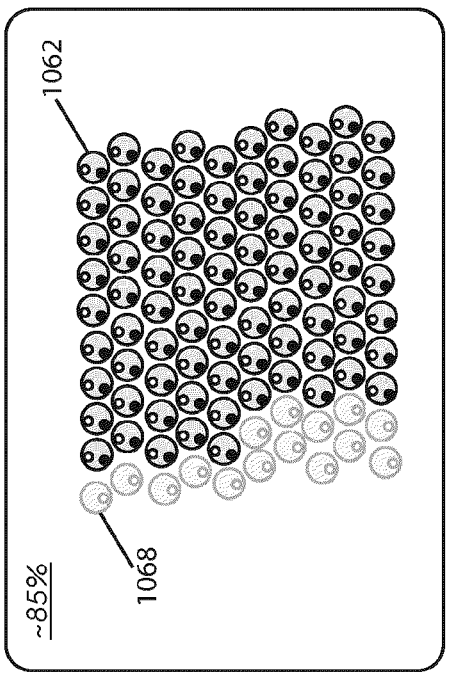

Devices and processes described herein that actively couple target particles with second particles can enhance second particle utilization compared to passive approaches while maintaining an efficient target particle capture rate. Results of a passive particle coupling approach are depicted in FIG. 26A, which illustrates a second particle capture rate of approximately 90% into output vesicles containing target particles, and FIG. 26B, which illustrates a first particle capture rate of approximately 1% into output vesicles containing second particles. Results of an active particle coupling approach are depicted in FIG. 26C, which illustrates a second particle capture rate of approximately 85% into output vesicles containing target particles, and FIG. 26D, which illustrates a target particle capture rate of approximately 85% into output vesicles containing second particles.

The specific "false positive" output vesicle subpopulation reduction, and enhancement of the target particle capture rate in particles containing second particles, described in the two paragraphs immediately above, afforded by active coupling devices and processes described herein, can be achieved when target particles exist in a plurality of input particles at a ratio of 1:10 or less compared to non-target particles, for example. Stated another way, these results can be achieved when 10% or fewer of the plurality of input particles 1000 includes the target particle 1002, or 10% or fewer of the plurality of input vesicles 1030 comprising a particle 1002 or particle 1004 includes the particle 1002, for example.

Output vesicles can be processed in any suitable manner. In certain implementations, one or more molecules or analytes contained in output vesicles may be analyzed, where the analysis often is facilitated by a second detectable feature associated with second particles. For implementations in which particles captured in the output vesicles are biological cells or microfluidic capsules, (i) particles can be exposed to lysis conditions or not exposed to lysis conditions; (ii) nucleic acid present in the particles can be exposed to nucleic acid processing conditions, non-limiting examples of which include conditions in which polynucleotide probes can be hybridized, nucleic acid can be cleaved, nucleic acid species can be separated, nucleic acid can be ligated, nucleic acid can be labeled, polynucleotides can be amplified and/or polynucleotides can be sequenced; (iii) polypeptides present in the particles can be exposed to polypeptide processing conditions, non-limiting examples of which include conditions in which polypeptides can be cleaved, polypeptide species can be separated, and one or more binding molecules (e.g., an antibody) can bind; or (iv) combinations of two or more conditions described in (i), (ii) and (iii).

Detectable Feature(s)

A detectable feature often is associated with input particles, and in particular, target particles, flowed through the first fluidic channel of a fluidic device. Any suitable detectable feature that can be detected at a detection zone of a fluidic device can be associated with target particles. A detectable feature associated with input particles, and in particular, target particles, is referred to as a "first detectable feature." Another detectable feature often is associated with particles in, and released from, the second channel of the fluidic device. A detectable feature associated with particles in the second fluidic channel is referred to as a "second detectable feature." The first detectable feature and the second detectable feature independently are selected. Any suitable combination of the first detectable feature and the second detectable feature can be selected so long as the first detectable feature and the second detectable feature can be independently detected (i.e., a detection signal associated with the first detectable feature can be resolved from a detection signal associated with the second detectable feature).

A set of target particles flowed into the first channel of a fluidic device can include a single type of first detectable feature, and sometimes a set of target particles includes multiple first detectable feature species. A set of second particles residing in the second channel of a fluidic device can include a single type of second detectable feature, and sometimes a set of second particles includes multiple second detectable feature species. A detectable feature sometimes is directly connected (e.g., chemically linked) to a particle, and a detectable feature sometimes is directly detected (e.g., the detectable feature emits light) or is indirectly detected (e.g., the detectable feature binds or alters an agent that is detected).

A detectable feature sometimes is a detectable label. Non-limiting examples of detectable labels include nucleic acid tags, nucleic acid indexes or barcodes, a radiolabel (e.g., an isotope), metallic label, a fluorescent label, a chemiluminescent label, a phosphorescent label, a fluorophore quencher, a dye, a protein (e.g., an enzyme, an antibody or part thereof, a linker, a member of a binding pair). Non-limiting examples of detectable labels include fluorescent labels such as organic fluorophores, lanthanide fluorophores (chelated lanthanides; dipicolinate-based Terbium (Ill) chelators), transition metal-ligand complex fluorophores (e.g., complexes of Ruthenium, Rhenium or Osmium); quantum dot fluorophores, isothiocyanate fluorophore derivatives (e.g., FITC, TRITC), succinimidyl ester fluorophores (e.g., NHS-fluorescein), maleimide-activated fluorophores (e.g., fluorescein-5-maleimide), and amidite fluorophores (e.g., 6-FAM phosphoramidite); radioactive isotopes (e.g., I-125, I-131, S-35, P-31, P-32, C-14, H-3, Be-7, Mg-28, Co-57, Zn-65, Cu-67, Ge-68, Sr-82, Rb-83, Tc-95m, Tc-96, Pd-103, Cd-109, and Xe-127); light scattering or light diffracting labels (e.g., light scattering gold nanorods, resonance light scattering particles); an enzymic or protein label (e.g., green fluorescence protein (GFP), peroxidase); or other chromogenic label or dye (e.g., cyanine). Non-limiting examples of organic fluorophores include xanthene derivatives (e.g., fluorescein, rhodamine, Oregon green, eosin, Texas red); cyanine derivatives (e.g., cyanine, indocarbocyanine, oxacarbocyanine, thiacarbocyanine, merocyanine); naphthalene derivatives (dansyl, prodan derivatives); coumarin derivatives; oxadiazole derivatives (e.g., pyridyloxazole, nitrobenzoxadiazole, benzoxadiazole); pyrene derivatives (e.g., cascade blue); oxazine derivatives (e.g., Nile red, Nile blue, cresyl violet, oxazine 170); acridine derivatives (e.g., proflavin, acridine orange, acridine yellow); arylmethine derivatives (e.g., auramine, crystal violet, malachite green); and tetrapyrrole derivatives (e.g., porphin, phtalocyanine, bilirubin).

A particle sometimes includes one member of a binding pair to which a second member of a binding pair containing a detectable label is specifically bound prior to flowing the target particle into the first fluidic channel. Non-limiting examples of binding pairs include avidin/biotin; an antibody/antigen; antibody/epitope; antibody/hapten; operator/repressor; nuclease/nucleotide; lectin/polysaccharide; steroid/steroid-binding protein; ligand/receptor; enzyme/substrate; Ig/protein A; Fc/protein A; Ig/protein G; Fc/protein G; Histidine polymers (e.g., a His tag) and heavy metals; a polynucleotide and its corresponding complement; the like or combinations thereof. A target particle sometimes includes an antigen (e.g., an antigen expressed by a biological cell) to which a binding agent (e.g., an antibody) containing a detectable label is specifically bound prior to flowing the target particle into the first fluidic channel.

In certain implementations, a first detectable feature can be optically detected. Non-limiting examples of detectable features that can be optically detected include a light emitting agent, light absorbing agent, light scattering agent and/or light diffracting agent (e.g., fluorophore or dye).

In certain implementations, the set of second particles residing in the second channel of a fluidic device, are associated with a second detectable feature that can be detected independently with respect to the first detectable feature. A second detectable feature can be an optically detected feature (e.g., fluorophore, dye). The set of second particles sometimes is a plurality of beads (e.g., hydrogel beads) to which a polypeptide or polynucleotide second detectable feature is associated.

A second detectable feature in certain implementations includes a diverse set of detectable species, and can include a plurality of different detectable feature species. In certain implementations, a polynucleotide associated with (e.g., chemically linked to) a second particle sometimes is a member of a plurality of barcode polynucleotides. The plurality of barcode polynucleotides also is referred to as a "barcode library," which often includes a minimum number of different polynucleotides (e.g., polynucleotides having different lengths, having different sequences, having the same length but different sequences, or having different lengths and different sequences). Each second particle in a set of second particles often contains multiple polynucleotides as the second detectable feature, and the polynucleotides on a particular second particle often are the same. Barcode libraries are useful for enhancing sequencing accuracy for implementations in which nucleic acid of target particles (e.g., biological cells) are sequenced (e.g., single-molecule sequencing of DNA or RNA in target particles). In certain implementations, a set of input particles includes biological cells, and include target cells (e.g., cancer cells) that express a particular antigen (e.g., cancer-specific antigen) to which a binding molecule (e.g., an antibody) containing a first detectable feature (e.g., a fluorophore) is specifically bound, and a set of second particles (e.g., containing hydrogel beads) is associated with a barcode polynucleotide library of sufficient diversity to enhance accuracy of sequencing (e.g., single-molecule DNA or RNA sequencing) of nucleic acid in target particles after the active coupling of target particles with second particles.

Polynucleotides of a barcode library associated with a set of second beads can be diverse and include about 100,000 to about 10 million distinct polynucleotides. Active coupling processes and devices described herein can couple a significant fraction of second particles containing these polynucleotides with target particles in vesicles, thereby applying diversity of the barcode library to vesicles containing target particles rather than to vesicles containing other non-target particles or no particles. Processes for manufacturing barcode libraries are known, and the polynucleotides of the barcode library often are directly linked to the beads (e.g., via linkages described herein). In certain implementations, (i) oligonucleotide tags are synthesized on a set of second particles to provide a set of second particles containing a barcode library as the second detectable feature using a split-and-pool approach (e.g., U.S. Ser. No. 10/669,583 and U.S. Ser. No. 10/876,147); (ii) oligonucleotide tags are synthesized on a set of second particles to provide a set of second particles containing a barcode library as the second detectable feature by a process taking advantage of terminal transferase activity (e.g., PCT/US2015/039080); or (iii) presynthesized oligonucleotide index tags are linked to a plurality of second particles to provide a set of second particles containing a barcode library as the second detectable feature.

In certain instances, a polypeptide antigen to which a binding molecule specifically binds is a second detectable feature associated with a set of second particles. The second detectable feature in such instances can include one polypeptide antigen or a plurality of different polypeptide antigen species. In certain implementations, a target particle (e.g., a biological cell) contains an antigen to which a binding molecule (e.g., an antibody) containing a first detectable feature (e.g., a fluorophore) is specifically bound, and the second particle (e.g., a hydrogel bead) is associated with (e.g., linked to) a polypeptide antigen to which a binding molecule specifically binds, the target cell and the second particle are coupled and captured in an output vesicle, and the polypeptide antigen associated with the second particle facilitates target cell identification or sorting (e.g., B-cell or T-cell sorting) or antibody sorting of antibodies that bind to the antigen.

Multiple detectable label types are commercially available and processes for associating a detectable feature with input particles and second particles are known. For example, (i) amine-reactive chemistry for coupling molecules to fluorophores (e.g., fluorescamine) and various dyes having NHS or sulfo-NHS moieties can be utilized (Sigma Aldrich); (ii) photoreactive carbene/nitrene chemistry making use of hetero-bifunctional crosslinkers (e.g., crosslinker containing amine-reactive N-hydroxysuccinimide (NHS) ester and a photoactivatable nitrophenyl azide; e.g., Sulfo-SANPAH) can be utilized (Fisher Scientific, Thermo Fisher); and (iii)

labelling with primary and/or secondary antibodies (AbCam, SantaCruz Biotechnology, Thermo Fisher) can be employed.

Fluids

Any suitable fluids that facilitate coupling of the first particle and second particle, and facilitate capture of the first particle and second particle in an output vesicle, can be utilized for the devices and processes described herein. A first fluid can be flowed in the first fluidic channel of a fluidic device described herein. The first fluid typically includes one or more target particles, a plurality of input particles, one or more input vesicles containing target particles, a plurality of input vesicles, or combination thereof. The first fluid often is flowed in the direction from the inlet of the first fluidic channel to the outlet of the first fluidic channel.

A second fluid contained in the second fluidic channel of a device described herein generally is flowed into the first fluidic channel at the interface at (junction between) first fluidic channel and second fluidic channel intersection. The second fluid can contain a second particle or a set of second particles. The second fluid often is flowed in the second fluidic channel in a direction (i) from the distal region of the second fluidic channel, to (ii) the proximal terminus of the second fluidic channel and interface with the first fluidic channel.

For device implementations that include a third fluidic channel (e.g., useful for processing input particles not contained in vesicles), a third fluid can be flowed in the third channel. The third fluid often flows through the third fluidic channel towards the first fluidic channel.

For device implementations that process input particles not contained in vesicles (e.g., see FIG. 16B), the first fluid generally contains a plurality of input particles and the first fluid and the second fluid often are miscible. In certain instances, the first fluid, or the second fluid, or the first fluid and the second fluid, each independently includes or is a polar solvent. A polar solvent often is an aqueous fluid containing or consisting essentially of water. Non-limiting examples of polar protic solvents include water, ammonia, formic acid, n-butanol, isopropyl alcohol, n-propanol, ethanol, methanol, acetic acid. Non-limiting examples of polar aprotic solvents include dichloromethane, ethyl acetate, acetone, dimethylformamide, acetonitrile, dimethyl sulfoxide, nitromethane and propylene carbonate. Often, the first fluid, or the second fluid, or the first fluid and the second fluid, each independently includes water, optionally one or more other polar protic solvents, optionally one or more aprotic polar solvents, or a combination of one or more protic polar solvents and one or more aprotic polar solvents.

For device implementations that process input particles not contained in vesicles, a device can include a third fluidic channel where the third fluid often interacts with the fluid in the first fluidic channel between the second fluidic channel and third fluidic channel (e.g., see region 959 of the first fluidic channel 902 in FIG. 16A), and forms vesicles. The third fluid often is immiscible with the fluid in the first fluidic channel between second fluidic channel and third fluidic channel (e.g., see region 959 of the first fluidic channel 902 in FIG. 16A). In certain implementations, the third fluid is a non-aqueous fluid, and sometimes the third fluid includes or is an oil, such as a fluorinated oil or a hydrocarbon oil or combination thereof, for example. Non-limiting examples of fluorinated oils include FC40 (3M®), FC43 (3M®), FC77 oil (3M®), FC72 (3M®), FC84 (3M®), FC70 (3M®), HFE-7500 (3M®), HFE-7100 (3M®), perfluorohexane, perfluorooctane, perfluorodecane, Galden-HT135 oil (Solvay Solexis), Galden-HT170 oil (Solvay Solexis), Galden-HT110 oil (Solvay Solexis), Galden-HT90 oil (Solvay Solexis), Galden-HT70 oil (Solvay Solexis), Galden PFPE liquids, Galden®SV Fluids and H-Galden®ZV Fluids. Non-limiting examples of hydrocarbon oils include mineral oils, light mineral oil, adepsine oil, albolene, cable oil, baby oil, Drakeol, electrical insulating oil, heat-treating oil, hydraulic oil, lignite oil, liquid paraffin, mineral seal oil, paraffin oil, petroleum, technical oil, white oil, silicone oils and vegetable oils. An oil sometimes is a fluorinated oil such as HFE-7500 oil, for example.

For device implementations that process input particles not contained in vesicles, a first fluid, second fluid, third fluid or combination thereof each optionally can include one or more salts and optionally can include one or more buffer agents. Buffer agents and salts are known, and a common buffer and salt combination utilized is in phosphate buffered saline. In certain implementations, a first fluid, second fluid, third fluid or combination thereof each includes one or more of: a detergent agent, a surfactant agent or an agent exhibiting detergent and surfactant properties. Non-limiting examples of surfactants include emulsifying surfactants, non-ionic surfactants (e.g., Triton X-100, Pluronic F127), anionic surfactants, hydrocarbon surfactants and fluorosurfactants. A first fluid sometimes contains components not present in the second fluid. In certain implementations, a first fluid contains cell culture media and/or a buffer specific for analytes or reagents (e.g., molecular biology reagents) also present in the first fluid and the second fluid does not contain such media, buffer, analytes and/or reagents contained in the first fluid. In certain instances, a first fluid contains no surfactant (e.g., contains no non-ionic surfactant) and a second fluid contains a surfactant (e.g., contains a non-ionic surfactant).

Device implementations that process input particles contained in vesicles (e.g., see FIG. 15B) sometimes do not contain a third fluidic channel. In such implementations, the first fluid often includes a plurality of input vesicles. The vesicles in a plurality of input vesicles often include an interior comprising an aqueous fluid. The first fluid flowed in the first fluidic channel sometimes is a non-aqueous fluid, which sometimes contains or consists of an oil (e.g., a fluorinated oil, hydrocarbon oil or combination thereof). In certain implementations, the second fluid and the aqueous fluid of the vesicle interior are miscible, and often the second fluid includes or is a polar solvent. The second fluid often includes or is water, another protic polar solvent, an aprotic polar solvent or combination thereof, and often the second fluid is an aqueous fluid. In certain implementations, the first fluid, or second fluid, or first fluid and second fluid, each optionally can include one or more salts, optionally can include one or more buffer agents, and optionally can include one or more agents exhibiting detergent and/or surfactant properties (e.g., optionally including a non-ionic surfactant agent).

Vesicles of the plurality of output vesicles often include an interior comprising an aqueous fluid (e.g., containing one or more polar solvents and optionally one or more of a salt, buffer, detergent, surfactant). The plurality of output vesicles often are in a non-aqueous output fluid (e.g., containing or consisting of an oil).

Fluids suitable for use in a fluidic device are known and commercially available, and processes for utilizing fluids in a fluidic device are known. Fluorous oils and surfactants are described in EP3191532B1, EP1538177B1, WO2017203280A1 and US20100099837A1, for example, and are commercially available (e.g., 3M, Darvin Microfluidics, Emulseo, BioRad, SphereFluidics). Aqueous solutions (e.g., buffers, media) are commercially available (Sigma Aldrich, Thermo Fisher).

Instrumentation

In certain implementations, a fluidic device described herein is utilized in conjunction with an instrument. A fluidic device (e.g., a chip (e.g., a PDMS chip) having multiple fluidic channels and optionally one or more wells) sometimes is mounted in an instrument, and the instrument often includes elements that interact with elements of the fluidic device. An instrument sometimes includes one or more of the following non-limiting elements that can interact with elements of a fluidic device: a mount manufactured to receive the fluidic device; one or more containment structures or containment structure ports manufactured to deliver a fluid to a fluidic channel in a microfluidic device; a fluid delivery system in association with a containment structure and/or a fluidic channel of a fluidic device (e.g., a system including one or more pumps and valves); elements of an optics system manufactured to detect a target particle at a detection zone in the fluidic device; a pressure generator system in fluid communication with a second fluidic channel of a fluidic device (e.g., a system including one or more pumps and valves); an electric field generator system manufactured to generate an electric field at a trap region of a fluidic device (i.e., at or near a constriction in the second fluidic channel of the fluidic device); a controller associated with one or more elements of the instrument; and one or more processors associated with one or more elements of the instrument.

Figure 27:
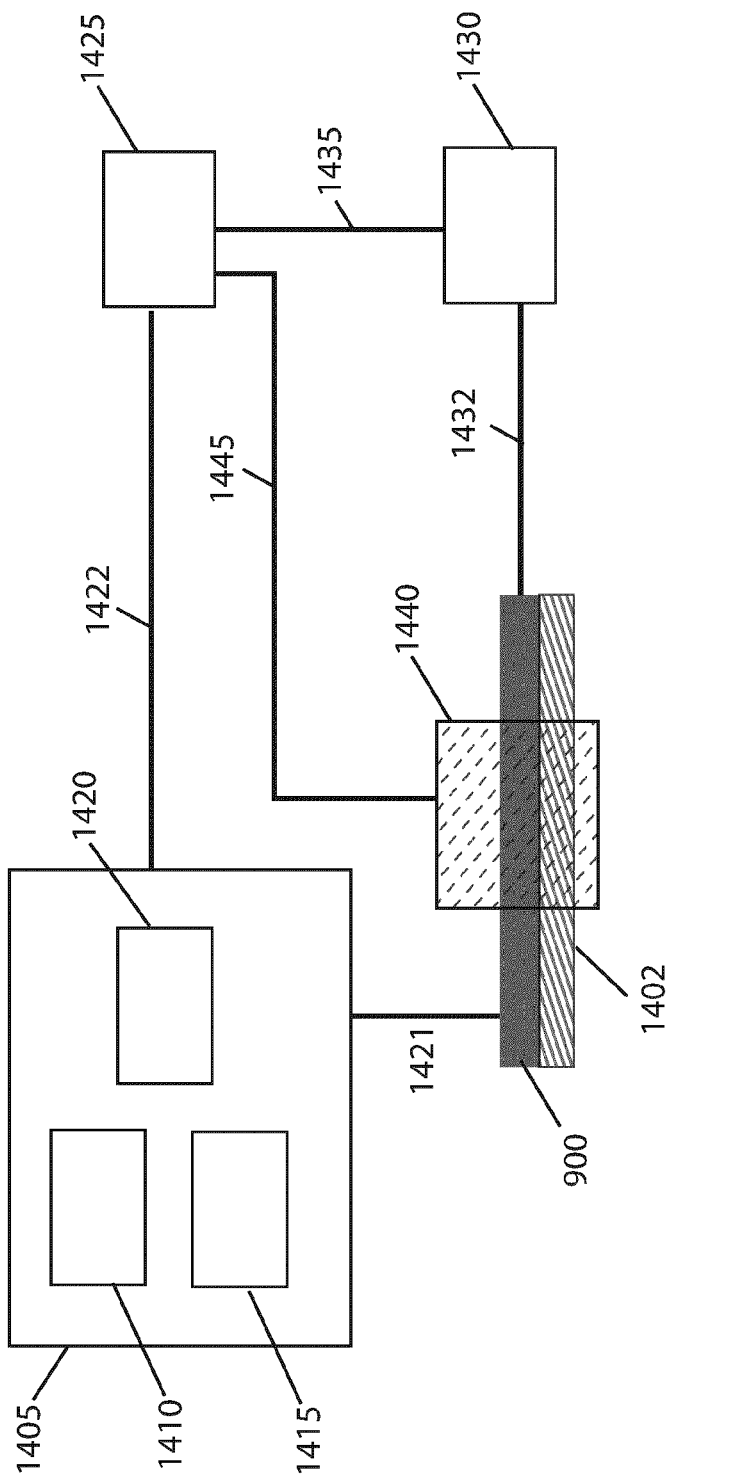
FIG. 27 illustrates an instrument 1400 that can be utilized in conjunction with a fluidic device.

In certain implementations, provided is an instrument 1400, an abstraction of which is illustrated in FIG. 27, that can be utilized in conjunction with a fluidic device. Fluidic device 900 is depicted in FIGS. 16A and 16B and any other suitable fluidic device could be utilized. In instrument 1400 device 900 is disposed in mount 1402, and is in proximity to an optics module 1405 manufactured to detect a target particle at the detection zone 950 at the first fluidic channel 902 of fluidic device 900. Optics module 1405 includes imaging sensor 1410, photon detector 1415, and illumination module 1420. Optics module 1405 sometimes includes one or more optical paths 1421 between the optics module 1405 and the fluidic device 900 or a region of the instrument 1400 in proximity to the fluidic device 900 (e.g., in proximity to detection zone 950 of fluidic device 900). Optics module 1405 sometimes includes one or more elements of, or is, optics module 30 described herein.

Instrument 1400 includes a pressure generator module 1430 in fluid connection with the second fluidic channel 920 of fluidic device 900. Pressure generator module 1430 sometimes is in fluid communication with one or more fluidic channels of a fluidic device (e.g., second fluidic channel 920) via one or more fluid lines from pressure generator module 1430 to the fluidic device 900. Pressure generator module 1430 sometimes includes one or more elements of, or is, pressure pulse generator module 20).

Instrument 1400 can include an electric field generator 1440 manufactured to generate an electric field at or near a region of the fluidic device 900 (e.g., at or near interface 926 and/or the trap region 928 of fluidic channel 900). Electric field generator module 1440 sometimes includes one or more elements of, or is, high-voltage pulse generator module 35 described herein.

Instrument 1400 sometimes includes a controller module 1425 manufactured to coordinate the releasing of the second particle 1040 from the second fluidic channel 920 in response to the detection of a target particle 1002 at detection zone 950. Controller module 1425 sometimes includes one or more elements of, or is, computer/processor 10 of FIG. 1A described herein.

Controller module 1425 (also referred to as "computer/processor 1425"), can include one or more of: a communication path 1422 to optics module 1405, a communication path 1435 to pressure generator module 1430 and a communication path 1445 to pressure pulse generator module 1440. A communication path independently may be physical (e.g., optical path, wired path) or non-physical (e.g., wireless signal). In certain implementations, controller 1425 is manufactured to actuate the pressure generator module 1430 in response to the detection of a target particle 1002 at detection zone 950. In certain instances, the instrument includes electric field generator 1440 and controller 1425 is manufactured to actuate the electric field generator 1440 in response to detection of a target particle 1002 at detection zone 950. To accommodate time required to detect a target particle 1002, optics module 1425 processing the detection signal(s), controller 1425 actuating the pressure generator modulator 1430 and/or the electric field generator 1440, and release of a second particle 1040 from the second fluidic channel 920 by the force generated by the pressure generator modulator 1430 and/or the electric field generated by electric field generator 1440, the first fluidic channel 902 can include a delay region 913 disposed between the detection zone 950 and the interface 926 for timely and accurate coupling of the target particle 1002 with the second particle 1040 in the first fluidic channel 902 (i.e., for release of the second particle 1040 in proximity to the target particle 1002).

Specific elements of an instrument that can be utilized in conjunction with a fluidic device for active particle coupling are described in greater detail hereafter. A specific implementation of an instrument suitable for active coupling of fluidic particles is described in U.S. provisional patent application No. 63/109,112, and described herein.

Optics Module

In certain implementations, an instrument suitable for active coupling of fluidic particles in a fluidic device includes an optics module. An optics module sometimes includes one or more of the following: illumination module(s), photon detector(s) and imaging sensor(s). An illumination module sometimes is manufactured to provide illumination in the first fluidic channel of the fluidic device, often at or near the detection zone of a fluidic device. A first fluidic channel sometimes is illuminated (i) in a region between the inlet of the first fluidic channel and the detection zone, (ii) at the detection zone, or (iii) illuminated in region (i) and zone (ii), by an illumination module. An illumination module can be manufactured to provide illumination at any suitable wavelength(s) for detection of a detectable feature associated with a target particle in the first fluidic channel, and the wavelength(s) typically is/are selected based on the type of detectable feature associated with the target particle. In a non-limiting example, a target particle is associated with a fluorophore having a particular excitation wavelength or range of wavelengths, and an illumination module can illuminate the first fluidic channel with light at the excitation wavelength or wavelengths. An illumination module can include any suitable elements for detection of the detectable feature associated with the target particle, such as a laser, prism, diffraction grating and the like, for example.

A target particle can be detected at the detection zone in the first fluidic channel of a fluidic device by an imaging sensor or photon detector or combination thereof. In a non-limiting example of a target particle associated with a fluorophore as a detectable feature, the fluorophore can emit light at an emission wavelength of wavelengths after being illuminated at an excitation wavelength of wavelengths, and the light emitted by the fluorophore can be detected by the imaging sensor, or photon detector, or combination thereof, at the detection zone. Any suitable imaging sensor or photon detector can be incorporated in an instrument for detecting a detectable signal associated with the first detectable feature of the target particle.

One or more elements of an optics module sometimes are directly adjacent to a first fluidic channel of a fluidic device, and sometimes operate with coordinated elements in the fluidic device. For example a fluidic device may include one or more optical channels and the optics module may provide illumination to one or more of the optical channels of the fluidic device, or detect illumination from one or more optical channels of the fluidic device. One or more elements of an optics module sometimes are separated by distance from the fluidic device in the instrument, and sometimes are in communication with the fluidic device (e.g., optical communication) via optical paths (e.g., optical fibers, a path that includes one or more prisms, and the like).

For a specific implementation illustrated in FIG. 26, instrument 1400 includes in optical module 1405. Optical module 1405 can include illumination module 1420 manufactured to provide illumination at the first fluidic channel 902 (e.g., at or near the detection zone 950) of fluidic device 900. Optical module 1405 in instrument 1400 can include imaging sensor 1410 and the photon detector 1415 manufactured to detect a target particle 1002 at the detection zone 950.

A specific implementation of an optics module suitable for active coupling of fluidic particles is described in U.S. provisional patent application No. 63/109,112, and described herein.

Pressure Generator Module

In certain implementations, an instrument suitable for active coupling of fluidic particles in a fluidic device includes a pressure generator system. A pressure generator system can be manufactured to exert a first pressure in the second fluidic channel in a direction from the distal region to the proximal terminus of the second fluidic channel. The first pressure can dispose a second particle at or near the constriction in the second fluidic channel, and sometimes orients another second particle at or near the constriction after the second particle is released from the second fluidic channel into the first fluidic channel. The first pressure applied in the second fluidic channel sometimes is about 1 kPa to about 10 kPa, and sometimes is about 1 kPa to about 5 kPa.

A pressure generator system can be manufactured to exert a pressure differential in the second fluidic channel. The pressure in the pressure differential can be exerted in a direction from the distal region to the proximal terminus of the second fluidic channel. A pressure differential typically includes a first pressure (e.g., the first pressure described in the previous paragraph) and a second pressure greater than the first pressure. In certain implementations, releasing a second particle from a second fluidic channel through the constriction into the first fluidic channel includes introducing a pressure differential in the second fluidic channel in a direction from the distal region to the proximal terminus of the second fluidic channel. The pressure differential often is exerted by the pressure generator in response to the detection of the target particle at the detection zone of the first fluidic channel, where the second pressure of the pressure differential releases the second particle from the second fluidic channel, through the constriction, and into the first fluidic channel in proximity to the target particle detected at the detection zone. In certain implementations, the pressure differential between the first pressure and the second pressure is about 0.5 kPa to about 10 kPa, about 1 kPa to about 20 kPa or about 1 kPa to about 50 kPa. In certain implementations, the first pressure is about 1 kPa to about 10 kPa, or 1 kPa to about 5 kPa, and the second pressure is about 1.5 to about 3 times the first pressure.

In certain instances, a pressure differential includes a third pressure occurring in time after the second pressure and is less than the second pressure and greater than the first pressure. The third pressure, when present, sometimes is about 0.9 to about 1.5 times the first pressure. The third pressure sometimes is a residual pressure and can be relieved by incorporation of a bleed line in fluid connection between the second fluidic channel to a well having a volume exceeding the volume of the second fluidic channel.

For an instrument implementation in which a second particle is released by a pressure force, the instrument oven includes a pressure generator system manufactured to exert pressure differential pulses. In certain implementations, the pressure generator is a pressure pulse generator and is manufactured to exert multiple pressure differential pulses in the second fluidic channel. Each of the pressure differential pulses typically includes a first pressure and a second pressure greater than the first pressure (e.g., as described in the previous paragraph). Each of the pressure pulses is applied to release a second particle from the second fluidic channel in proximity to a target particle detected at the detection zone. Each pressure pulse may have the same pressure differential and the same duration. Sometimes one pulse has a different pressure differential, or a different duration, or a different pressure differential and a different duration, than one or more other pulses delivered by the pressure generator system. Each pulse may have a pressure differential in a range described in the previous paragraph. Each pulse sometimes is about 1 ms to about 10 ms in duration, about 5 ms to about 100 ms in duration or about 1 s or greater in duration. In certain implementations, each of the pressure differential pulses is longer than about 2 milliseconds in duration and lower than about 25 kPa in pressure.

For an instrument implementation in which a second particle is released by application of an electric field, the instrument generally includes a pressure generator system that is manufactured to exert a constant pressure (e.g., a first pressure described above). The constant pressure typically maintains the fluid interface at or near the constriction in the second fluidic channel, and contributes to release of the second particle disposed at the interface when the interface breaks in response to an applied electric field (described in further detail herein). Such a pressure generator system may be capable of generating a pressure differential (e.g., pressure differential pulses) but applies a constant pressure for electric field-aided particle release implementations.

A fluidic device 900 illustrated in FIG. 16A, or a fluidic device having a second fluidic channel structure shown in FIG. 17 (fluidic device 1100), or FIG. 18 (fluidic device 1200), or FIG. 20 (fluidic device 1300) for example, can be utilized in conjunction with an instrument 1400 containing a pressure generator module 1430 manufactured to deliver pressure differential pulses. Such a combination is useful in particular for coupling particles when the target particle is in a set of input particles not contained in vesicles (e.g., plurality of input particles 1000). In a specific implementation, pressure generator module 1430 is a pressure pulse generator module manufactured to exert multiple pressure pulses, each including a first pressure and a second pressure greater than the first pressure, in the second fluidic channel 920 of fluidic device 900, for example. Each pressure in each pressure pulse causes fluid in the second fluidic channel 920 to flow in a direction from the distal region 922 to the proximal region 921 of the second fluidic channel 920.

Figure 23C:
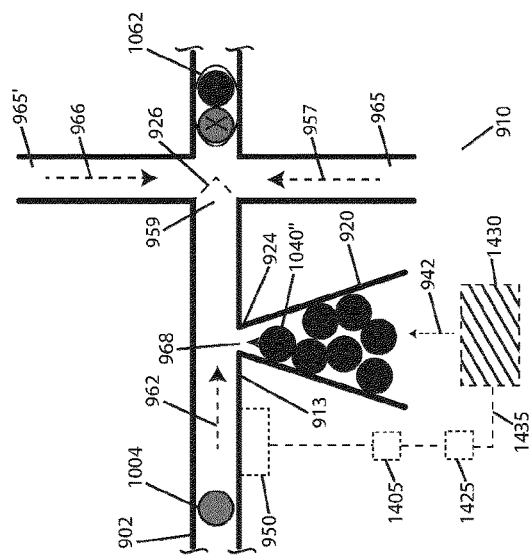
FIG. 23A, FIG. 23B and FIG. 23C illustrate configurations of fluidic device 900 at different time points when in use.
Figure 23B:
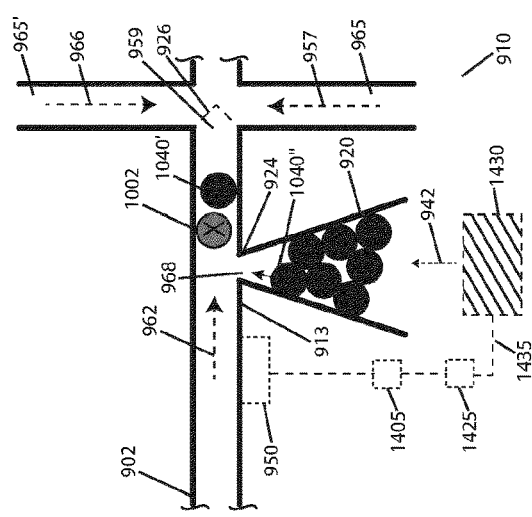
Figure 23A:
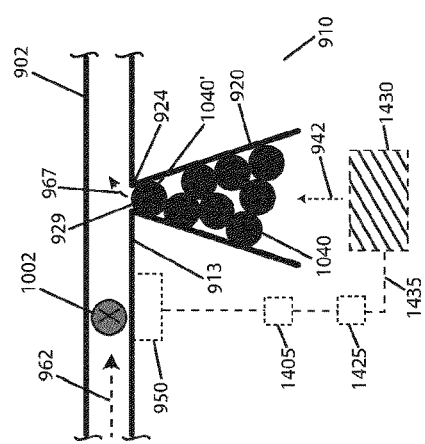

Active coupling of particles by a pressure pulse is illustrated in FIGS. 23A, 23B and 23C, for example. In FIG. 23A, target particle 1002 is detected in detection zone 950 of first fluidic channel 902 by optics module 1405. The detection event, including one or more detection signals, is processed and controller 1425 actuates pressure generator module 1430. Pressure generator module 1430 is a pressure differential pulse generator module that generates a pressure differential pulse. The second pressure of the pressure pulse, which is greater than the first pressure of the pressure pulse, causes fluid in the second channel 920 to flow in direction 942, thereby releasing second particle 1040' disposed at the proximal terminus 924 of the second fluidic channel, in direction 967, through constriction 929 of trap 928, into the first fluidic channel 902.

In FIG. 23B, the second particle 1040' has been released from the second fluidic channel 920 by the pressure differential pulse into the fluid stream in the first fluidic channel 902 (i.e., the fluid stream moving in the direction 962 in the first fluidic channel 902) and in proximity to the target particle 1002. Another second particle 1040" in second fluidic channel 920 flows towards the proximal terminus 924 in the direction 968, orienting the second particle 1040" at or near constriction 929, effectively reloading another second particle 1040" for release after another target particle 1002 is detected at detection zone 950. Second particle 1040" is effectively reloaded at the constriction 929 by pressure exerted by the pressure generator module 1430 (e.g., by the first pressure) in second fluidic channel 920.

After the coupled target particle 1002 and second particle 1040' flow past interface 926 and past the third fluidic channel 930, the coupled particles are captured in an output vesicle 1062, as illustrated in FIG. 23C. In certain implementations, a first fluid in the first fluidic channel 902 is an aqueous fluid; the second fluid in the second fluidic channel 920 is an aqueous fluid miscible with the first fluid, and often containing a surfactant; and the third fluid in the third fluidic channel 930 is a non-aqueous fluid (e.g., oil) that often is immiscible with the fluid in region 959 of the first fluidic channel 902. The fluid in the region 959 of the first fluidic channel 902 can contain a mixture of the first fluid and the second fluid after a second particle 1040 is released from the second fluidic channel 920.

As shown in FIG. 23C, a non-target particle 1004 is flowing towards the detection zone 950 in the first fluidic channel 902. The optics module 1405 should not register a detection event when the non-target particle 1004 flows past the detection zone 950, as the non-target particle 1004 does not include the detectable feature associated with the target particle 1002. As the non-target particle 1004 flows past the detection zone 950, the controller 1425 should not actuate the pressure generator module 1430, since there should be no detection event registered by the optics module 1405, and the pressure generator should not generate a pressure differential pulse. Because the pressure generator module 1430 should not generate a pressure pulse, second particle 1040" should remain disposed at constriction 929, or continue to orient towards constriction 929, within second fluidic channel 920, and should not be released into the first fluidic channel 902 fluid stream in proximity to the non-target particle 1004.

A specific implementation of a pressure generator module suitable for active coupling of fluidic particles is described in U.S. provisional patent application No. 63/109,112, and described herein.

Electric Field Generator Module

In certain implementations, an instrument includes an electric field generator system. The electric field generator system often is manufactured into an instrument in an orientation that permits application of an electric field at a trap region in which the constriction in the second fluidic channel and the second particle positioned for release are disposed. The electric field often is generated by the electric field generator system in response to detection of a target particle at the detection zone of the first fluidic channel, which releases the second particle from the second fluidic channel, through the constriction, and into the first fluidic channel in proximity to the target particle detected at the detection zone. Without being limited by theory, a constriction (e.g., about 10 micrometers to about 30 micrometers width) in the second fluidic channel at a trap region of a fluidic device contains a fluid interface (e.g., 826, 1326). The fluid interface generally is between the first fluid in the first fluidic channel and the second fluid in the second fluidic channel. A second particle generally is disposed at the interface by a constant pressure applied by a pressure generator system in the second fluidic channel in a direction towards the interface. Without being limited by theory, an electric field applied at a trap region can momentarily break the fluid interface in response to detection of a target particle, contained in an incoming vesicle for example, thereby releasing the second particle positioned for release from the second fluidic channel. Without being limited by theory, for implementations in which input particles are contained in input vesicles and flowed through the first fluidic channel, an electric field applied at a trap region can momentarily break the vesicle outer perimeter, facilitating capture of the second particle released from the second fluidic channel into the input vesicle containing a target particle detected at the detection zone of a first fluidic channel. Without being limited by theory, movement of the second particle released from the second fluid channel is motivated at least in part by the pressure applied to the second fluidic channel (e.g., constant first pressure described herein). The fluid interface sometimes is an interface between two immiscible fluids, and sometimes is between an aqueous fluid (e.g., second fluid in the second fluidic channel) and a non-aqueous fluid (e.g., first fluid in first fluidic channel; e.g., oil (e.g., fluorous oil)).

An electric field generator system sometimes is manufactured to generate an alternating electric field, and in certain instances, the electric field generator is manufactured to generate multiple alternating electric field pulses (e.g., an electric field pulse generator). An instrument that includes an electric field generator system often also includes a pressure generator system that at least exerts a constant pressure. A constant pressure generated by the pressure generator system can (i) in part release a second particle in the second fluidic channel disposed at the fluid interface that has been momentarily broken by an electric field, and/or (ii) position another second particle in the second fluidic channel at or near the constriction for release of the other second particle upon application of the electric field, thereby effectively reloading another second particle for release. The first pressure applied in the second fluidic channel sometimes is about 1 kPa to about 10 kPa, and sometimes is about 1 kPa to about 5 kPa.

An instrument that includes an electric field generator system sometimes includes a pressure generator system manufactured to generate pressure differential pulses. An instrument can in certain instances generate (i) pressure differential pulses and no electric field pulses for a set of input particles or input vesicles, (ii) electric field pulses and no pressure differential pulses for a set of input particles or input vesicles, (iii) electric field pulses and pressure differential pulses for a set of input particles or input vesicles, or (iv) electric field pulses and no pressure differential pulses for one set of input particles or input vesicles and pressure differential pulses and no electric field pulses for another set of input particles or input vesicles.

In certain implementations, (i) each of the electric field pulses generated by an electric field generator system is of the same amplitude, frequency and duration, or (ii) one or more of the electric field pulses has at least one characteristic (e.g., one or more of amplitude, frequency or duration) that differs from one or more other electric field pulses generated. In certain implementations, an electric field generator system is manufactured to generate alternating electric field pulses each having a root mean square amplitude of about 50 volts to about 500 volts. Each of the alternating electric field pulses sometimes includes a frequency of about 20 kHz to about 200 kHz, or about 40 kHz to about 70 kHz. Each of the alternating electric field pulses sometimes is of a duration of about 100 microseconds to about 10,000 microseconds.

In certain implementations, an electric field generator system includes two or more electrodes and the electrodes are about 100 micrometers to about 1000 micrometers apart from one another. In certain instances, a first fluidic channel of a fluidic device can be considered to have a first side on which the second fluidic channel proximal terminus is disposed, and an opposing second side, and the electrodes of the electric field generator system in the instrument are in proximity to the first side and the second side of the first fluidic channel. One or more electrodes of one polarity (e.g., negative polarity) can be in proximity to the first side of the first fluidic channel and one or more electrodes of the opposite polarity (e.g., positive polarity) can be disposed on the second side of the first fluidic channel (see, e.g., electrodes 1365, 1365' and 1365" in FIG. 20).

A fluidic device 800 illustrated in FIG. 15A, or fluidic device having a second fluidic channel structure shown in FIG. 20 (fluidic device 1300), or FIG. 17 (fluidic device 1100), or FIG. 18 (fluidic device 1200), for example, can be utilized in conjunction with an instrument 1400 containing an electric field generator module 1440 manufactured to deliver pressure differential pulses. Such a combination is useful in particular for coupling particles when the target particle is in a set of particles contained in input vesicles (e.g., plurality of input vesicles 1030). In a specific implementation, electric field generator module 1440 is an electric field pulse generator module manufactured to exert multiple electric field pulses, at the interface 826 in trap region 828, for example. Application of an electric field (e.g., an electric field pulse) can cause release of the second particle 1040 from second fluidic channel 820 through constriction 829 for (i) capture by an incoming input vesicle 1032 containing a target particle 1002 detected at detection zone 850 or (ii) coupling of an incoming target particle 1002 detected at detection zone 850 not contained in a vesicle.

Figure 24C:
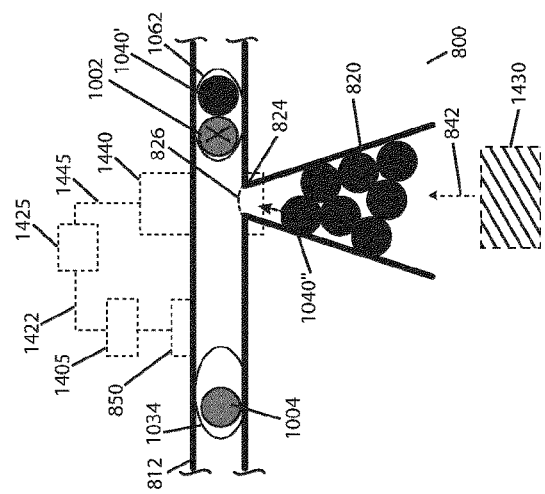
FIG. 24A, FIG. 24B and FIG. 24C illustrate configurations of fluidic device 800 at different time points when in use.
Figure 24B:
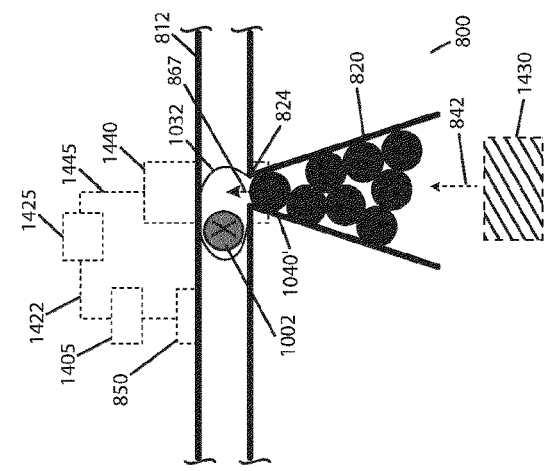
Figure 24A:
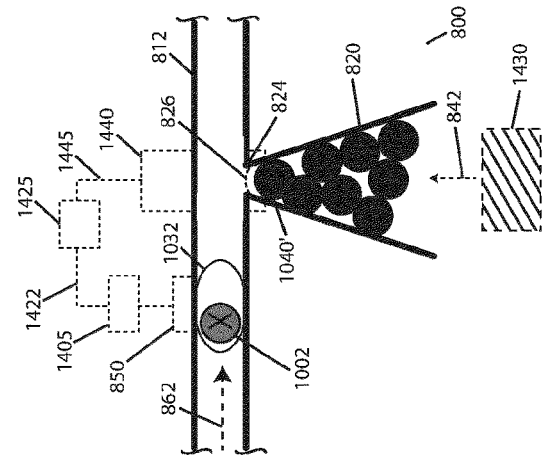

Active coupling of particles by an electric field pulse is illustrated in FIGS. 24A, 24B and 24C. In FIG. 24A, target particle 1002 contained in input vesicle 1032 is detected in detection zone 850 of first fluidic channel 802 by optics module 1405. The detection event, including one or more detection signals, is processed and controller 1425 actuates electric field generator module 1430. Electric field generator module 1440 is an electric field pulse generator module that generates an electric field pulse.

In FIG. 24B, the electric field pulse is at least part of a motivation that releases second particle 1040' disposed in the second fluidic channel 820 at interface 826, in direction 867, through constriction 829 in trap region 828, into the first fluidic channel 812. The electric field pulse also is at least part of the motivation that causes capture of second particle 1040' by the incoming input vesicle 1032 containing target particle 1002 detected at detection zone 850. Without being limited by theory, the electric field pulse (i) causes fluid interface 826 to momentarily rupture when the incoming input vesicle 1032 is in proximity to or in contact with the interface 826, and (ii) causes the outer perimeter of vesicle 1032 to momentarily rupture thereby permitting capture of the second particle 1040' by input particle 1032 to generate output particle 1062. Without being limited by theory, these momentary ruptures caused by the electric field pulse permits the fluid force in second fluidic channel 820, which is in direction 842, to motivate the second particle 1040 past the momentarily ruptured interface 826 and into the vesicle 1032 through its momentarily ruptured outer perimeter.

As illustrated in FIG. 24C, fluid interface 826 is restored after the electric field pulse subsists. Another second particle 1040" in second fluidic channel 820 flows towards the proximal terminus 824 in the direction 867, eventually orienting at or near interface 826, and effectively reloading another second particle 1040" for release after another incoming target particle 1002 is detected at detection zone 850. Second particle 1040" is effectively reloaded at the fluid interface 826 by pressure exerted by the pressure generator module 1430 in the instrument, which can apply a constant pressure in the second fluidic channel 820 in the direction 842 sufficient for orientation of second particles at interface 826 between applications of electric field pulses. In certain implementations, a first fluid in the first fluidic channel 802 is a non-aqueous fluid (e.g., oil (e.g., fluorous oil), and the second fluid in the second fluidic channel 820 is an aqueous fluid immiscible with the first fluid, and sometimes containing a surfactant.

As shown in FIG. 24C, a non-target particle 1004 contained in input vesicle 1034 is flowing towards the detection zone 850 in the first fluidic channel 812. The optics module 1405 should not register a detection event when the non-target particle 1004 contained in input vesicle 1034 flows past the detection zone 850, as the non-target particle 1004 does not include the detectable feature associated with the target particle 1002. As the non-target particle 1004 flows past the detection zone 850, the controller 1425 should not actuate the electric field generator module 1430, since there should be no detection event registered by the optics module 1405, and the electric field generator should not generate an electric field pulse. Because the electric field generator module 1440 should not generate an electric field pulse, second particle 1040" should remain disposed at interface 826, or continue to orient towards interface 826, and should not be released into the first fluidic channel 812 in proximity to the non-target particle 1004.

A specific implementation of an electric field generator module suitable for active coupling of fluidic particles is described in U.S. provisional patent application No. 63/109,112, and described herein.

Controller/Processor

A controller in an instrument can include one or more microprocessors, sensors and/or switches for coordinating actuation of a pressure generator module and/or an electric field generator module with a detection event registered by an optics module associated with a target particle flowing past a detection zone in a fluidic device. Stated another way, a controller can include components selected by the skilled person for coordinating (i) a detection event registered by an optics module, with (ii)(a) actuating a pressure generator module to generate a pressure differential pulse, and/or (ii)(b) actuating an electric field generator module to generate an electric field pulse. A controller also may coordinate actuation of other components in an instrument, such as one or more pumps and/or valves that flow fluid through the first, second or third fluidic channels, for example. One or more or all elements of a controller may be distributed among different modules of an instrument. A controller may include a microprocessor and switch in electrical communication with a pressure generator module and configured to actuate a pump and/or valve in the pressure generator module, and the microprocessor of the controller may be in electrical communication with a detector of the optical module for reception of a detection event signal from the optical module.

A specific implementation of a controller/processor suitable for active coupling of fluidic particles is described in U.S. provisional patent application No. 63/109,112, and provided herein.

Certain Instrumentation Elements

Certain instrumentation elements that can be employed with the fluidic devices and processes described herein are described in U.S. provisional patent application No. 63/109,112. Such instrumentation elements are described hereafter.

An optics module can include a first image sensor, a plurality of lasers, a fluorescence detector assembly and a second image sensor. The first image sensor defines a first image sensor optical path that intersects the selection zone of a microfluidic chip, and is constructed to capture images of the particles in that zone. The first image sensor optical path includes an objective with a numeric aperture of less than 0.3. The plurality of lasers define a laser optical path that intersects the detection zone of the microfluidic chip, and are constructed to induce fluorescence excitation in the particles. The fluorescence detector assembly defines a fluorescence detector optical path that intersects the detection zone, and is constructed to detect the fluorescence excitation in the particles. The second image sensor defines a second image sensor optical path that intersects the detection zone, and is constructed to capture images of the particles in that zone. The second image sensor optical path includes an objective with a numeric aperture of greater than 0.3. A portion of the fluorescence detector optical path is along the laser optical path 130, and likewise, a portion of the second image sensor optical path 140 is along the laser optical path 130.

The optics module may have multiple fluorescence detectors within the fluorescence detector assembly to detect the particle fluorescence excitation at a plurality of wavelengths, including but not limited to the wavelengths of 405 nm, 452 nm, 525 nm, 600 nm, and 680 nm. The fluorescence detectors may be made of a silicon photomultiplier (SiPM). The lasers may emit laser light at a plurality of wavelengths, including but not limited to the wavelengths of 405 nm, 488 nm, 561 nm, and 638 nm. Separate light sources may be used to illuminate particles in the selections and detection zones, and those light sources may emit infrared light.

The image sensors may be constructed to capture and to transmit at least 2000 image frames/s with a latency time of less than 100 us.

A processor may be connected to the image sensors, the lasers and the fluorescence detector assembly. The processors may be programmed to perform the following steps: (a) determine when the SiPM detects a pulse of fluorescence excitation in excess of a discrimination threshold; (b) when the threshold is exceeded, (1) determine the number of photons detected by the SiPM during which the threshold is exceeded; (2) determine analog signal measurements detected by the SiPM at sample intervals during which the threshold is exceeded; and (3) determine a time during which the threshold is exceeded; (c) sum the analog signal measurements of step b(2); (d) normalize the sum of step (c) by the time in step b(3); (e) if the normalized sum of step (d) exceeds a threshold, then output the normalized sum in step (d) and the time in step b(3); and (f) if the normalized sum of step (d) does not exceed a threshold, then: (1) normalize the number of photos in step b(1) by the time in step b(3); (2) based on the normalized photon count of step f(1), estimate an analog measurement; and (3) output the estimated analog measurement and the time in step b(3). Step f(2) is based on a lookup table associating total photon counts to estimated analog measurements, wherein the association is not linear. Based on the fluorescence measurements, the size and morphology of the particle can be estimated.

A pressure pulse generator module can include a processor, and a plurality of subassemblies, with one of the plurality connected to the chip inlet and one to the chip outlet. Each in the plurality of subassemblies includes a first pump, a second pump, a first solenoid valve, a second solenoid valve, an outlet and valve control circuits for each solenoid valve. The first pump creates a pressure that is lower than the pressure created by the second pump. The first pump connected to the processor and delivers a pressure to the first solenoid valve, which is constructed to allow fluid communication between the first pump and either a vent or the second solenoid valve. The second pump is connected to the processor and delivers a pressure to the second solenoid valve. The outlet is connected to the second solenoid valve, the second solenoid valve is further constructed to allow fluid communication between the outlet and either the second pump or the first solenoid valve.

A pressure pulse generator module may include four subassemblies, three of which are connected to the microfluidic chip inlets and one of which is connect to the outlet. Each subassembly may have pressure sensors and expansion volume to better control the released pressure.

The processor may be programed to actuate the first solenoid valve and the second solenoid valve to create a pressure pulse that starts at substantially the first pressure (i.e., pressure from the first pump) and increases to substantially the second pressure (i.e., pressure from the second pump) and returns to substantially the first pressure.

A high-voltage pulse generator module can be utilized with a microfluidic device. The high-voltage pulse generator module includes a direct digital synthesis (DDS) module constructed to produce a modulated wave form; a power amplifier connected to the DDS constructed to receive and amplify the modulated wave form; a high-voltage transformer constructed to produce a high-voltage pulse based on the amplified modulated wave form; and a processor connected to the DDS module, the power amplifier and the high-voltage transformer, the processor constructed to perform the following steps: provide a control signal to the DDS module; receive current data from the power amplifier; receive voltage data from the high-voltage transformer; and adjust the control signal to the DDS module based on the current and voltage data. The high-voltage pulse generator module may also have an analog switch constructed to interrupt the reception of the modulated wave form by the power amplifier, wherein the analog switch is connected to and controlled by the processor.

Image processing methods are also disclosed. These methods may be used with a system for selective microfluidic particle processing that includes a microfluidic chip with a particle flow through a detection zone, an optics module with an image sensor constructed to capture and transmit images of particles in the detection zone and a processor connected to the optics module and configured to perform the method. The first method, performed by the processor, includes the steps of: (a) obtaining a plurality of images from the image sensor; (b) identifying a line within the plurality of images that is central to the flow of the particles; (c) from each image in the plurality of images, extracting a portion of the images corresponding to the line identified in step (b); (d) plotting the portions from step (c) as a kymograph; (e) performing a radon transform on the kymograph; and (f) estimating the particle speed based on a dominant line angle in the transformed kymograph. The second method, performed by the processor, includes the steps of: (a) obtaining an image from the image sensor; (b) resizing the image; (c) applying a regression-based channel segmentation model to the resized image; (d) based on the post-modeled image of step (c), identifying within the resized image a channel in the microfluidic chip that contains particles; (e) applying a semantic segmentation model to the identified channel; and (f) based on the post-modeled image of step (e), identifying within the resized image the boundary of the particles 630.

Any one, or a combination of two or more, three or more, four or more, or all of the foregoing optics module, pressure pulse generator module, high voltage generator module, image processing methods and novel hinge may be used in systems, instruments and/or methods for operation of a microfluidic device, such as, for example, a microfluidic chip. In some embodiments of systems and instruments provided herein, one or more of the foregoing optics module, pressure pulse generator module, high voltage generator module, image processing methods and novel hinge may be integrated into a larger, multicomponent system for selective microfluidic particle processing.

Provided herein are functional modules for use in the operation of microfluidic devices, such as, for example, microfluidic chips. Also provided are systems and instruments that include one or more of the functional modules described herein. Such systems and instruments provide for manipulation, analysis and/or sorting of microfluidic particles, such as, for example, particles containing biological analytes. Systems and instruments provided herein perform any of one or more functions. For example, in some embodiments, systems and instruments provided herein are used for particle detection and analysis, such as in the classification of flowing particles, which has several applications, including, for example, in particle selection determinations. In one embodiment, particle detection and analysis are performed, at least in part, using an integrated fluorescence analysis module or using a combination of fluorescence analysis and synchronized image sensor classification. In some embodiments, systems and instruments provided herein are used for particle sorting, such as in the selective manipulation of particles at high speed and with finesse. In one embodiment, particle sorting is conducted using electric fields, and/or pressure pulses, for example for hydrogel-based particles or cells. In some embodiments, systems and instruments provided herein are used to perform particle detection and analysis and sorting. In particular embodiments, provided herein are fully integrated systems for performing multi-step and high-efficiency processing of particles, e.g., particles containing elements of a biological sample, for example, at single-cell resolution, that provide for synchronization of diverse functional modules within the system or instrument. In some such embodiments, the system or instrument uniquely integrates real-time as well as non-deterministic processing algorithms and micromanipulation technologies. This integration, in some embodiments, provides for selection of microfluidic particles moving at high speeds, while using comparatively slow neural network processing or pulsed pressure micromanipulation methods.

Particular embodiments of systems and instruments provided herein include a combination of the following modules provided herein: an optics module and a pressure pulse generator module or high-voltage generator module. In some embodiments, systems and instruments provided herein include a combination of the following modules provided herein: an optics module, a pressure pulse generator module or high-voltage generator module and an image processing method. In some embodiments, systems and instruments provided herein include a combination of the following modules provided herein: an optics module, a pressure pulse generator module or high-voltage generator module, an image processing method and a hinge lid. In some embodiments, systems and instruments provided herein include a combination of the following modules provided herein: an optics module, a pressure pulse generator module and a high-voltage generator module. In some embodiments, systems and instruments provided herein include a combination of the following modules provided herein: an optics module, a pressure pulse generator module, a high-voltage generator module and an image processing method. In some embodiments, systems and instruments provided herein include a combination of the following modules provided herein: an optics module, a pressure pulse generator module, a high-voltage generator module, an image processing method and a hinge lid. In some of the foregoing embodiments of systems and instruments provided herein, a subset of the modules in the combination of modules may be used in some methods of operation of the system or instrument, whereas a different subset of the combination of modules may be used in other methods of operation of the system or instrument. Among the advantages of such multipurpose embodiments is the flexibility afforded to the user in terms of having the ability to conduct a variety of different processes using one integrated system or instrument.

The innovative overall architecture of embodiments of the integrated systems and instruments provided herein enables integration of particle detection, analysis and manipulation (e.g., sorting) for a reliable and synchronized operation. Combinations of the modules provided herein are designed to provide stable and reliable operation as well as flexibility for customizable uses (e.g., experiments) of systems and instruments that incorporate one or more of the modules. Structurally, the instruments are modularized and contain one or more, or all, of the following functional modules.

Pressure Pulse Generator Module: Fluid flow is controlled using a pulsed pressure module, which creates a pressure differential between different inlets and outlets within microfluidic chips. The module may contain pneumatic pumps, sensors and valves mounted on a printed circuit board (PCB) containing control electronics. The module is unique in its ability to create millisecond-duration pulses, which can be used, for example, for microfluidic particle sorting from a moving stream of microfluidic particles. The short pulses are made possible by the combination of sub-millisecond solenoid valves and a pair of expansion volumes for pressurizing and de-pressurizing the microfluidic channel at millisecond scale.

High Voltage Pulse Generator Module: For sorting, high speed may be achieved by using a modulated high-voltage pulse generator, which uses dielectrophoretic effects.

Optics Module: Low-latency particle analysis is provided by an optics module, which integrates multi-wavelength laser(s), fluorescence detector(s) and high-speed image sensors monitoring different chip regions. This analysis system is specifically designed to accommodate a wide range of optical detection requirements. This includes high dynamic range (80 dB) fluorescence pulse measurements over four different channels using several different wavelength lasers as an excitation source. In addition to pulse measurements, the system also provides an ability to record fluorescence signal profiles for microfluidic particle classification purposes. Fluid and microfluidic particle flow control is achieved by analyzing microfluidic particle images provided by a high-speed dual microscopy imaging system within the optic module. Two sets of different magnification objectives and image sensors can image diverse particles ranging from 2.5 um to 250 um and transfer images for AI-based image analysis designed to measure particle size, speed and type. This feedback is another innovative aspect of embodiments of the instrument systems provided herein, allowing compensation for variations in biological sample properties and chip fabrication.

These modules may be controlled by a microcontroller/computer, which includes sensors for measuring instrument temperature and vibration and controllers for actuating various auxiliary devices like microscopy illumination or the micro positioning stage. The goal is to integrate real-time event processing with computational algorithms on an operating system.

Microfluidic devices, e.g., chips, may be placed within the microscopy view and laser/fluorescence detection area using a micro-positioning stage and a microfluidic chip mount. Liquid samples outside the chip may be contained within sample holders accepting standard tubes commonly used in molecular biology. The sample holders also use standardized chromatographic tubing and connectors to avoid custom consumables. This reduces unnecessary and costly consumables needed to operate the instrument.

Functionally, systems and instruments provided herein are designed to be used in a laboratory environment in a tabletop format. The system or instrument may contain a front lid that ensures correct closing and opening positions by using a frame ensuring a specific opening trajectory and end stops. The frame is spring loaded for convenient use and to ensure the lid closes correctly. The innovative closing mechanism avoids background light contamination.

Sample preparation in connection with use of the integrated platforms in some embodiments involves pre-loading a biological sample and additional consumables within standard tubes, typically 0.5 mL, 1.5 mL Eppendorf tubes or 15 mL falcon tubes. The liquids to be injected from the tubes into a microfluidic device, e.g., a chip, are mounted on the instrument tube holders, and chromatography tubing is inserted into the liquids and chip inlets. Once the samples are secured, the chip is mounted. The lid is then closed, and the chip is then moved into the correct operating position to align the microscopy system and the fluorescence detector. In an exemplary process of utilizing a system or instrument, during normal operation, the instrument applies a pressure differential to move liquids within the chip. The process is filmed at high speed, and fluid/particle flow is monitored using image analysis; the process stabilized automatically. Diverse workflows are achieved by using different chip designs, which can be supplied by the user, who can also correctly position the chip. The user interface is then used to control the process at different levels of detail.

FIG. 1A provides an overview of an exemplary system for selective microfluidic particle processing 5, which includes a computer/processor 10, with a real-time signal processing subsystem 15, controlling a pressure pulse generator module 20, a high-voltage (HV) pulse generator module 35 and an optics module 30. The pressure pulse generator module 20 can introduce fluid from sample holders 25A, 25B and 25C into the microfluidic chip 27 in a precisely controlled quantity. The pressure pulse generator module 20 also controls the pressure of the outlet fluid sample holder 40A, which is used for sorting, as described below. Likewise, the HV pulse generator module 35 can create an electric field across the microfluidic chip 27 that is also used for sorting, as described below. The optics module 30, in combination with the illumination module 45 that may be included as part of the system 5, can capture image and florescence data and relay that data to the computer/processor 10 for particle identification and sorting verification, described in more detail in subsequent sections.

Figure 1B:
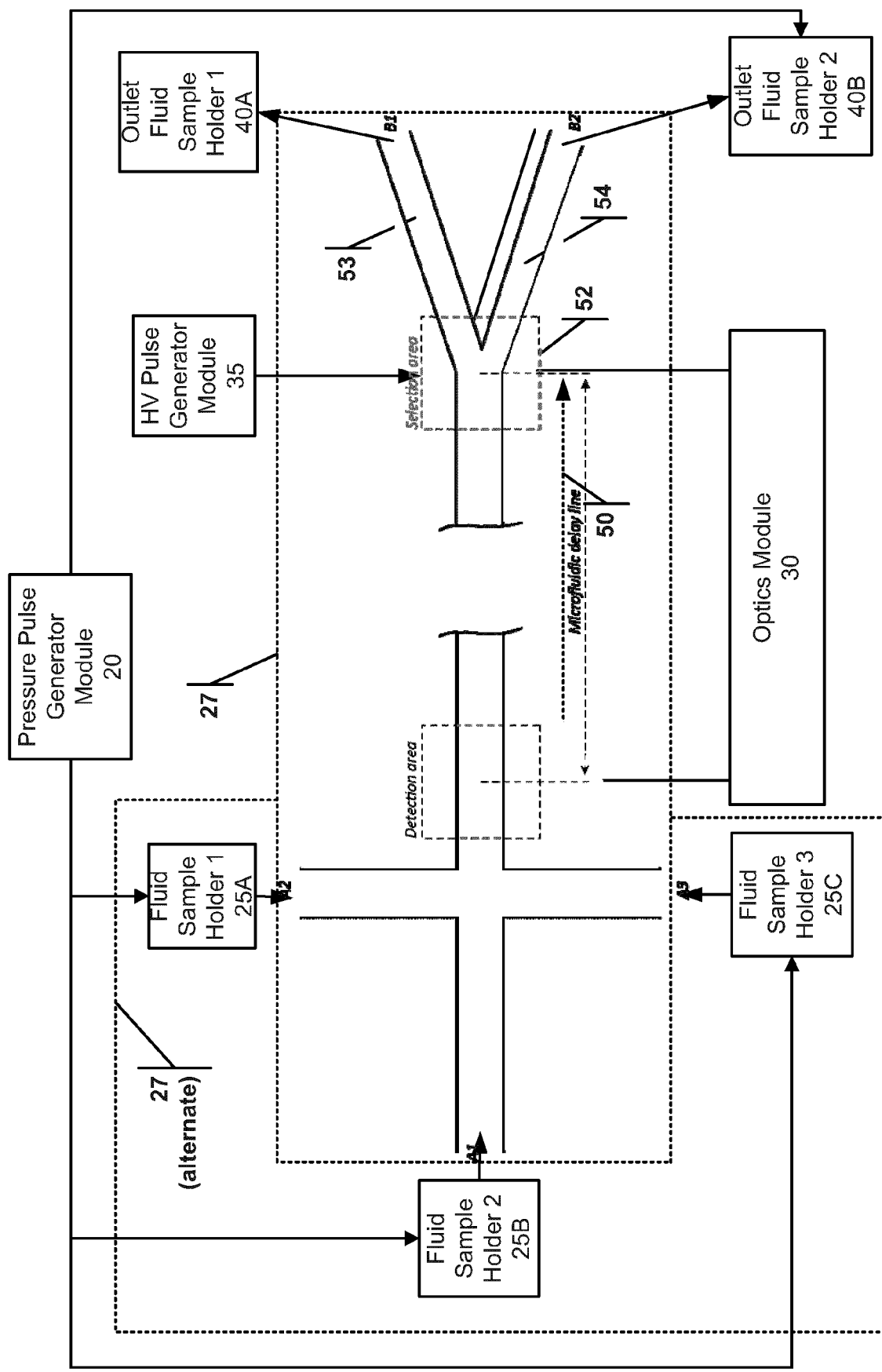
FIG. 1B illustrates a microfluidic delay line between a detection zone and a selection zone.

FIG. 1B illustrates the microfluidic delay line 50 between the detection zone 51 and the selection zone 52. An exemplary use of the system 5 is for microfiuidic particle selection to occur at high speed. Two areas on the microfluidic chip 27 are monitored by two image sensors in the optics module 30 and allow a microfluidic delay line 50, which adds a physical delay between the particle detection zone 51 and the selection zone 52. The delay line 50 allows analysis and manipulation processes, which take longer (>10 ms) than the time the particle spends in either the detection or selection zones (<5 ms). The optics module 30 captures images from the detection zone 51, which are then passed to the computer/processor for identification analysis, and once the images are analyzed, the HV pulse generator module 35 and/or the pressure pulse generator module 20 (connected to outlet fluid sample holder 40A) may be activated in the selection zone 52 to selectively direct the particles either into the restrictive sorting channel 53 or into the non-restrictive sorting channel 54. The delay line 50 provides the system 5 sufficient time to (1) identify the particle and (2) activate the pressure pulse on the outlet side, (and/or the high-voltage generator 35 described in more detail below) which in turn enables the selection of which channel (53, 54) the particle enters. The physical delay provided by the delay line 50 depends on the speed of the microfluidic particle flow and ranges from 10 ms to 1 s, which is the longest practical delay for stable and efficient operation. While FIGS. 1A and 1B illustrate the fluid sample holders (25A, 25B, 25C) as separate from the microfluidic chip 27, these fluid sample holders may be integrated into the chip 27.

Figure 1C:
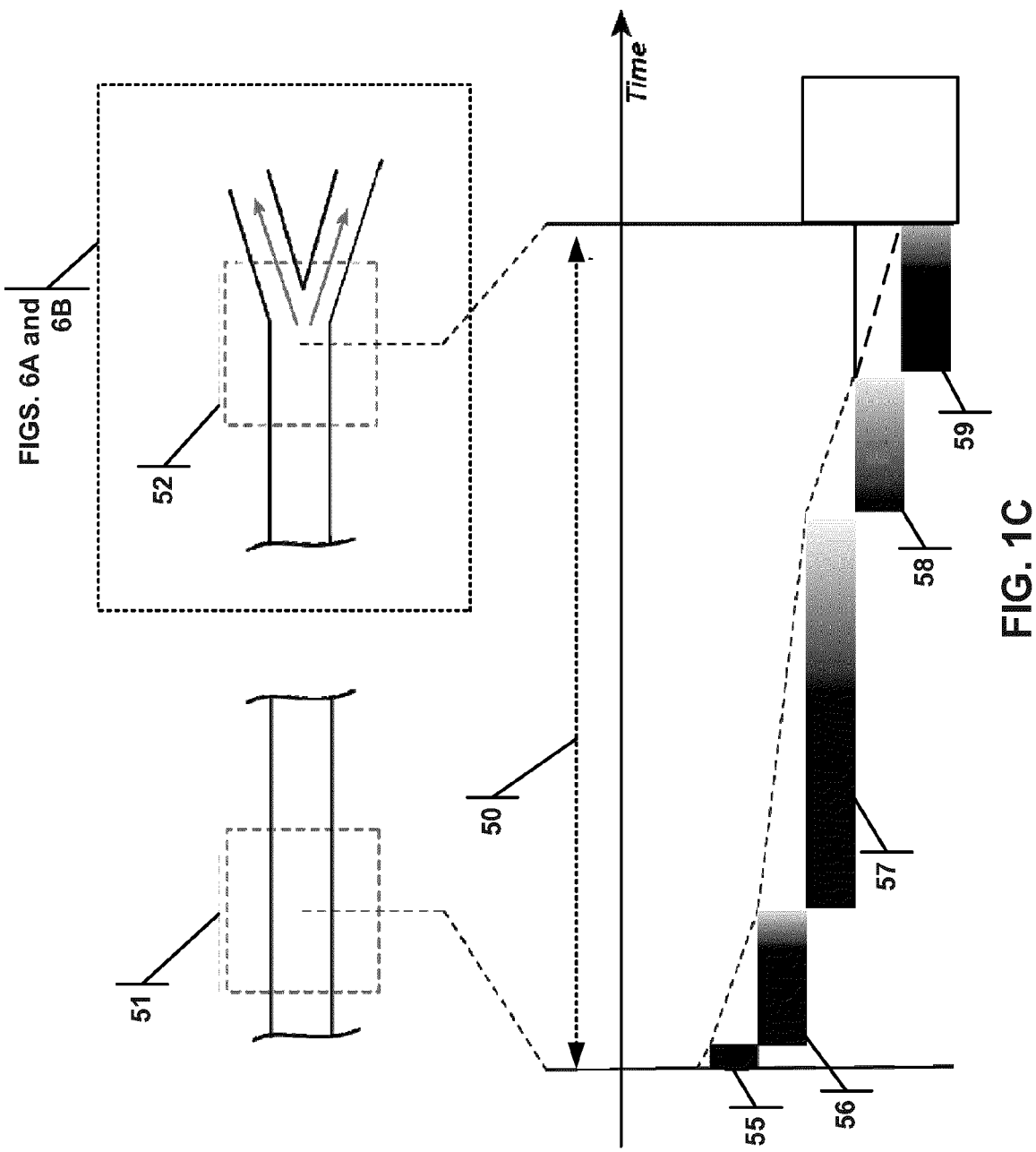
FIG. 1C graphically illustrates steps that may occur as a result of the delay line.
Figure 6A:
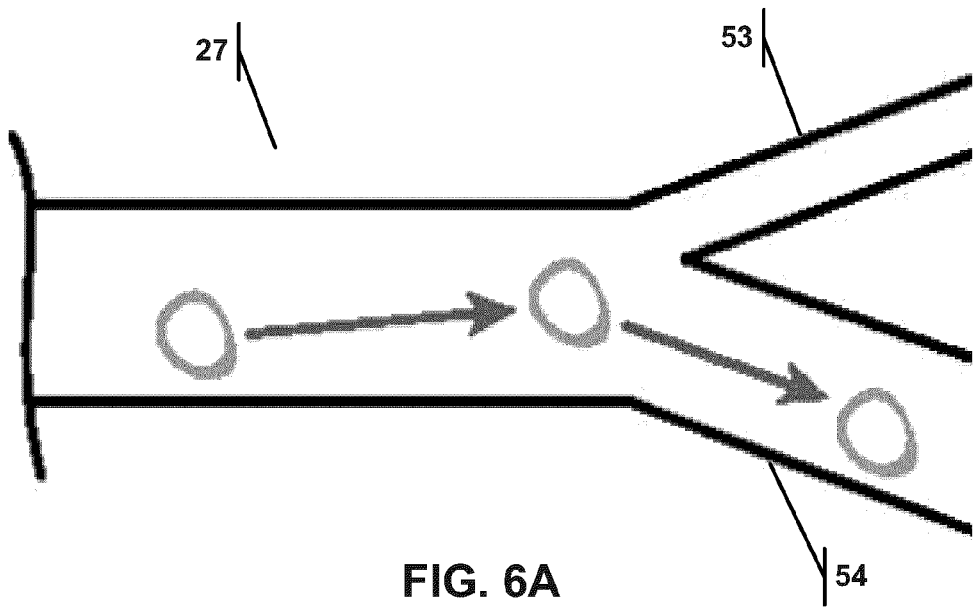
FIG. 6A demonstrates particle sorting where the particle favors traveling through a non-restrictive sorting channel.

The delay line 50 is further graphically illustrated in FIG. 1C. Within the delay interval, a trigger for one or more image sensors to capture an image can be generated (image sensor trigger time 55), the image is then transferred to the computing module (image transfer time 56) and analyzed using machine learning algorithms (analysis time 57), in response to which, a logical signal can be outputted (signal output time 58) for gating the selection signal, which triggers the particle sorting process (sorting trigger time 59). The sorting trigger time 59 indicates the length of time needed for the gate to fully transition after it has received the signal outputted by the controller/processor during the microfluidic delay. During the delay allowed by the delay line 50, the controller/processor 10 has imaged the particle by receiving data from the optics module 30, processed and analyzed the particle data with an algorithm, and actuated the pressure pulse generator module 20 by sending an output signal, actuated the high-voltage pulse generator module 35 by sending an output signal, or both. Also during the delay, the pressure pulse generator module 20 creates a pressure pulse at the chip outlet, the high-voltage pulse generator 35 creates high-voltage pulses, or both. The channel selection that occurs in the selection zone 52 will be discussed more closely in conjunction with FIGS. 6A and 6B.

Pressure Pulse Generator Module 20

FIGS. 2A through 5 illustrate the structure and performance of the pressure pulse generator module 20. The pressure pulse generator module 20 is designed to produce short and fast or long and stable pressure differentials within microfluidic chip channels for controlling the flow of microfluidic particles.

The pressure pulse generator module 20 is designed around independent pumps, which can create a positive or negative pressure differential within the microfluidic chip inlet and outlet. This pressure is monitored using pressure sensors and adjusted by venting valves. The system is designed to meet fast response time requirements for maintaining stable pressure (200 ms) and for creating pulses (2 ms). The use of high-speed solenoid valves, which are overdriven by voltage several times over the nominal range, allowing more current to pass during valve core magnetization, reduces opening and closing times towards the required specification.

A key pressure system specification is response time, which for the current system is under 10 ms. Within this time, the solenoid valve should open, let some air through to make a pressure pulse, and close. Looking at opening and closing time optimization, two factors that play a role are the core magnetization/demagnetization and the mechanical inertia of the plunger within the solenoid valve. For the best possible response time, a small solenoid valve with the light plunger can be chosen, provided that the solenoid valve has sufficient air flow. To optimize the core magnetization/demagnetization, a circuit is used that would overdrive core voltage during initial milliseconds to speed up the opening time of the high-speed solenoid valve. Circuits serving this function are called spike and hold circuits.

Figures 2A, 2B:
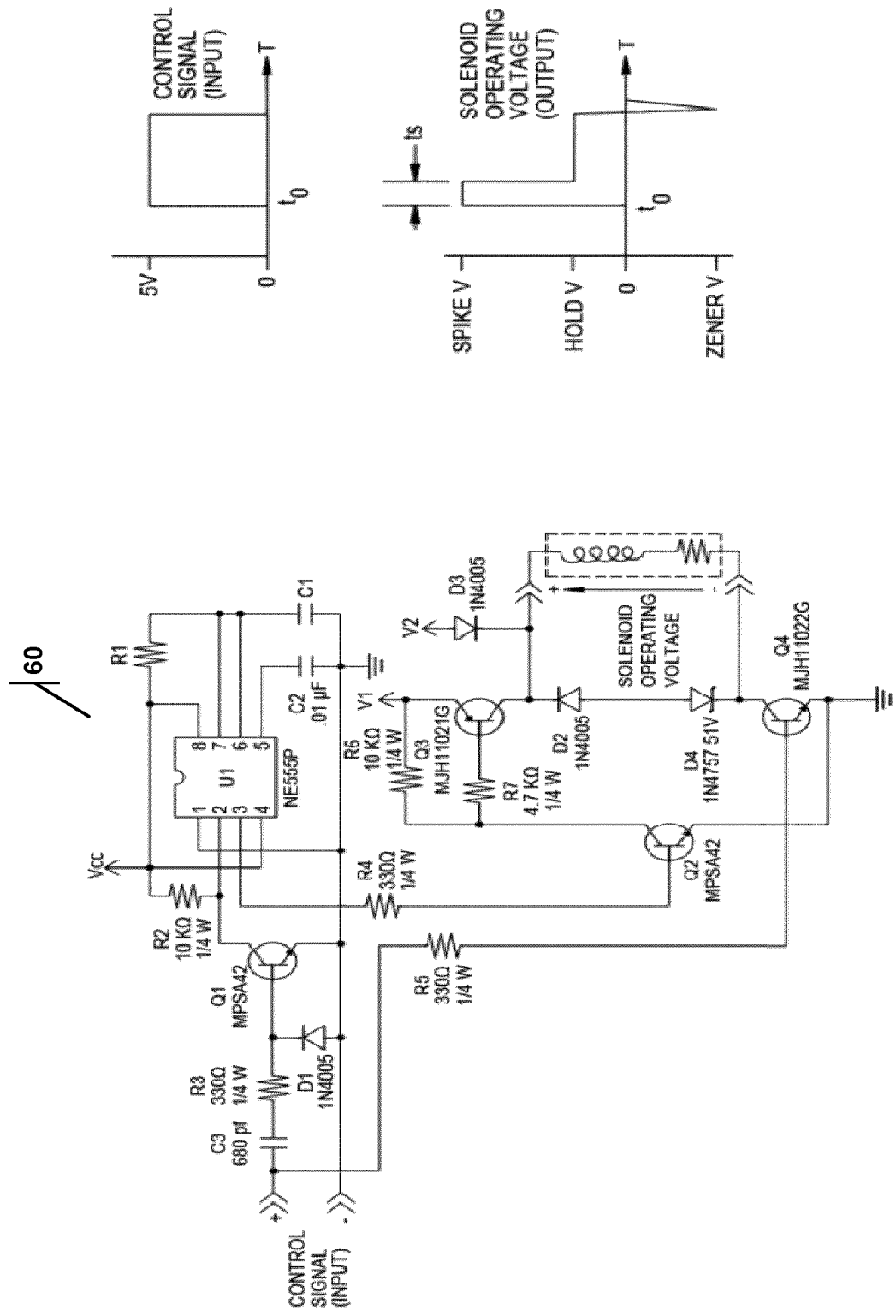
FIG. 2A illustrates a spike and hold circuit.
FIG. 2B presents graphs of a control signal input and solenoid operating voltage.
Figure 2C:
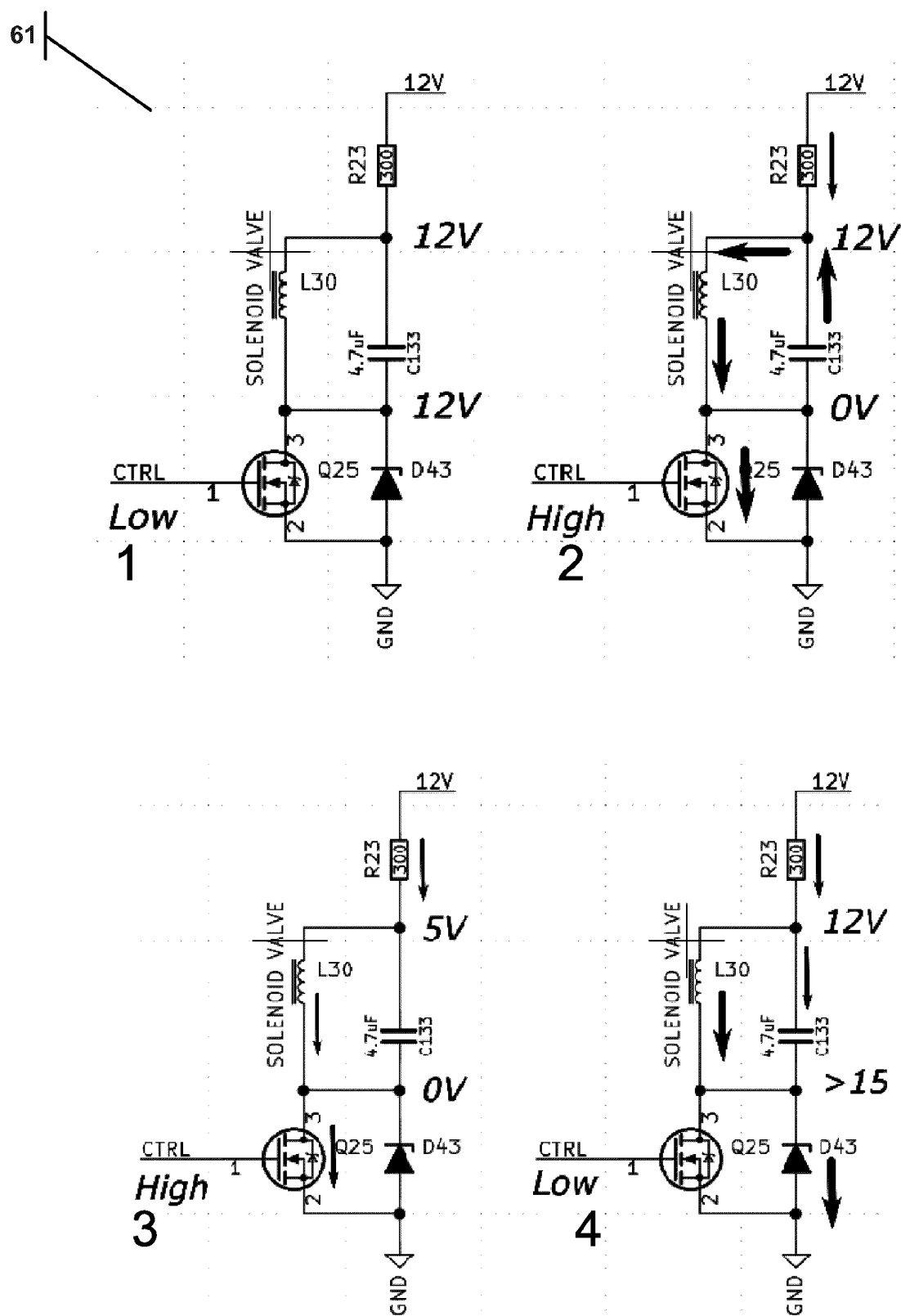
FIG. 2C illustrates operating states of a simplified solenoid valve control circuit.

One such spike and hold circuit 60 is shown in FIG. 2A, which produces an initial voltage spike (FIG. 2B). But a simplified and more convenient solenoid valve control circuit 61 can be implemented and is shown in FIG. 2C (states 1 to 4). To achieve valve overdrive consistently and safely, an RC tank is used, where a capacitor provides the initial voltage spike, and a resistor (matched to solenoid valve resistance) keeps the valve open at the rated voltage. This circuit is more convenient and less expensive in that is included of fewer components (which adds up quickly in multi-subassembly systems) than the spike and hold circuit, and it is easier to tune the circuit by varying the capacitor, rather than the NE555 timing of the circuit in FIG. 2A.

The solenoid valve control circuit shown in FIG. 2C includes a MOSFET used in parallel with a Zener diode and in series with a capacitor. The solenoid valve is connected in parallel with the capacitor, and a signal from the processor 10 controls a gate on the MOSFET. The solenoid valve control circuit 61 works by first discharging the capacitor (going from FIG. 2C state 1 to FIG. 2C state 2), which had been charged above the valve operating voltage. The capacitance is chosen so that the delivered charge is sufficient to speed up valve opening without damage. After the capacitor discharges, the valve is in a resistive divider network (FIG. 2C state 3) at its operating voltage, which keeps it open. At the end of the pulse, the MOSFET is switched off (FIG. 2C state 4), and the solenoid discharges through the Zener diode and the same capacitor until the voltages across each reach the same as that of the starting state 1. This design enables the system to open the solenoid valve quickly, preferably in under 10 ms.

Figure 3:
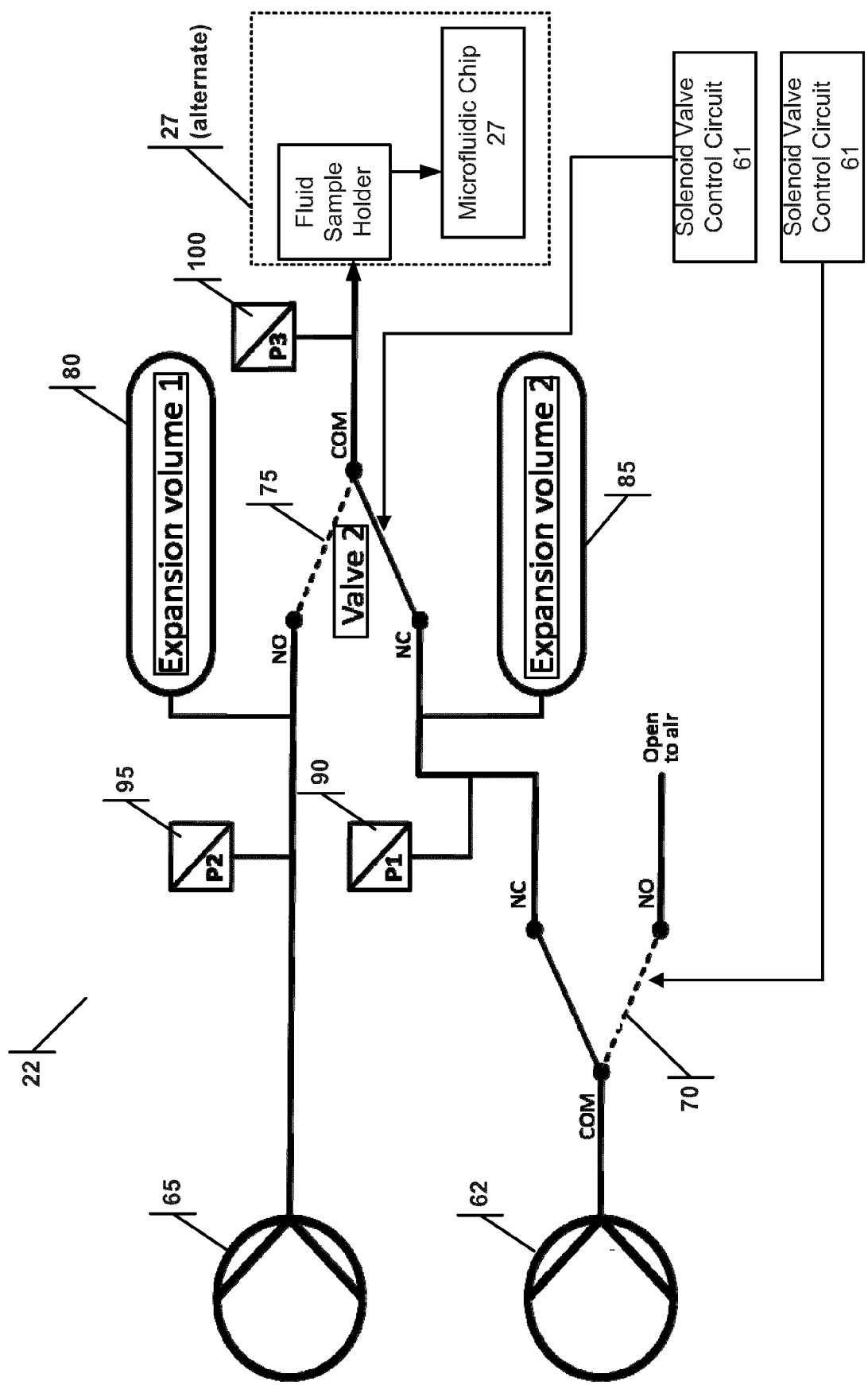
FIG. 3 illustrates a design of each subassembly in a pressure pulse generator module.

As illustrated in FIG. 1A, in an exemplary system, the pressure pulse generator module 20 has four subassemblies: three on the inlet of the microfluidic chip 27, and one on the outlet. More or fewer subassemblies may be used. The design of each subassembly 22 is shown in FIG. 3. Efforts in reducing pulse duration also resulted in optimization of the overall pneumatic system design, where two pumps are used to generate a baseline pressure (maintained by the first pump 62, the first solenoid valve 70 and the first pressure sensor P1 90) as well as a higher pressure (created by the second pump 65 with the help of the second pressure sensor P2 95). The second solenoid valve 75 would switch between normally connected (NC) and normally open (NO) positions, which would generate a pressure pulse measured by the third pressure sensor P3 100. The subassembly 22 may be connected to a fluid sample holder 25A which is then connected to the microfluidic chip or the fluid sample holder may be integrated into the microfluidic chip 27. The first solenoid valve 70 and second solenoid valve 75 are each controlled by a separate solenoid control circuit 61.

Figure 4B:
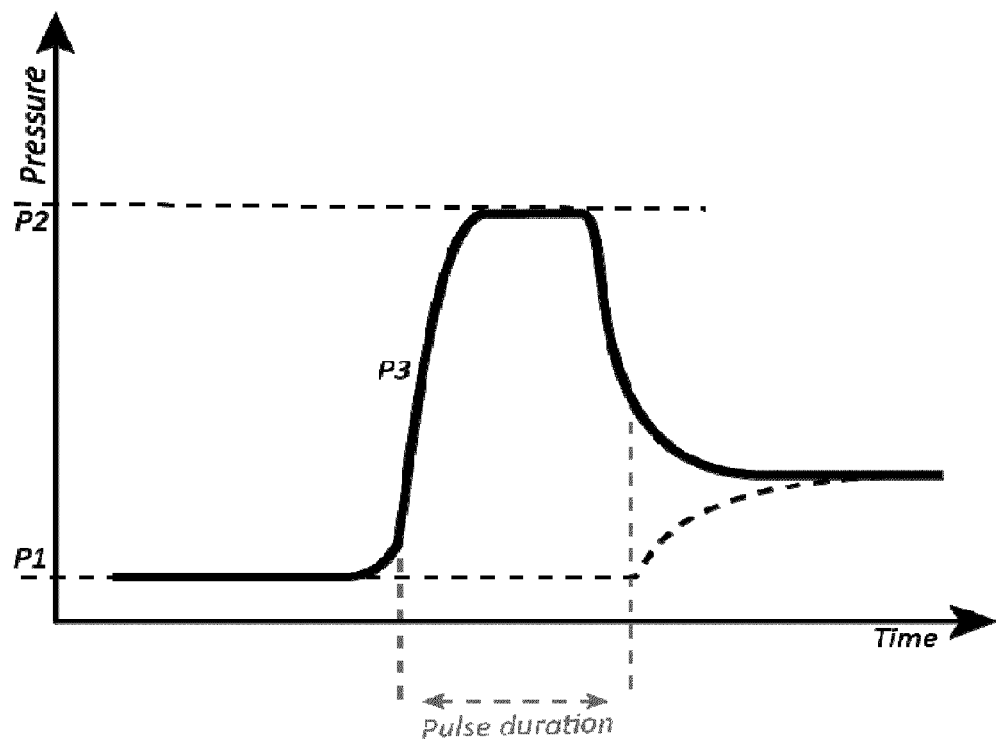
FIG. 4B presents a graph of a pressure profile when the expansion volume on the low-pressure side of the subassembly is too low.
Figure 4C:
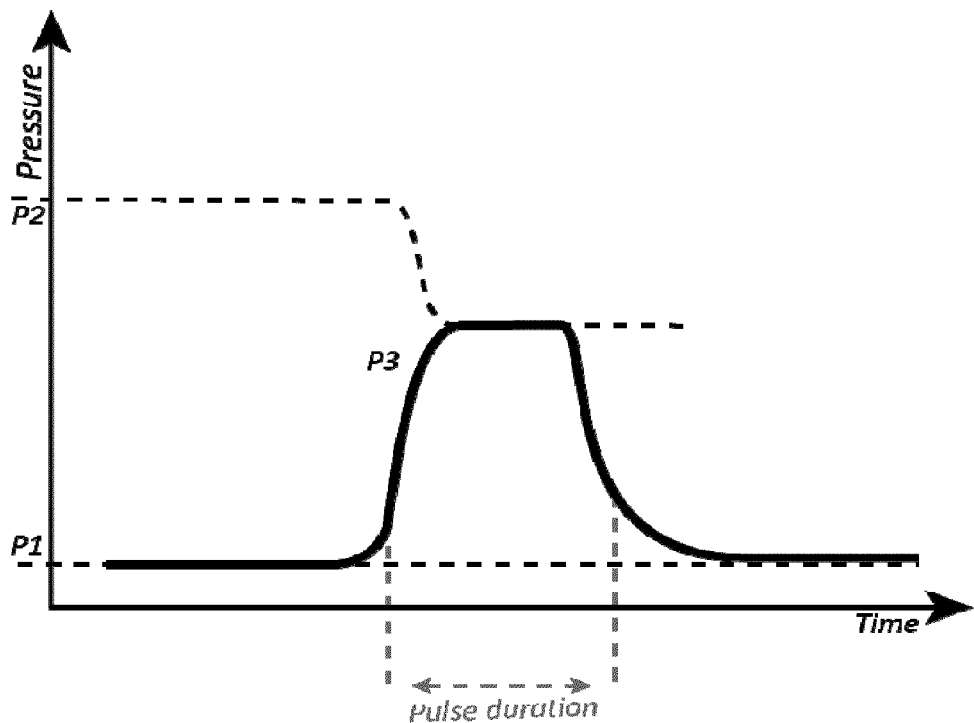
FIG. 4C presents a graph of the pressure profile when the expansion volume on the high-pressure side of the subassembly is too low.

In experiments, a commonly found problem was that the tubing connecting pneumatic pump system to the microfluidic chip 27 contained a significant volume, so that the desired pressure profile could not be generated. FIG. 4A illustrates the desired profile with the pressure reading from the second pressure sensor P2 95, the first pressure sensor P1 90 and third pressure sensor P3 100. To solve the problem, a first expansion volume 80 was added, which would supply sufficient volume to reach the desired pulse height, and a second expansion volume 85 was also added to achieve a complete return to the pressure baseline when the second solenoid valve 75 returns to the NC position. If the second expansion volume 85 is too low, the pressure profile shown in FIG. 4B is observed, and the residual pressure causes uncontrolled particle ejection. If the first expansion volume 80 is too low, the pressure profile shown in FIG. 4C is observed, during which the desired pressure pulse height cannot be reached. The expansion volumes were preferably >10 times the tubing volume.

Figure 5:
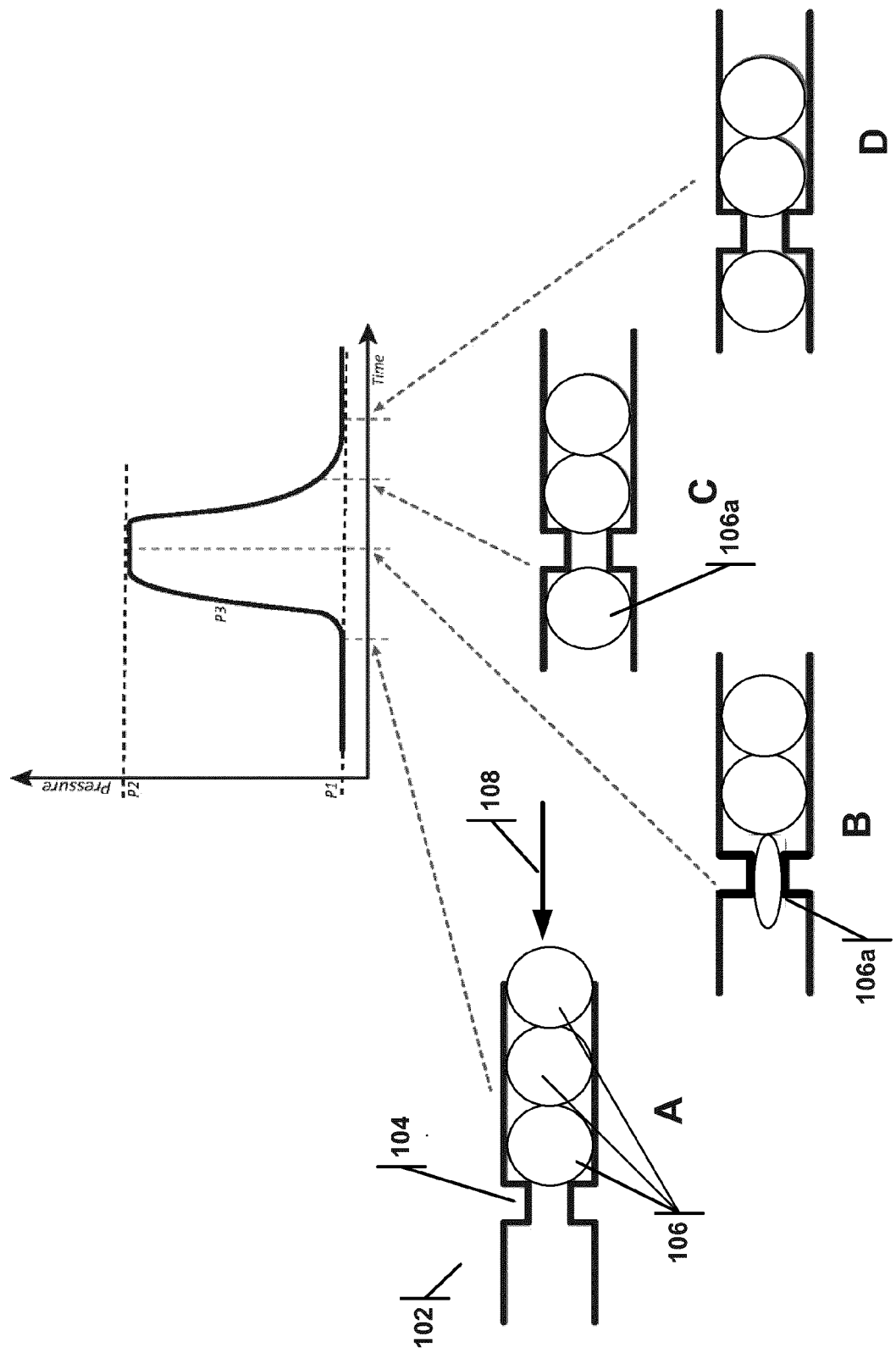
FIG. 5 illustrates an example of a selective single microfluidic particle ejection using a short pneumatic pulse under a desired pressure profile.

FIG. 5 illustrates an example of a selective single microfluidic particle ejection using a short pneumatic pulse under the desired pressure profile (i.e., the profile shown in FIG. 4A). FIG. 5 presents a microfluidic trap 102 with a trap necked region 104 that restricts the flow of particles (e.g. hydrogel) 106 to a well-regulated rate. A pressure force 108 is applied to the particles 106 (i.e., a force from the pulsed pressure P3 created by the pressure pulse generator module 20 heretofore described in conjunction with FIGS. 2A-4C) in the microfluidic trap 102. Panel A illustrates the start of a pressure pulse where the pressure force 102 is where P3=P1 (baseline or low pressure). As the pressure force increases and reaches P2 (high pressure), portrayed in Panel B, a single particle bead 106a is forced through the trap necked region 104. As the pressure force decreases from P2 back to P1 (Panels C and D), the particle bead 106a has passed the trap necked region 104 of the microfluidic trap, and the next particle bead will not pass the trap necked region 104 until the peak of the next pressure pulse P3, when the pressure force 108 will be sufficient to force the next particle bead into and through the trap necked region 104. The duration of the pulse P3 can be precisely and accurately controlled by the system to allow only a single particle bead 106a to pass through the trap necked region 104 per pulse. This precise injection can be used to accurately detect, analyze and sort the particle, at very high speed.

The pressure pulse generator module 20 can preferably create a pressure differential between 0.5 kPa and 10 kPa with 100 Pa accuracy, or it can create a pressure differential between 1 kPa and 20 kPa with 150 Pa accuracy, or it can create a pressure differential between 1 kPa and 50 kPa with 200 Pa accuracy. The pressure pulse generator module 20 can preferably create pressure differential pulses between 1 ms and 10 ms in duration and up to 30 kPa in magnitude, having a latency of under 5 ms. Alternatively, the pressure pulse generator module 20 can create pressure differential pulses between 5 ms and 100 ms in duration and up to 40 kPa in magnitude, having a latency of under 5 ms, or it can create pressure differential pulses between greater than 1 s in duration and up to 50 kPa in magnitude, having a latency of under 1 s.

Figure 6B:
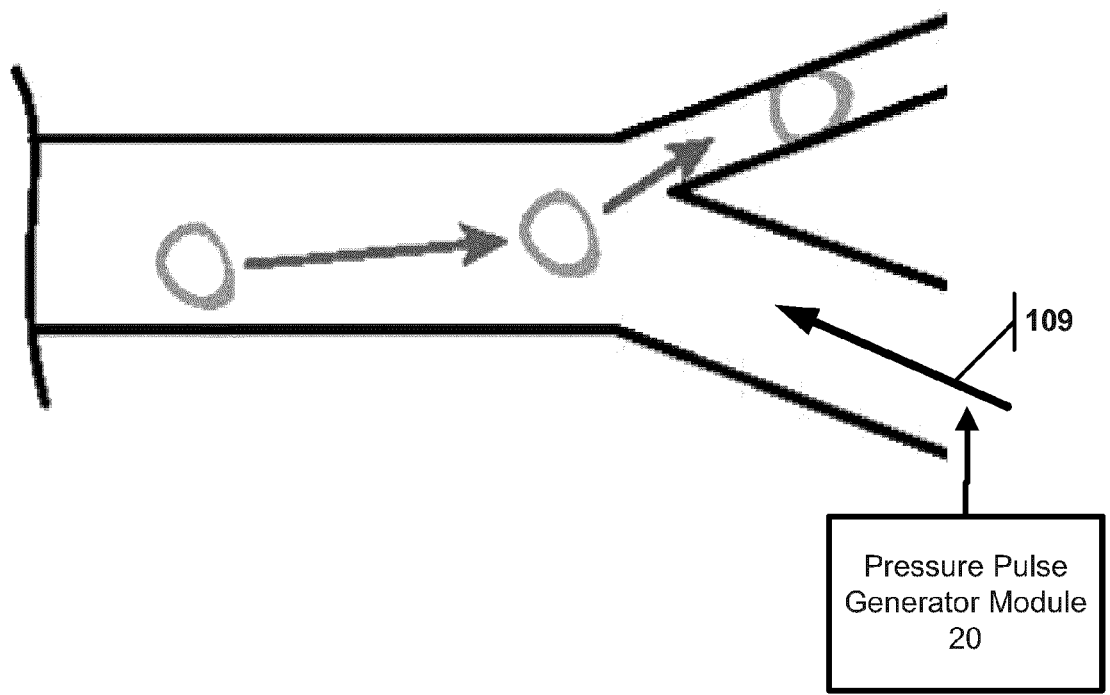
FIG. 6B demonstrates particle sorting where the particle favors traveling through a restrictive sorting channel, when pressure is applied to the non-restrictive sorting channel.

The design shown in FIG. 3 can be used on the inlet side of the microfluidic chip 27 to introduce samples in a highly accurate fashion. The design may also be used at the microfluidic outlet to sort the particles. Referring to FIG. 1C, and more particularly to FIGS. 6A and 6B, at the outlet side of the microfluidic chip 27 there may be two sorting channels 53 and 54, but those channels may be constructed such that one of them is restrictive to flow (i.e., restrictive sorting channel 53) and the other is not (i.e., non-restrictive sorting channel 54). This means that when the pressure pulse generator module 20 does not send a signal to apply a pulsed pressure, the particle will favor traveling through the non-restrictive sorting channel (FIG. 6A), and when a pressure signal is applied, the particle will favor the restrictive sorting channel 54 (FIG. 6B). This can be accomplished by connecting the pressure pulse generator module 20 to the non-restrictive sorting channel 54 and applying an outlet pressure force 109—thus rendering the non-restrictive sorting channel more flow restrictive than the other channel. This is shown in FIG. 6B. An alternate set up would be to connect the pressure pulse generator module 20 to the restrictive sorting channel 53 and to then apply a negative pressure. One channel may be more restrictive than the other by changing the diameter of the channel.

Optics Module 30 FIGS. 7A-10 illustrate the structure and performance of the optics module 30, which is designed to continuously monitor the fluorescence of microfluidic particles moving within a channel and to capture microscopy images for particle analysis and microfluidic process control.

Figure 7A:
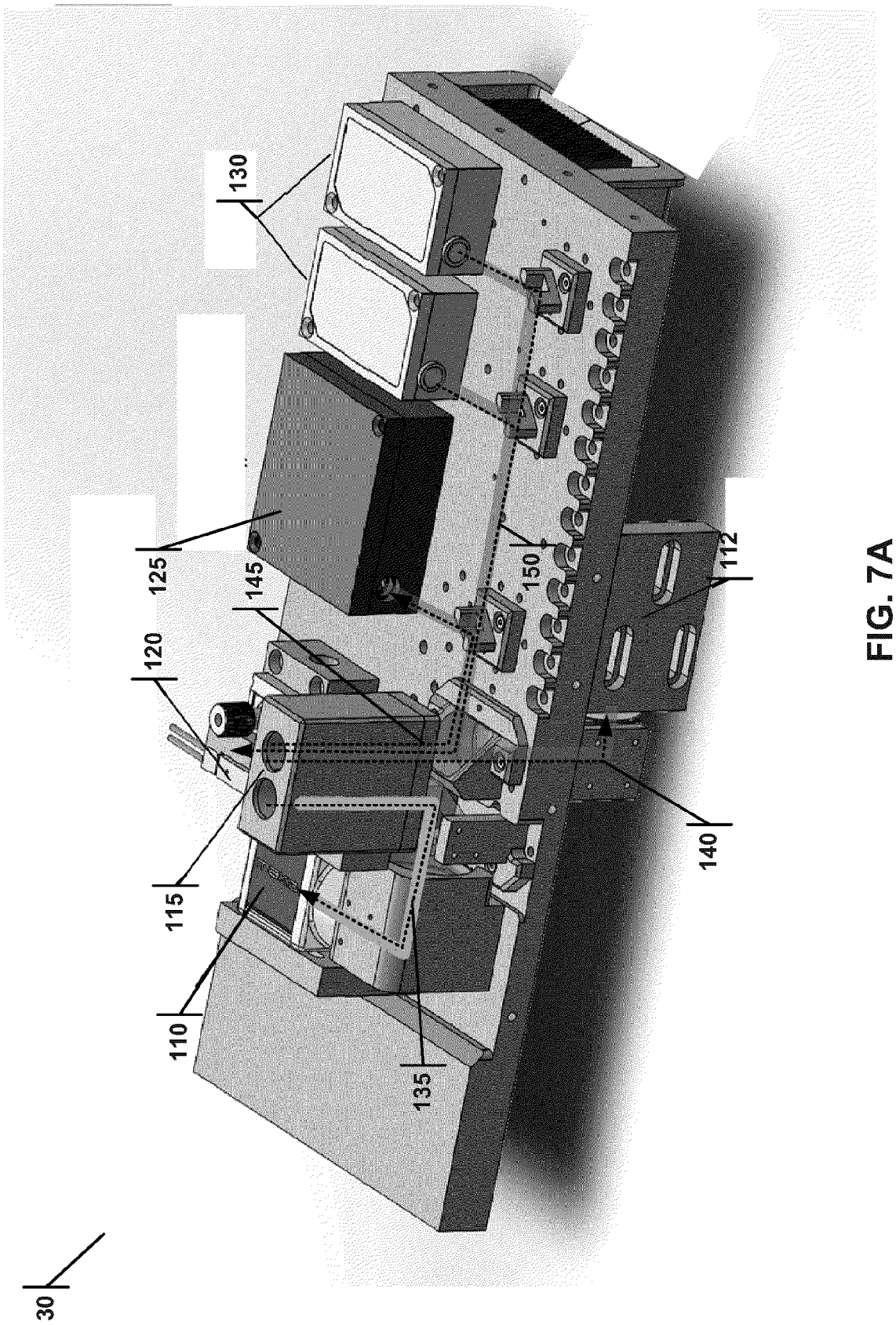
FIG. 7A is a top perspective view of an optics module.
Figure 7B:
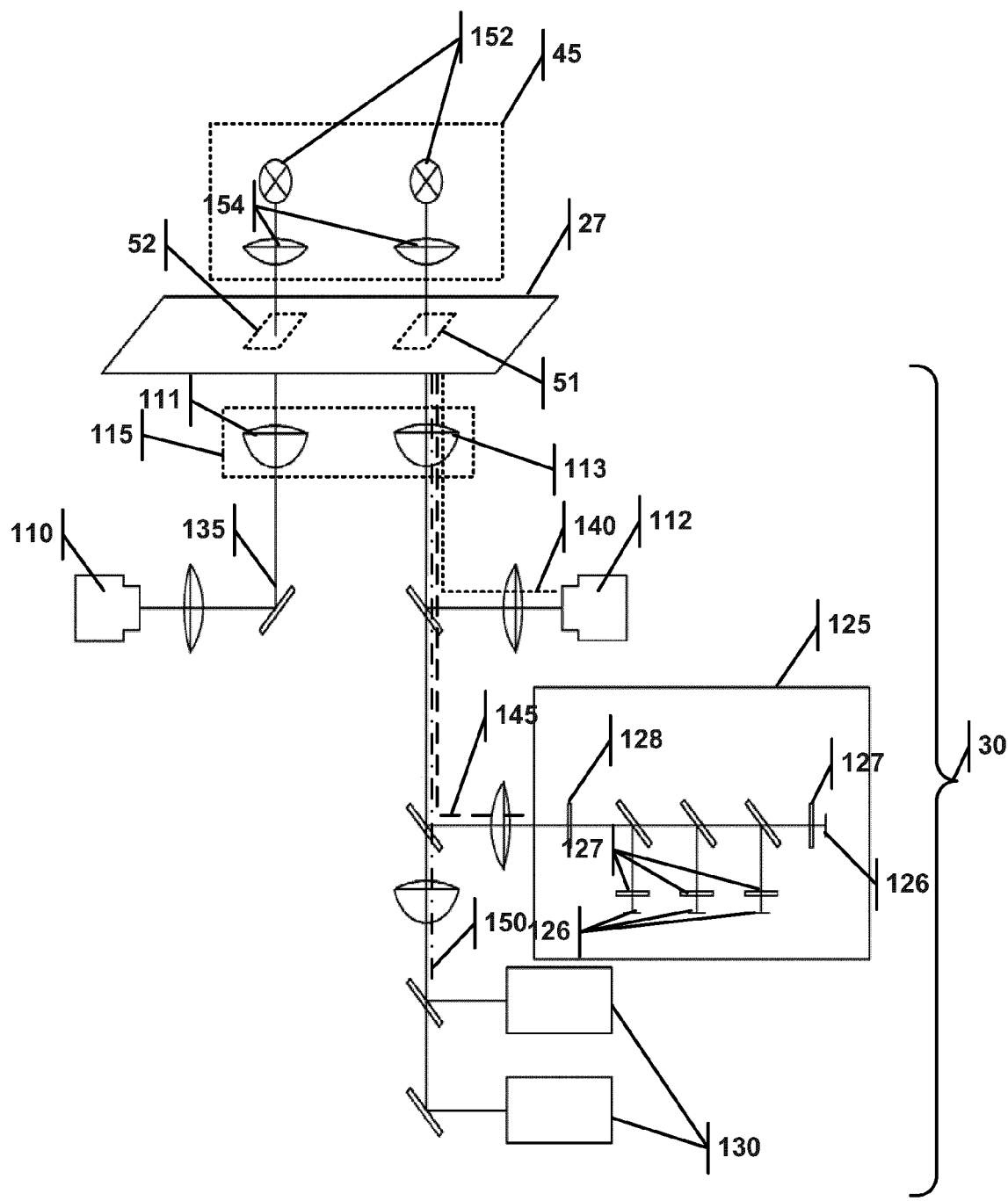
FIG. 7B is a schematic of an optics module.
Figure 8:
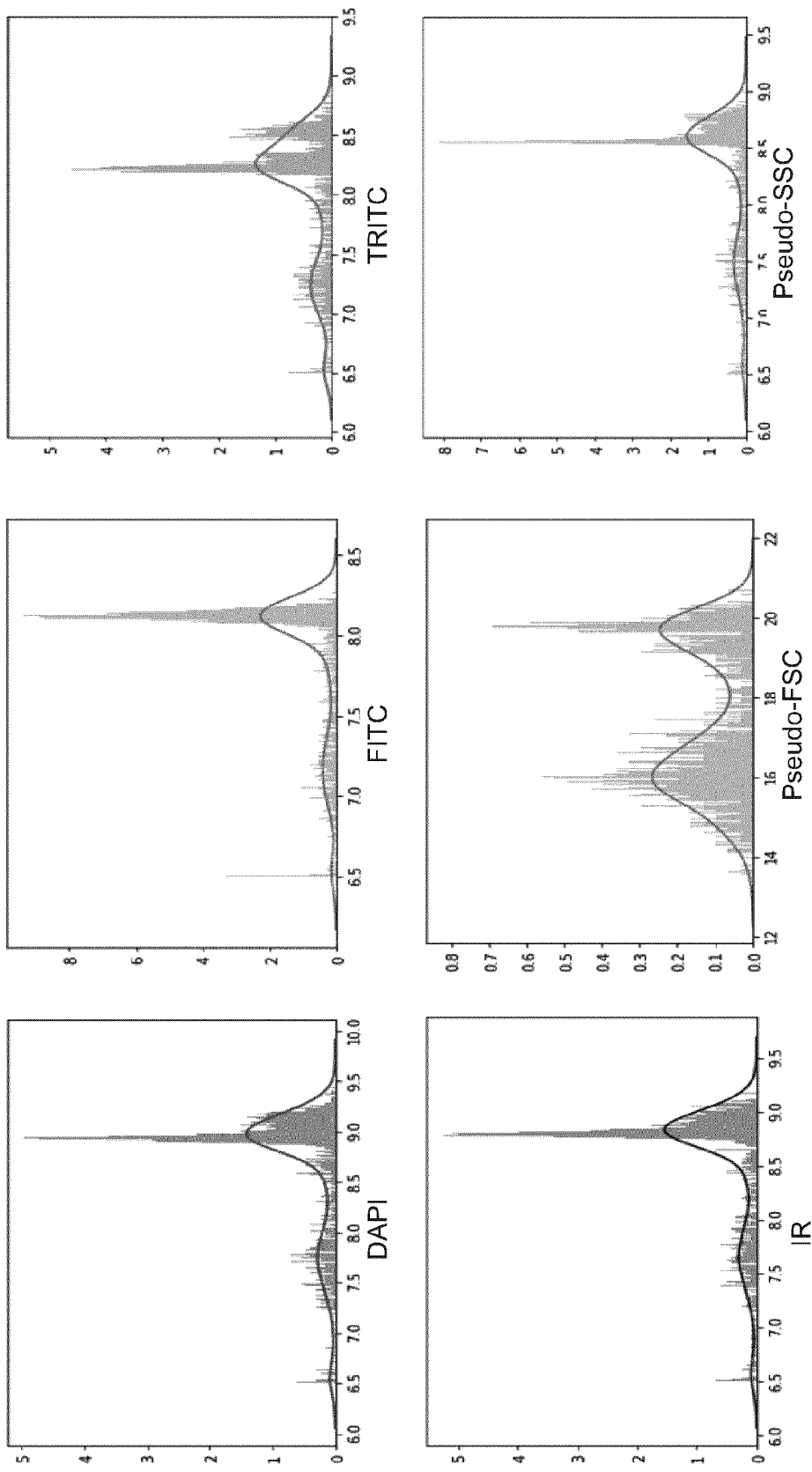
FIG. 8 represents sample readings from an optics module.

Referring to FIGS. 7A and 7B, the optics module 30 uses dual illumination for observing two separate microfluidic chip 27 zones—i.e., the detection zone 51 and the selection zone 52. Because these zones have different optical requirements for the two areas, the illumination module 45 (FIG. 1A, FIG. 7B) has two separate, independent light sources. A first imaging sensor 110 is used to observe the efficiency of microfluidic particle sorting at the selection zone 52; thus, it requires a large working area. A low numeric aperture (NA) (<0.3) objective 111 may be used with the first imaging sensor 110, which requires less light for image capture. A second imaging sensor 112 is directed at the detection zone 51 and uses an objective 113 having a high NA (>0.3 is required for fluorescence detection). The illumination module 45 uses the infrared part of the spectrum to avoid interference with sample fluorescence measurements, which occupy the 420-700 nm region. The illumination module 45 uses a pair of IR (preferably 730-741 nm) LEDs 152 collimated through condensers 154 onto two chip areas corresponding to achieve proper and efficient illumination. Imaging sensors 110 and 112 are preferably capable of generating and transmitting at least 2000 frames/s with lower than 100 us latency.

The optics module 30 may include the first imaging sensor 110 trained on the selection zone 52 through optical path 135, and the second imaging sensor 112 trained on the detection zone 51 through optical path 140. The second imaging sensor 112 shares as part of its optical path 140 with the optical path 150 for the lasers 130. Laser-induced particle excitation is detected by the fluorescence detector assembly 125, via optical path 145. The optical paths (135, 140, 145, 150) may have various mirrors, prisms and optical objectives (shown for example in FIG. 7B) to focus and direct the light. The dual objective lens assembly 115 focuses the light and the objective lens assembly holder and translator 120 allows for adjustment of the dual objective lens assembly 115. The lasers 30 may be selected from a variety of different wavelengths including but not limited to 405 nm, 488 nm, 561 nm, and 638 nm.

The fluorescence detector assembly 125 is shown in FIG. 7B as having four channels. This is accomplished by placing four fluorescence detectors 126, each with a separate filter 127 in the optical path fluorescence detector optical path 145. The assembly 125 may also have a multiple pass filter 128. The fluorescence detector assembly 125 may have various mirrors, prisms and optical objectives (shown for example in FIG. 7B) to focus and direct the light. The filters 127 may be selected from a variety of different wavelengths including but not limited to 405 nm, 452 nm, 525 nm, 600 nm, and 680 nm. Sample readings from the optics module 30 are show in in FIG. 8.

There are size constraints for the fluorescence detectors 126. Photon multiplier technology (PMT) was found to be sub-optimal for integration of four separate fluorescence channels. Alternative technologies using silicon photomultipliers (SiPM) and avalanche photodiodes had disadvantages in their inherent dynamic range. This limitation was overcome using oversampling electronics, which would also simultaneously measure sensor analog output and photon frequency.

There are pros and cons when comparing PMT and SiPM technologies. The key PMT disadvantage is size, which is 16 mm diameter for the smallest, latest sensor available to the inventors, compared to 3×3 mm available for SiPM. PMTs also require kV range bias voltage, which increases the size and cost of the device. In contrast, the 30V bias required for SiPM is easy to supply. PMTs also have a lower quantum efficiency (25% vs 35%) and are 10× more expensive and fragile compared to SiPM. Thus, the practical advantages of using SiPMs are tangible, if their disadvantageous dynamic range can be corrected.

The dynamic range of SiPMs is defined by the size and count of the photoactive cells. Sensors with 504 to 4774 photoactive cells were used, and if a linear range up to 70% of microcell activation is assumed, the best-case scenario is about 3.5 orders of magnitude of linear dynamic range (70 dB). But in reality, the range is only about 40-50 dB.

To arrive at the extra resolution needed (approximately 80 dB, or four orders of magnitude), the sample pulse profile is taken at 3 us intervals for a typical 30 us wide pulse and normalized by pulse duration. Since there are multiple measurements per pulse, their average yields a better resolving power (and dynamic range) than a single measurement of pulse height. Also, because the system can measure diverse microfluidic particles (cells, droplets, hydrogel beads) with complex fluorescence profiles and large size variations (10 um-1000 um), the mean fluorescence of a particle is generally more informative than its peak fluorescence.

Figure 9:
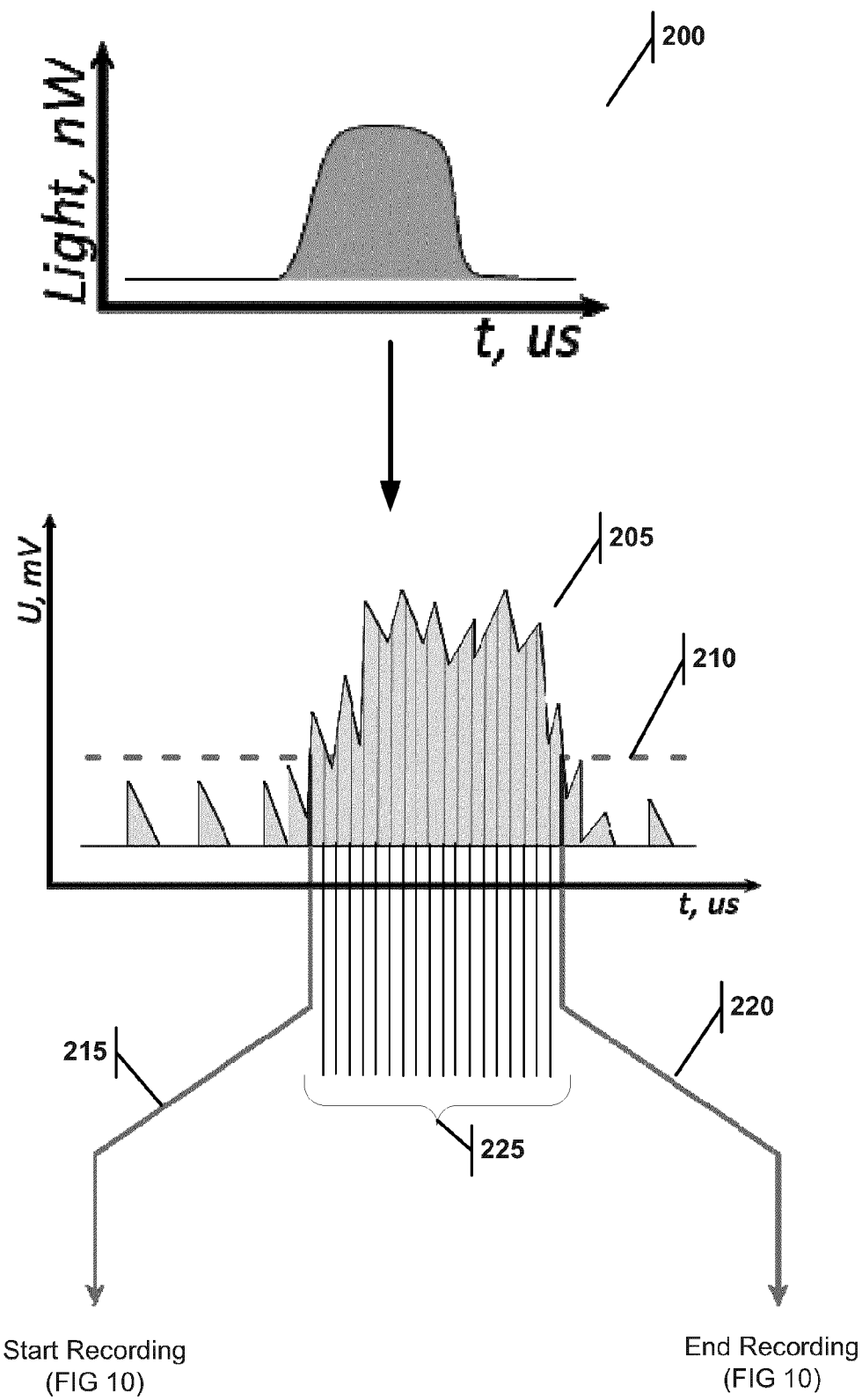
FIG. 9 is a graphical representation of recordation of analog and photon measurements.

Referring to FIG. 9, the light pulse profile 200 is read by the SiPM. Once the pulse height exceeds pulse discriminator threshold 210, this triggers a start recording event 215, which lasts until the threshold 210 is no longer exceeded, then triggering an end recording event 220. During the recording, the analog measurements 205 are recorded along the with photon counts along the sample time interval 225.

Figure 10:
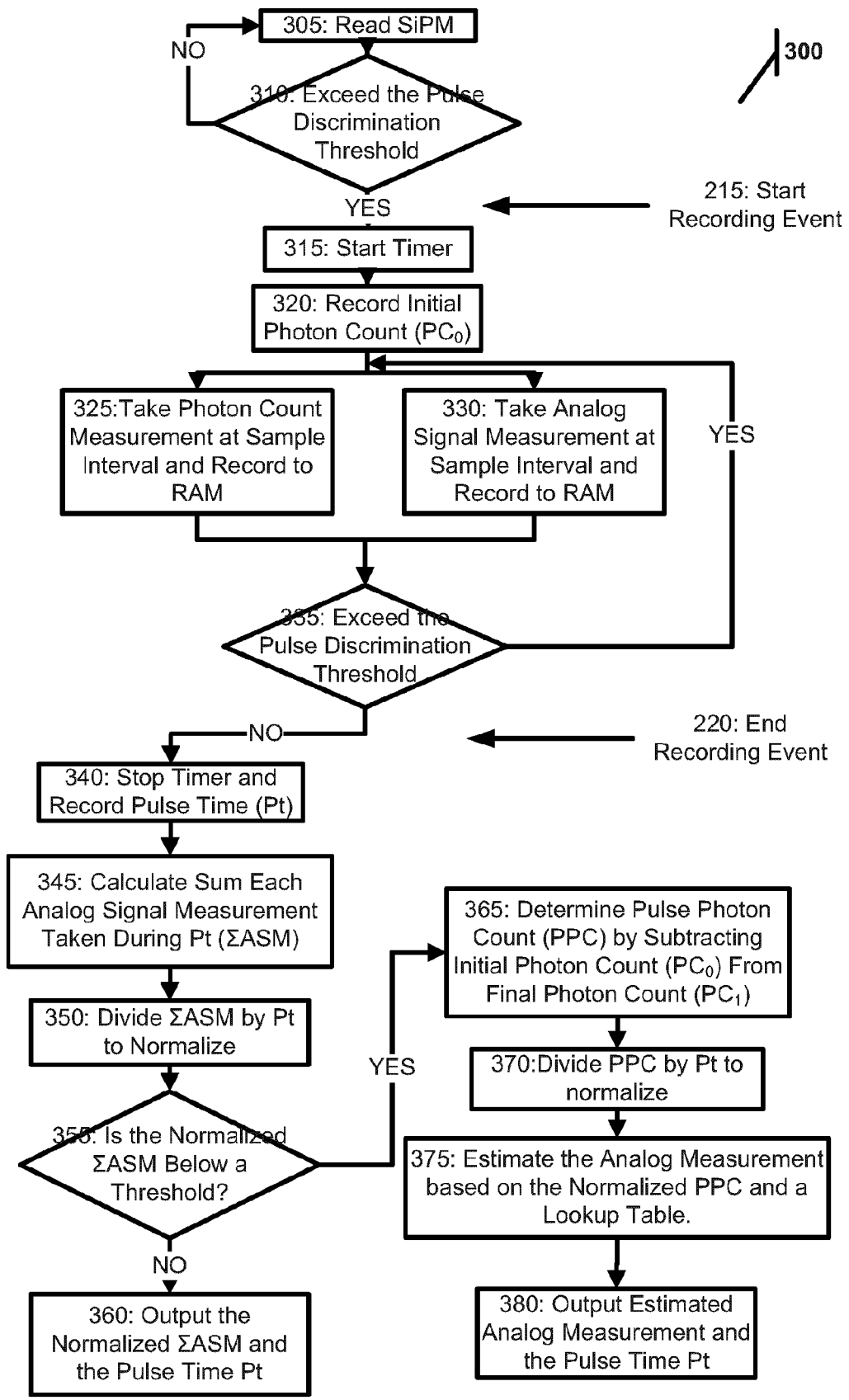
FIG. 10 provides a flowchart detailing a pulse signal processing method.

FIG. 10 provides a pulse signal processing method 300 that may be implemented in the computer/processor 10 and or the real-time signal processing system 15. The SiPM is first read (Step 305) and a check is made if the pulse discrimination threshold 210 has been exceeded (Step 310). When exceeded, the method enters into the start recording event 215 phase and by starting a timer (Step 315) and recording the initial photon count PC0 (Step 320). Simultaneously, the photon count and analog signal measurement are taken and recorded at each sample interval (for example each 30 us), as shown in Steps 325 and 330. After each sample interval, the method checks if the whether the pulse discrimination threshold 210 is still exceeded (Step 335), in other words determining whether the SiPM is still experiencing a pulse.

If the threshold 210 is no longer exceeded, the method ends the recording event 220, and the timer is stopped and its time Pt is recorded (Step 340). Alternatively, if the method uses a constant sample interval, the timer of Steps 315 and 340 may be changed to a simple counter of the number of times the method runs through Steps 325 through 335; that number multiplied by the time sample interval would yield the time duration during which the SiPM experienced the sample. At Step 345, the analog signal measurements are summed and normalized in step 350 by dividing it by the pulse time Pt.

Next, at step 355, the normalized analog signal measurements are compared to a threshold value. If they do not exceed the threshold, in step 360 the system outputs the normalized analog signal measurements and the pulse time Pt. If they do exceed the threshold value, the system proceeds to Step 365 to determine a Pulse Photon Count.

At Step 365 the number of photons counted in the pulse (i.e., the pulse photon count PPC) is determined by reading the final pulse photon count PC1 and subtracting the initial photon count PC0. The PPC is normalized in Step 370 by dividing it by the pulse time Pt, and used to estimate the analog measurement value, which would normally fall below the measurable range. The analog measurement and photon count relation is not linear, and the estimation is done using a lookup table in Step 375, and the system outputs the estimated analog measurement and the pulse time Pt at Step 380. This lookup table is constructed during system fluorescence detection calibration using different intensity light standards having different levels of photon flux. This way, the detection ranges for the analog and digital measurement types can be simultaneously and accurately determined.

The normalized photon count in Step 370 and the normalized analog measurements in Step 350 may be combined to fuse the two types of light intensity information: the analog and digital photon count information. This is used to expand the range of light intensities that can be measured by the instrument.

Typical experiments performed on conventional particle cytometry equipment rely on the use of light scatter information to identify particles passing through the focused laser and detection region. Due to the size constraints of microfluidic chips, collecting this scatter information presents a considerable technical challenge. This is because the plastic chip volume itself scatters significant amounts of light, and the space around the chip is used for mechanical support and microfluidic tubing. Although it is possible to collect light scatter signals within the microfluidic chips, it is often impractical due to the use of chip-embedded fiber optics. To overcome this challenge, estimated light scatter information is derived from the available four fluorescence measurement channels and pulse duration measurements.

Conventional particle cytometry methods typically provide a couple of measurements for particle light scattering in addition to particle fluorescence. The information contained within these two light scatter measurements (side scatter and forward scatter) is then used to assess particle size and morphology. However measuring light scatter on microfluidic chips is complicated. One solution is analysis of fluorescence pulse waveforms, which would provide some indication on particle size and morphology. Forward light scatter is typically used to estimate particle size, which in this case is represented by the pulse duration multiplied by the mean fluorescence of the four channels. Side scatter measurements are typically used to estimate particle morphology, which in this case can be estimated from the mean coefficient of variance within the four fluorescence channels.

High-Voltage Pulse Generator Module 35

High-speed microfluidic particle sorting can be accomplished by using dielectrophoresis mediated by alternating current (AC) fields. The high-voltage pulse generator module 35 is designed to generate frequency- and amplitude-modulated alternating electric fields to control the flow of polarizable microfluidic particles.

A setup used for sorting droplets and other poorly conducting particles consists of an amplified function generator, which generates amplitude modulated pulses in response to a trigger. The pulse evokes a positive dielectric effect on polarizable particles, physically attracting them towards a different path. The dielectrophoretic force is small; therefore, high voltages (limited by breakdown of the chip isolation barrier) have to be used to achieve the highest possible force on the particles during high-speed sorting.

The exerted dielectrophoretic force is dependent on the frequency of the AC electric field because the relative permitivities of the particle and medium are frequency dependent. Over the frequency spectrum, dielectrophoretic force can switch from an attracting action (positive dielectrophoresis) to a negative action (negative dielectrophoresis), where particles are repelled by electric field gradient.

The HV pulse generator module 35 is designed to make use of the combined effect of the positive as well as negative dielectrophoresis for exerting an overall increased force on the particles. The designed high-voltage pulse amplifier achieves this using frequency modulated high-voltage pulses instead of conventional amplitude modulation.

Figure 11:
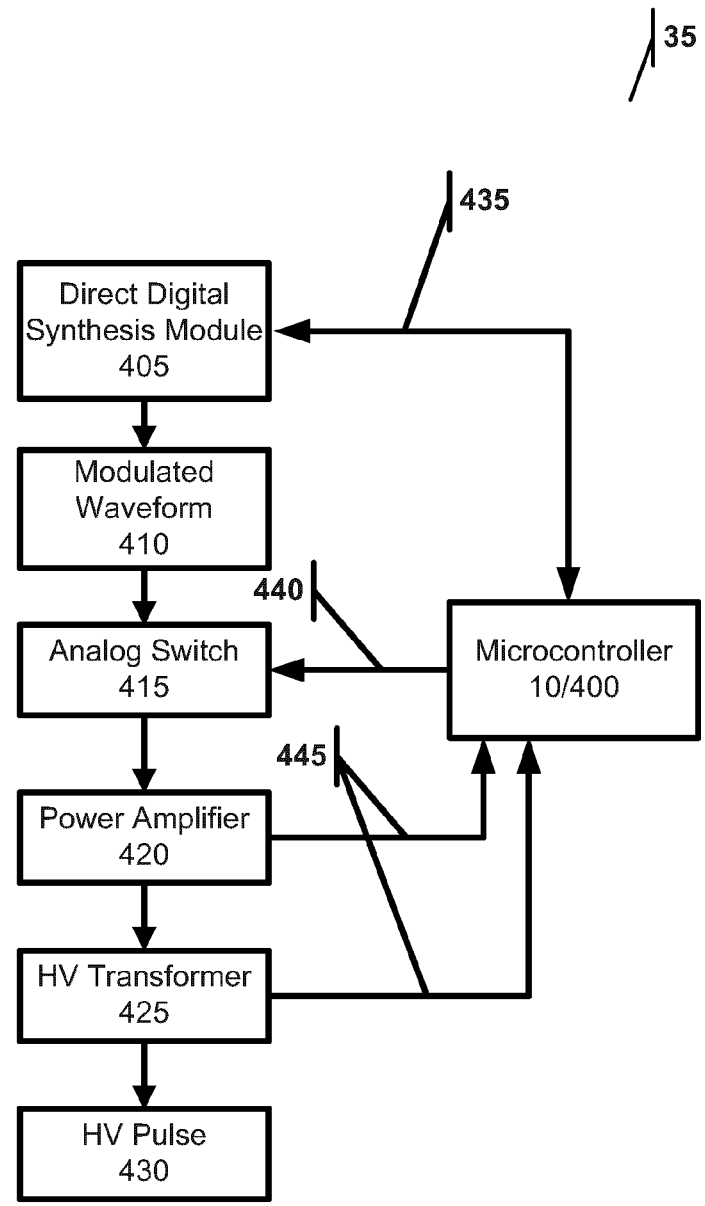
FIG. 11 illustrates structure of a high-voltage pulse generator module.

FIG. 11 illustrates the structure of the HV pulse generator module 35 using a frequency modulated high-voltage pulse generator. The design is based around a programmable direct digital synthesis (DDS) module 405 converting a provided clock from a microcontroller 400 into a modulated waveform 410 via a control/clock line 435. The microcontroller 400 also controls the DDS module 405 by providing the frequency required for the modulated waveform 410, wherein the frequency can be adjusted based on the size and/or class of particles identified by the optic module 30. The waveform 410 is gated by an analog switch 415 before being passed to a filter and power amplifier 420 (which can amplify the signal over 100 times) driving a high-voltage transformer 425, ultimately producing the HV pulse 430. The microcontroller 400 is connected to the analog switch 415 via the gate trigger line 440, which may be used during the operation of the HV pulse generator module 35 to effectively disable the output of a HV pulse 430. Feedback lines 445 from the HV transformer 425 and power amplifier 420 (carrying current and/or voltage data) are used by the microcontroller 400 to calibrate and to control the pulses for safe and consistent operation. The microcontroller may receive current data from the power amplifier 420 on the feedback line 445 dedicated to the power amplifier 420, and the microcontroller may also receive voltage data from the HV transformer 425 through the feedback line 445 dedicated to the HV transformer 425. Based on the current and/or voltage data it receives from the feedback lines 445, the microcontroller 400 may adjust the control signal it provides to the DDS module 405 on the control/clock line 435. For example, the microcontroller or processor 400 may signal the DDS module 405 to produce a waveform 410 of a different amplitude or frequency based on current or voltage data.

The control over the HV pulse generator module 35 is particularly useful when working with microfluidic chips. The high voltage transformer inductance 425 and microfluidic chip capacitance form a resonant LC tank, which is then driven by the DDS module 405/power amplifier 420. The main problem is that different microfluidic chips have different capacitances, which must be compensated during operation. This compensation is done by analyzing the resulting high voltage waveforms and adjusting the driving signal levels. Waveform distortion and frequency measurement is done using fast Fourier transformation (FFT), which indicates if the LC circuit is stable. Pulse voltage (rms) amplitude is also measured from the waveform and if it deviates from the setpoint, the control signal amplitude from the microcontroller 10/400 to the power amplifier 420 is gradually adjusted to minimize the error between set and measured output voltage. These compensation mechanisms are performed over the normal operating range of 20 kHz-200 kHz and 0.1-10 kV.

The HV pulse generator module 35 is capable of generating sinusoidal voltage output between 100V and 10000V in magnitude and between 20 kHz and 200 kHz in frequency. It can also produce these pulses with a latency time of less than 100 us.

Image Analysis Systems

Due to the variation in chip production quality and biological sample physical properties, pressure-based microfluidic instruments require feedback to achieve stable designed liquid flow rates. The present system uses microscopy images for this feedback, but the images have to be converted to actionable numerical information using image analysis algorithms. Due to the large variation of chips and microfluidic particles encountered during experiments, classic computer vision strategies could not provide a robust means of measuring particle size and motion.

In order to infer quantitative information about microfluidic particle size and type from raw images, an AI-based analysis stack was used. The specific challenge focused on extracting pixel accurate particle measurements from relatively large images spanning 640×480 pixels and more in resolution. Real-time image processing using existing deep learning models was too slow. To overcome this, the image analysis system first crops a variable resolution image (e.g. 1440×1080) to a smaller, fixed-size area (e.g. 640×149) containing the microfluidic particles of interest. This smaller area can then be segmented at higher speeds.

Figure 12:
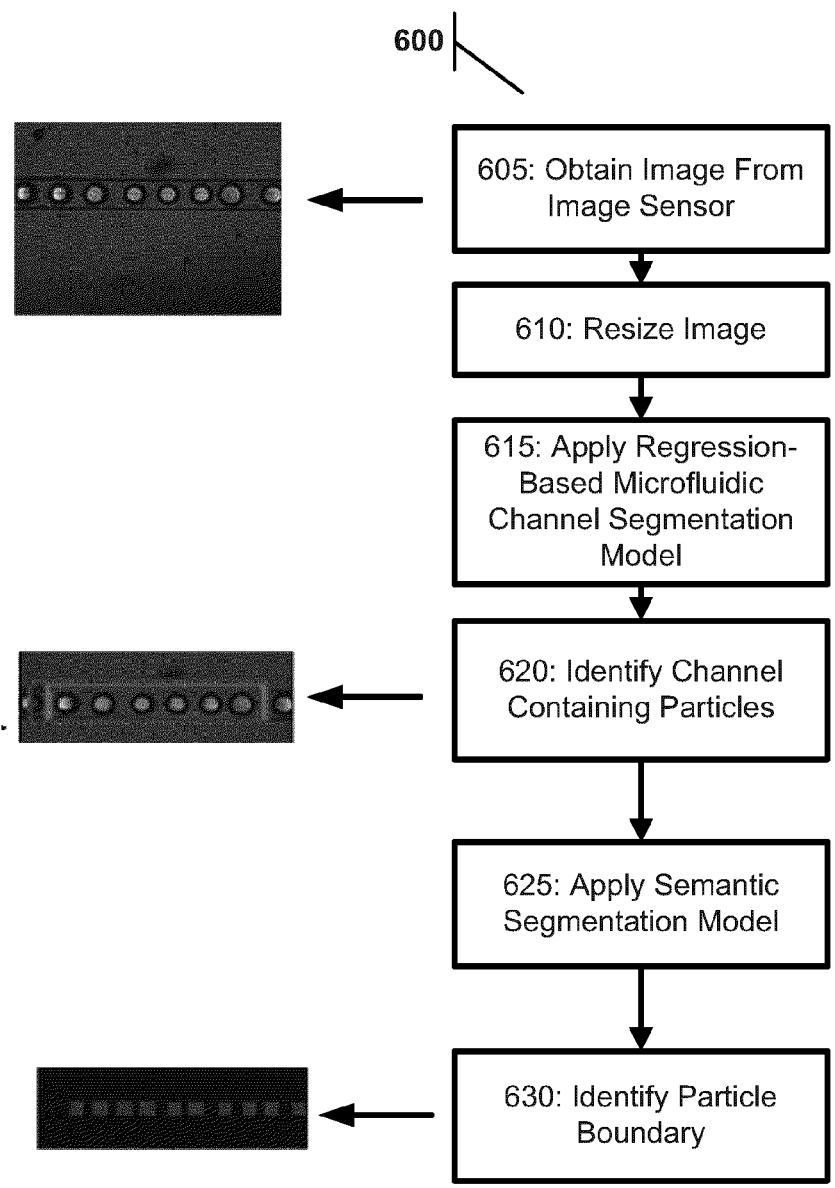
FIG. 12 provides a flowchart detailing a method for cropping and segmenting individual particles.

A method for cropping and segmenting individual particles 600 is provided in FIG. 12. An image is captured from the imaging sensor and is then resized in Steps 605 and 610. At Step 615, a regression-based microfluidic channel segmentation model is applied to identify an area within the image that is a particle containing channel (Step 620). A second semantic segmentation model is applied to the image at Step 625, yielding an identification of the particle boundary at Step 630. The segmentation models in Steps 615 and 625 may be performed and/or enhanced by artificial intelligence processes and methods. Once the particle boundary is determined, the computer/processor 10 can limit its analysis to a much smaller portion of the image, thus increasing accuracy and efficiency. The focused image analysis can be used to adjust instrument operating parameters, such as chip position, pressure differentials and fluorescence detector parameters.

The regression-based microfluidic channel segmentation model in Step 615 is a multilayer convolutional neural network, where sequential layers are connected between themselves. This neural network is optimized for speed and aims to approximate the location of a microfluidic chip channel. One example of such convolutional neural network would be a Mobilenet neural network architecture without fully connected and pooling layers.

The semantic segmentation model in Step 625 has the goal of accurate pixel-wise detection. To maintain fast analysis, the network accepts fixed size, cropped images from the Steps 615 and 620. Particle differentiation from background is performed using steps of anchor and mask generation and filtering followed by processing in convolutional layers. One example of such a network would be MaskRCNN neural network with optimized input image size Particle speed measurement is achieved using an original approach using collections of images transformed using kymograph and Radon transform operations. This allows extraction of pixel accurate particle shifts between frames filmed at nanosecond precision. The kymographs are constructed by plotting a collection of image lines containing moving particles. The resulting kymograph is typically seen as vertical lines at an angle, which is proportional to microfluidic particle speed (stationary particles result in kymograph lines at 90 deg. angle). In order to determine particle speed, this angle needs to be quantified accurately, which is done using a Radon transform. The information contained in the result of the transform can be used to accurately measure the dominant line angle in the image, from which particle speed can be calculated.

Figure 13:
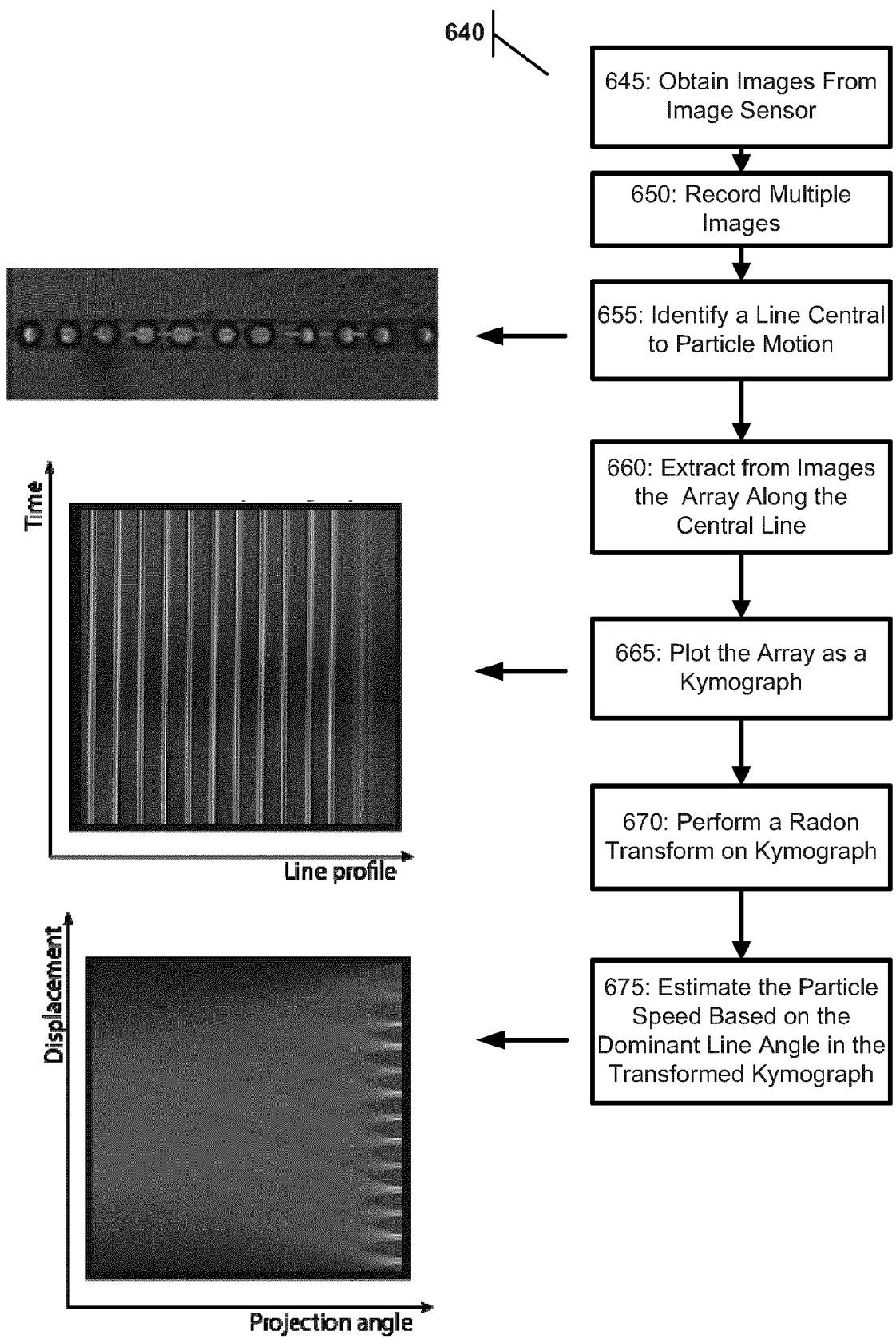
FIG. 13 provides a flow chart detailing a particle speed measurement method.

Specifically, FIG. 13 provides a particle speed measurement method 640. Images are obtained from the imaging sensor and recorded (Steps 645 and 650). A line central to particle motion is identified from those images at Step 655. The portion of the images associated with the identified line are extracted and plotted as a kymograph (Steps 660 and 665). The kymograph is subject to a Radon transformation ad the particle speed is estimated based on the dominant line angle in the transformed kymograph (Steps 670 and 675).

Combining the various modules and image analysis techniques described above, the system for selective microfluidic particle processing 5 shown in FIG. 1A will now be described. The processor 10 precisely controls the pressure pulse generator module 20 to produce highly-accurate pressure pulses to propel particles through the microfluidic chip 27. As those particles arrive at the detection zone 51, the optics modules captures image and fluorescence data and transmits that data to the processor 10, which in turn analyzes that data to identify and classify the particles. Based on the classification, the processor 10 sends signals to either or both of the pressure pulse generator module 20 or the high-voltage generator module 35 to select and sort the particles in the selection zone 52. The first camera 110 in the optics module 30 captures images of the selection zone 52 and transmits those images to the processor 10 to verify the effectiveness of the sorting operation.

If the sorting is found to be effective, then the processor 10 may increase the pulsing pressure from the pressure pulse generator module 20 to increase the throughput of the system 5. If, however, the effectiveness is lacking, then the processor may lower the pulsing pressure from the pressure pulse generator module 20 on the inlet side of the microfluidic chip 27 to decrease the speed of particles traveling through the chip 27. The processor 10 may also adjust the signals to the pressure pulse generator module 20 on the outlet side of the microfluidic chip 27 and/or adjust the signals to the high-voltage generator module 35.

Throughout the processes of optimizing the system throughput, the processor may also adjust the intensity of the lasers 130 in the optics module 30, and/or the gain of the images sensors 110 and 112, and/or the gain of the fluorescence detectors 126 to achieve optimal image and fluorescence data, which can result in increased system throughput.

Lid Hinge for Enclosure

Normal instrument operation requires the lid to be closed shut, which may be achieved by using a spring-loaded mechanism. However, in the simplest spring-loaded design, with the spring applying a downward force, opening the lid would require the user to work against the spring as well as lift the lid weight.

To solve this problem, a roller moving along a metal arc has been designed to guide lid opening action via a carefully designed arc shape. The arc has at least two indentations or grooves, which provide fixed positions for opened and closed positions. Between the opened and closed grooves, the shape of the arc leverages the spring to counterbalance the lid weight and assist in lid opening. At the grooves, the spring applies force to keep the roller in the groove to fix lid positions. This in turn applies downward force (opposite to during opening) to keep the lid closed.

FIGS. 14A-14C illustrate this unique lid hinge 700 that may be used with the system 5 to prevent light from entering and degrading image analysis. The hinge 700 provides mechanical assistance for lid opening. The lid 705 is operated by two such hinges 700 mounted on the instrument chassis (not shown). The hinge 700 is shown in the closed configuration in FIG. 14A, in a partially-opened configuration in FIG. 14B and an opened configuration in FIG. 14C.

The lid 705 is connected to a pivoting lid support 710 that pivots in relation to the chassis mounting bracket 715 about a pivot point 716, which connects to the instrument chassis (not shown). The lid support 710 has an arc-shaped edge 711 with an opened limit groove 730 and a closed limit groove 725. The arc-shaped edge may optionally have a partially-opened groove 732 as well. The hinge 700 also has a pivoting roller latch 720 that pivots relative to the chassis mounting bracket 715. One end of the pivoting roller latch 720 is connected to a spring 722 anchored to the instrument chassis, and the other end of the latch 720 contacts the pivoting lid support 710 via a roller 721. The spring 722 is constructed to apply a force 723 that pushes the roller 721 against the arc-shaped edge 711.

The hinge 700 has at least two configurations: an opened configuration and a closed configuration. In the closed configuration (FIG. 14A) the roller 721 is disposed in the closed limit groove 725. When the user opens the instrument chassis, the roller dislodges from the closed limit groove 725 and rolls along the edge of the pivoting lid support 710 (see FIG. 14B) until the roller lodges into the opened limit groove 730 (see FIG. 14C—i.e., the opened configuration), which restricts any further movement of the hinge 700.

The hinge may also have a partially-opened groove 732 between the opened limit groove 730 and the closed limit groove 725. Such a groove 732 would imbue the hinge with a partially opened configuration where the roller lodges into the partially-opened groove 732 (see FIG. 14B).

The arc-shape edge 711 of the pivoting lid support 710 assists the lid 705 in opening, as it acts as a lever for the spring 722 counterbalancing the lid 705 weight. This action is in part attributable to a non-constant radius measured from the pivot point 716 (arrows 733 in FIG. 14C) of the pivoting lid support 710 to arc-shaped edge 711. This action is shown by the change in angle between the pivoting roller latch 720 and the chassis mounting bracket 715 between FIGS. 14A (the long portion of the pivoting roller latch 720 is horizontal) and 14C (the long portion is at an angle).

Specific Implementations of the Technology

Following are non-limiting examples of certain implementations of the technology.

A1. A method for combining a first particle 1002 with a second particle 1040 in an output vesicle 1062, comprising:

flowing a first particle 1002 from an inlet 816 in a first fluidic channel 812 of a fluidic device 800, wherein:

the fluidic device 800 includes the first fluidic channel 812 and a second fluidic channel 820 each disposed in a substrate 811;

the first particle 1002 includes a first detectable feature;

the first fluidic channel 812 includes a proximal region 814, a distal region 818 and an outlet 817;

the first particle flows in a direction from the inlet 816 to the outlet 817; and the second fluidic channel 820 includes a distal region 822 and a proximal terminus 824 disposed at an interface 826 of the first fluidic channel 812 between the inlet 816 and an outlet 817;

detecting the first detectable feature of the first particle 1002 in the first fluidic channel 812 at a detection zone 850, whereby there is a detection of the first particle 1002, wherein:

the detection zone 850 is disposed between the inlet 816 and the interface 826; and the second fluidic channel 820 includes a second particle 1040 in proximity to the interface 826;

releasing, in response to the detection of the first particle 1002, the second particle 1040 from the second fluidic channel 820 into the first fluidic channel 812 in proximity to the first particle 1002 detected; and combining the first particle 1002 with the second particle 1040 in an output vesicle 1062.

A2. The method of embodiment A1, wherein the second fluidic channel 820 includes a minimum width and a maximum width and a constriction 829 disposed at the minimum width of the second fluidic channel 820.

A3. The method of embodiment A2, wherein the releasing includes: the second particle 1040 traversing the constriction 829, or the second particle 1040 deforming at, and traversing, the constriction 829.

A4. The method of embodiment A2 or A3, wherein the constriction 829 of the second fluidic channel 820 is disposed at the proximal terminus 824.

A5. The method of embodiment A2 or A3, wherein the constriction 829 of the second fluidic channel 820 is disposed between the distal region 822 and the proximal terminus 824.

A6. The method of any one of embodiments A2-A5, wherein the second fluidic channel 820 includes a proximal region 823 adjoining the distal region 822, and disposed between the proximal terminus 824 and the distal region 822.

A7. The method of embodiment A6, wherein:
the constriction 829 is in the proximal region of the second fluidic channel 820, or at the junction between the proximal region and the distal region 822 of the second fluidic channel 820, and the constriction 829 is not in the distal region 822 of the second fluidic channel 820.

A8. The method of embodiment A7, wherein:
the proximal region of the second fluidic channel 820 is a frustum,
the distal region 822 is a cylinder adjoining the frustum, and
the diameter of the frustum tapers from the distal region 822 to the proximal terminus 824.

A9. The method of embodiment A7, wherein:
the proximal region 823 of the second fluidic channel 820 is a first cylinder having a first diameter,
the distal region 822 is a second cylinder adjoining the first cylinder, and
the second cylinder has a second diameter greater than the first diameter.

A10. The method of any one of embodiments A7-A9, wherein:
the constriction 829 includes a width (W),
the second particle 1040 includes a diameter (D),
the width (W) of the constriction 829 equals the product of y*D, and
y is about 0.1 to about 0.75.

A11. The method of embodiment A10, wherein y is about 0.2 to about 0.5.

A12. The method of any one of embodiments A7-A11, wherein the constriction 829 includes a width of about 10 micrometers to about 30 micrometers.

A13. The method of embodiment A12, wherein:
the distal region 822 of the second fluidic channel 22 includes a minimum width (W2),
the constriction 829 includes a width (W),
the second particle 1040 includes a diameter (D),
the minimum width (W2) is between (a) the product of 2*W, and (b) the larger value of: (i) about the product of 2*D, or (ii) about the product of 4*W.

A14. The method of any one of embodiments A7-A13, wherein:
the distal region 822 of the second fluidic channel 22 includes a minimum width (W2),
the constriction 829 includes a width (W),
the second particle 1040 includes a diameter (D),
the proximal region includes an axial length (L) between (a) W2, and (b) the larger value of: (i) about the product of 2*D, or (ii) about the product of 4*W.

A15. The method of any one of embodiments A1-A14, wherein the second particle 1040 and the first particle 1002 each includes a diameter independently chosen from about 20 micrometers to about 100 micrometers.

A16. The method of embodiment A15, wherein the diameter is independently chosen from about 30 micrometers to about 60 micrometers.

A17. The method of any one of embodiments A1-A16, wherein the second particle 1040 and the first particle 1002 each includes a stiffness independently chosen from about 3 kPa to about 100 kPa.

A18. The method of embodiment A17, wherein the stiffness is independently chosen from about 5 kPa to about 10 kPa.

A19. The method of any one of embodiments A1-A18, comprising exerting a first pressure in the second fluidic channel 820 in a direction from the distal region 822 to the proximal terminus 824 of the second fluidic channel 820, wherein the first pressure disposes the second particle 1040 at the interface 826.

A20. The method of embodiment A19, wherein the first pressure is about 1 kPa to about 5 kPa above the pressure in the first channel.

A21. The method of embodiment A19 or A20, wherein the device 800 is mounted in an instrument 1400 comprising a pressure generator 1430 in fluid connection with the second channel 820, and the pressure generator 1430 exerts the first pressure.

A22. The method of any one of embodiments A19-A21, wherein the releasing includes introducing a pressure differential in the second fluidic channel 820 in a direction from the distal region 822 to the proximal terminus 824 of the second fluidic channel 820.

A23. The method of embodiment A22, comprising exerting a second pressure in the second fluidic channel 820 in the direction from the distal region 822 to the proximal terminus 824 of the second fluidic channel 820, wherein the second pressure is greater than the first pressure and releases the second particle 1040 from the second fluidic channel 820 into the first fluidic channel 812.

A24. The method of embodiment A23, comprising exerting the second pressure in response to the detection of the first particle 1002, wherein the second pressure releases the second particle 1040 from the second fluidic channel 820, through the constriction 829, and into the first fluidic channel 812 in proximity to the first particle 1002 detected.

A25. The method of embodiment A23 or A24, wherein:
the pressure generator 40, in response to the detection of the first particle 1002, exerts the second pressure in the second fluidic channel 820 in a direction from the distal region 822 to the proximal terminus 824 of the second fluidic channel 820; and
the second pressure is greater than the first pressure and releases the second particle 1040 from the second fluidic channel 820, through the constriction 829, and into the first fluidic channel 812 in proximity to the first particle 1002 detected.

A26. The method of any one of embodiments A23-A25, wherein the pressure differential between the first pressure and the second pressure is about 0.5 kPa to about 10 kPa.

A27. The method of any one of embodiments A23-A25, wherein the pressure differential between the first pressure and the second pressure is about 1 kPa to about 20 kPa.

A28. The method of any one of embodiments A23-A25, wherein the pressure differential between the first pressure and the second pressure is about 1 kPa to about 50 kPa.

A29. The method of any one of embodiments A23-A28, comprising exerting pressure differential pulses and releasing a separate second particle in response to each of the pressure differential pulses.

A30. The method of embodiment A29, wherein each of the pressure differential pulses is about 1 ms to about 10 ms in duration.

A31. The method of embodiment A29, wherein each of the pressure differential pulses is about 5 ms to about 100 ms in duration.

A32. The method of embodiment A29, wherein each of the pressure differential pulses is about 1 s or greater in duration.

A32.1. The method of embodiment A29, wherein each of the pressure differential pulses is longer than about 2 milliseconds in duration and lower than about 25 kPa in pressure.

A32.2. The method of embodiment A29, wherein each of the pressure differential pulses includes a first pressure and a second pressure greater than the first pressure.

A32.3. The method of embodiment A32.2, wherein the first pressure disposes the second particle 1040 at the constriction 829, the second pressure releases the second particle 1040 through the constriction 829 and into the first fluidic channel 812.

A32.4. The method of embodiment A32.2 or A32.3, wherein the first pressure is about 1 kPa to about 10 kPa, the second pressure is about 1.5 to about 3 times the first pressure.

A32.5. The method of any one of embodiments A29-A32.4, wherein each of the pressure differential pulses includes a third pressure less than the second pressure and greater than the first pressure.

A32.6. The method of embodiment A32.5, wherein the third pressure is about 0.9 to about 1.5 times the first pressure.

A33. The method of any one of embodiments A1-A32.6, wherein the fluidic device 800 includes one or more relief channels disposed between the first fluidic channel 812 and the second fluidic channel 820.

A34. The method of embodiment A33, wherein the one or more relief channels each includes an opening at the distal region 822 of the second fluidic channel 820 and an opening at the first fluidic channel.

A35. The method of embodiment A33 or A34, wherein the fluidic device 800 includes two more relief channels, wherein one of the relief channels includes an opening at the first fluidic channel 812 disposed on one side of the interface 826, and another of the relief channels includes an opening at the first fluidic channel 812 disposed on an opposing side of the interface 826.

A36. The method of any one of embodiments A33-A35, wherein:
each of the relief channels includes a width (w),
the second particle 1040 includes a diameter (D),
the width (w) of each of the relief channels is greater than 5 micrometers and less than the product of z*D, and
z is about 0.1.

A37. The method of any one of embodiments A1-A36, wherein the releasing includes introducing an electric field at the interface 826 between the first fluidic channel 812 and the second fluidic channel 820.

A38. The method of embodiment A37, wherein the electric field exerts a dielectrophoretic force.

A38.1. The method of embodiment A37 or A38, wherein the electric field breaks a fluid interface at the second fluidic channel, and/or breaks a vesical perimeter of an input vesicle.

A39. The method of embodiment A37 or A38 or A38.1, comprising introducing the electric field in response to the detection of the first particle 1002, wherein the electric field releases the second particle 1040 from the second fluidic channel 820, through the constriction 829, and into the first fluidic channel 812 in proximity to the first particle 1002 detected.

A39.1. The method of any one of embodiments A37-A39, comprising introducing multiple electric field pulses, wherein each pulse is exerted in response to detecting a first particle 1002 at the detection zone 850.

A40. The method of any one of embodiments A37-A39.1, wherein the electric field is an alternating electric field.

A41. The method of embodiment A40, wherein the alternating electric field includes a root mean square amplitude of about 50 volts to about 500 volts.

A42. The method of embodiment A40 or A41, wherein the alternating electric field includes a frequency of about 20 kHz to about 200 kHz.

A43. The method of embodiment A42, wherein the frequency is about 40 kHz to about 70 kHz.

A44. The method of any one of embodiments A40-A43, wherein the alternating electric field includes a duration of about 100 microseconds to about 10,000 microseconds.

A45. The method of any one of embodiments A37-A44, wherein the device 800 is mounted in an instrument 1400 comprising an electric field generator 1440.

A46. The method of embodiment A45, wherein:
the electric field generator 1440 includes electrodes, and
the electrodes are about 100 micrometers to about 1000 micrometers apart.

A47. The method of embodiment A45 or A46, wherein:
the electric field generator 1440, in response to the detection of the first particle 1002, exerts the electric field in proximity to the interface 826; and
the electric field releases of the second particle 1040 from the second fluidic channel 820 into the first fluidic channel 812 in proximity to the first particle 1002 detected.

B1. The method of any one of embodiments A1-A47, wherein the first particle 1002 is from a plurality of input particles 1000 comprising: (i) a plurality 1003 of the first particle 1002 comprising the first detectable feature, and (ii) a plurality 1005 of particle 1004 not containing the first detectable feature.

B2. The method of embodiment B1, wherein the plurality 1003 of first particle 1002 is about 50% or less of the plurality of input particles 1000.

B2.1. The method of embodiment B1, wherein the plurality 1003 of first particle 1002 is about 10% or less of the plurality of input particles 1000.

B3. The method of embodiment B1 or B2 or B2.1, wherein the plurality of input particles 1000 includes about 1,000 particles to about 10 million particles.

B4. The method of embodiment B3, wherein the plurality of input particles 1000 includes about 10,000 particles to about 1 million particles.

B5. The method of any one of embodiment B1, wherein: (i) the first particle 1002 is a biological cell, (ii) the particle 1004 is a biological cell, (iii) the plurality 1003 of the first particle 1002 includes biological cells, (iv) the plurality 1005 of particle 1004 includes cells, (v) the plurality of input particles 1000 includes biological cells, (vi) the plurality of input particles 1000 consists of biological cells, and (vii) combination of any two or more of (i), (ii), (iii), (iv), (v) and (vi).

B6. The method of any one of embodiments B1-B5, wherein: (i) the first particle 1002 is not contained in a vesicle, (ii) the particle 1004 is not contained in a vesicle, (iii) the plurality 1003 of the first particle 1002 is not contained in a vesicle, (iv) the plurality 1005 of particle 1004 is not contained in a vesicle, or (v) the plurality of input particles 1000 is not contained in a vesicle.

B7. The method of any one of embodiments B1-B5, wherein: the first particle 1002 is contained in a vesicle 1032, and is from a plurality of vesicles 1030 comprising: (i) a plurality 1033 of the first vesicle 1032 containing the first particle 1002, (ii) a plurality 1035 of vesicle 1034 comprising a particle 1004 not containing the first detectable feature, and (iii) a plurality 1037 of vesicle 1036 not comprising the first particle 1002 and not containing the particle 1004.

B8. The method of any one of embodiments B1-B7, wherein each particle of the plurality of input particles 1000 or each vesicle of the plurality of vesicles 1030 is in continuous flow in the first fluidic channel 812.

B9. The method of embodiment B8, wherein:
the particles in the plurality of input particles 1000 flow through the first fluidic channel 812 at a rate of about 1 particle per second to about 1000 particles per second, or
the vesicles in the plurality of vesicles 1030 flow through the first fluidic channel 812 at a rate of about 1 vesicle per second to about 1000 vesicles per second.

B10. The method of embodiment B9, wherein:
the particles flow at a rate of about 10 particles per second to about 100 particles per second, or
the vesicles flow at a rate of about 10 vesicles per second to about 100 vesicles per second.

B11. The method of any one of embodiments A1-A47 and B1-B11, wherein:
the second particle 1040 is from a plurality 1041 of the second particle 1040, and
the plurality 1041 of the second particle 1040 includes a second detectable feature.

B12. The method of embodiment 611, wherein the plurality 1041 of the second particle 1040 includes about 100 particles to about 10 million particles.

B13. The method of embodiment B12, wherein the plurality 1041 of the second particle 1040 includes about 100 particles to about 100,000 particles.

B14. The method of any one of embodiments B11-B13, wherein the plurality 1041 of the second particle 1040 is not in continuous flow in the first fluidic channel.

B15. The method of any one of embodiments B11-614, wherein about 80% to about 100% of the plurality 1041 of the second particle 1040 is released from the second fluidic channel 820 into the first fluidic channel 812.

B16. The method of any one of embodiments B1-B15, wherein:
the output vesicle 1062 is a member of a plurality of output vesicles 1060; and
the plurality of output vesicles 1060 includes:
a plurality 1063 of the output vesicle 1062 comprising the first particle 1002 and the second particle 1040,
a plurality 1069 of an output vesicle 1068 comprising first particle 1002 and not containing the second particle 1040,
a plurality 1071 of an output vesicle 1070 containing no first particle 1002 and comprising the second particle 1040, and
a plurality 1067 of an output vesicle 1066 not containing the first particle 1002 or the second particle 1040.

B17. The method of embodiment B16, wherein:
the plurality 1063 of the output vesicle 1062 is about 80% to about 99.9% of the fraction of the plurality of output vesicles 1060 comprising the first particle 1002,
the plurality 1069 of the vesicle 1068 is about 0.1% to about 10% of the fraction of the plurality of output vesicles 1060 comprising the first particle 1002,
the plurality 1071 of the vesicle 1070 is about 0.1% to about 10% of the fraction of the plurality of output vesicles 1060 not containing the first particle 1002, and
the plurality 1067 of output vesicle 1066 is about 80% to about 99.9% of the fraction of the plurality of vesicles 260 not containing the first particle 1002.

B18. The method of embodiment B16, wherein:
the plurality 1063 of the output vesicle 1062 is about 80% to about 99.9% of the fraction of the plurality of output vesicles 1060 comprising the first particle 1002, and
the plurality 1063 of the output vesicle 1062 is about 80% to about 99.9% of the fraction of the plurality of output vesicles 1060 comprising the second particle 1040.

B19. The method of embodiment B17 or B18, wherein 10% or fewer of the plurality of input particles 1000 includes the particle 1002 or 10% or fewer of the plurality of input vesicles 1030 comprising a particle 1002 or particle 1004 includes the particle 1002.

C1. The method of any one of embodiments A1-A47 and B1-B19, wherein the first detectable feature is a light emitting agent, light absorbing agent or light diffracting agent.

C2. The method of embodiment C1, wherein the first detectable feature is a fluorophore or dye.

C3. The method of any one of embodiments A1-A47 and B1-B19 and C1-C2, wherein the second particle 1040 is a bead.

C4. The method of embodiment C3, wherein the bead is a hydrogel bead.

C5. The method of any one of embodiments A1-A47, B1-B19 and C1-C4, wherein the second particle 1040 includes a second detectable feature.

C6. The method of embodiment C5, wherein the plurality 1041 of the second particle 1040 includes a second detectable feature.

C7. The method of embodiment C6, wherein the second detectable feature for the plurality 1041 of the second particle 1040 includes a single detectable feature or a plurality of different detectable feature species.

C8. The method of any one of embodiments C5-C7, wherein the second detectable feature is a polynucleotide or polypeptide.

C9. The method of embodiment C8, wherein the polynucleotide is a member of a plurality of polynucleotides comprising a minimum number of different polynucleotide sequences.

C10. The method of embodiment C8, wherein the polypeptide is one or more antigens to which one or more binding molecules specifically bind.

C11. The method of any one of embodiments A1-A47, B1-B19 and C1-C10, wherein the device 800 is mounted in an instrument 1400 comprising an optics module 1405.

C12. The method of embodiment C11, wherein the optics module 1405 includes an imaging sensor 1410.

C13. The method of embodiment C11 or C12, wherein the optics module 1405 includes a photon detector 1415.

C14. The method of embodiment C12 or C13, wherein the first particle 1002 is detected at the detection zone 850 by the imaging sensor 1410, the photon detector 1415, or the imaging sensor 1410 and the photon detector 1415.

C15. The method of any one of embodiments A1-A47, B1-B19 and C1-C13, comprising illuminating the first particle 1002 at or near the detection zone 850.

C16. The method of any one of embodiments C11-C13, wherein the optics module 1405 includes an illumination module 1420 manufactured to provide illumination at or near the detection zone 850.

C17. The method of embodiment C15 or C16, wherein the detectable feature of the first particle 1002 is a fluorophore, and the first particle 1002 is illuminated by light from the illumination module 1420 at an excitation wavelength of the fluorophore.

C18. The method of any one of embodiments A1-A47, B1-B19 and C1-C17, wherein the device 10 is mounted in an instrument 1400 comprising a controller 1425 manufactured to coordinate the releasing of the second particle 1040 in response to the detection of the first particle 1002 at the detection zone 850.

C19. The method of embodiment C18, wherein the instrument 1400 includes a pressure generator 1430 in fluid communication with the second fluidic channel 820, and the controller 1425 controls the pressure generator 1430.

C20. The method of embodiment C18, wherein the instrument 1400 includes an electric field generator 1440 manufactured to generate an electric field at the interface 826, and the controller 1425 controls the electric field generator 1440.

C21. The method of embodiment C19 or C20, wherein the controller 1425 controls the pressure generator 1430 or the electric field generator 1440 in response to the detection by the optics module 1405.

C22. The method of any one of embodiments A1-A47, B1-B19 and C1-C21, wherein the first fluidic channel 812 includes a delay region 813 disposed between the detection zone 850 and the interface 826.

D1. The method of any one of embodiments A1-A47, B1-B19 and C1-C22, wherein:
the device 800 includes a third fluidic channel intersecting the first fluidic channel 812, the third fluidic channel includes an opening at an interface with the first fluidic channel 812,
the interface between the third fluidic channel and the first fluidic channel 812 is disposed between (i) the interface 826 of the second fluidic channel 820 with the first fluidic channel 812 and (ii) the outlet 817 of the first fluidic channel 812.

D2. The method of embodiment D1, wherein:
the third fluidic channel includes a proximal region and a distal region,
the proximal region of the third fluidic channel includes a first interface with the first fluidic channel 812,
the distal region of the third fluidic channel includes a second interface with the first fluidic channel, and
the first interface opposes the second interface.

D3. The method of embodiment D1 or D2, wherein the first fluidic channel 812, the second fluidic channel 820 and the third fluidic channel independently are tubular.

D4. The method of embodiment D3, wherein the first fluidic channel 812, the second fluidic channel 820 and the third fluidic channel independently are cylindrical.

D5. The method of any one of embodiments D1-D4, wherein the first fluidic channel 812 width, the second fluidic channel 820 width and the third fluidic channel width independently is about 5% to about 20% larger than the larger diameter of (i) the first particle diameter and (ii) the second particle diameter.

D6. The method of embodiment D5, wherein the first fluidic channel 812 width, the second fluidic channel 820 width and the third fluidic channel width independently is about 20 micrometers to about 100 micrometers.

D7. The method of any one of embodiments D1-D6, wherein the device 10 includes a well in fluid connection with the first fluidic channel 812, a well in fluid connection with the second fluidic channel 820, a well in fluid connection with the third fluidic channel, or combination thereof.

D8. The method of any one of embodiments A1-A47, B1-B19, C1-C22 and D1-D8, comprising flowing a first fluid into the inlet 816 of the first fluidic channel 812.

D9. The method of embodiment D8, wherein the first fluid includes the first particle 1002, the plurality of input particles 1000, vesicle 1032 comprising the first particle 1002, the plurality of input vesicles 1030 or combination thereof.

D10. The method of embodiment D8 or D9, where the first fluid is flowed in the direction of the inlet 816 to the outlet 817 of the first fluidic channel 812.

D11. The method of any one of embodiments A1-A47, B1-B19, C1-C22 and D1-D10, comprising flowing a second fluid into the distal region 822 of the second fluidic channel 820.

D12. The method of embodiment D11, wherein the second fluid includes second particle 1040 or the plurality 1041 of second particle 1040.

D13. The method of embodiment D11 or D12, wherein the second fluid is flowed in the second fluidic channel 820 in the direction of the distal region 822 to the interface 826 of the first fluidic channel 812.

D14. The method of any one of embodiments A1-A47, B1-B19, C1-C22 and D1-13, comprising flowing a third fluid through the third fluidic channel.

D15. The method of embodiment D14, wherein the third fluid flows through the third fluidic channel towards the first fluidic channel 812.

D16. The method of any one of embodiments D8-015, wherein the first fluid includes the plurality of input particles 1000.

D17. The method of embodiment D16, wherein the first fluid and the second fluid are miscible.

D18. The method of embodiment 016 or D17, wherein the first fluid, the second fluid or the first fluid and the second fluid independently is an aqueous fluid.

D19. The method of any one of embodiments D16-D18, wherein the first fluid includes a buffer agent, the second fluid includes a buffer agent, or the first fluid and the second fluid independently include a buffer agent.

D20. The method of any one of embodiments D16-D19, wherein the second fluid independently includes a detergent agent, a surfactant agent or an agent exhibiting detergent and surfactant properties.

D21. The method of embodiment D20, wherein the second fluid includes a non-ionic surfactant agent.

D22. The method of any one of embodiments D16-021, wherein the first fluid does not contain one or more of: a detergent agent, a surfactant agent, a non-ionic surfactant agent, and an agent exhibiting detergent and surfactant properties.

D23. The method of any one of embodiments D16-D21, wherein the third fluid interacts with the fluid in the first fluidic channel 812 between second fluidic channel 820 and third fluidic channel and forms vesicles.

D24. The method of embodiment D23, wherein the third fluid is immiscible with the fluid in the first fluidic channel 812 between second fluidic channel 820 and third fluidic channel.

D25. The method of embodiment D23 or D24, wherein the third fluid is a non-aqueous fluid.

D26. The method of embodiment D25, wherein the third fluid includes an oil.

D27. The method of embodiment D26, wherein the oil is a fluorinated oil.

D28. The method of embodiment D26, wherein the oil is a hydrocarbon oil.

D29. The method of any one of embodiments D8-D15, wherein the first fluid includes the plurality of input vesicles 1030.

D30. The method of embodiment D29, wherein vesicles of the plurality of input vesicles 1030 include an interior comprising an aqueous fluid.

D31. The method of embodiment D29 or D30, wherein the first fluid is a non-aqueous fluid. D32. The method of embodiment D31, wherein the first fluid includes an oil.

D33. The method of embodiment D32, wherein the oil is a fluorinated oil.

D34. The method of embodiment D32, wherein the oil is a hydrocarbon oil.

D35. The method of any one of embodiments D30-034, wherein the second fluid and the aqueous fluid of the vesicle interior are miscible.

D36. The method of embodiment D35, wherein the second fluid is an aqueous fluid.

D37. The method of embodiment D35 or D36, wherein the second fluid independently includes a buffer agent.

D38. The method of any one of embodiments D35-D37, wherein the second fluid independently includes a detergent agent, a surfactant agent or an agent exhibiting detergent and surfactant properties.

D36. The method of embodiment D38, wherein the second fluid includes a non-ionic surfactant agent.

D40. The method of any one of embodiments A1-A47, B1-B19, C1-C22 and D1-D39, wherein vesicles of the plurality of output vesicles 1060 include an interior comprising an aqueous fluid.

D41. The method of embodiment D40, wherein the plurality of output vesicles 1060 are in a non-aqueous output fluid.

E1. A fluidic device 810, comprising:
a first fluidic channel 812 and a second fluidic channel 820 each disposed in a substrate 811, wherein:
the first fluidic channel 812 includes a proximal region 814, a distal region 818, an inlet 816 in the proximal region 814 and an outlet 817 in the distal region 818;
the second fluidic channel 820 includes a distal region 822, a proximal region 821 and a proximal terminus 824;
the second fluidic channel 820 intersects the first fluidic channel 812 at an interface 826 disposed between the inlet 816 and outlet 817; and
the second fluidic channel 820 includes a minimum width and a maximum width and a constriction 829 disposed at the minimum width of the second fluidic channel 820; and the constriction 829 is disposed (i) at the proximal terminus 824, or (H) between the proximal terminus 824 and the distal region 822.

E2. The fluidic device of embodiment E1, comprising:
a detection zone 850 at the first fluidic channel 812 disposed between the inlet 816 and the interface 826; and
a delay region 813 in the first fluidic channel 812 disposed between the detection zone 850 and the interface 826.

E3, The fluidic device of embodiment E1 or E2, wherein:
the constriction 829 is in the proximal region 821 of the second fluidic channel 820, or at the junction between the proximal region and the distal region 822 of the second fluidic channel 820, and
the constriction 829 is not in the distal region 822 of the second fluidic channel 820.

E4. The fluidic device of embodiment E4, wherein:
the proximal region of the second fluidic channel 820 is a frustum,
the distal region 822 is a cylinder adjoining the frustum, and
the diameter of the frustum tapers from the distal region 822 to the proximal terminus 824.

E5. The fluidic device of embodiment E4, wherein:
the proximal region 821 of the second fluidic channel 820 is a first cylinder having a first diameter,
the distal region 822 is a second cylinder having a second diameter adjoining the first cylinder, and
the first diameter is less than the second diameter.

E6. The fluidic device of any one of embodiments E1-E5, wherein:
the constriction 829 includes a width (W),
the second fluidic channel is manufactured to contain a second particle 1040 comprising a diameter (D),
the width (W) of the constriction 829 equals the product of y*D, and
y is about 0.1 to about 0.75.

E7. The fluidic device of embodiment E16, wherein y is about 0.2 to about 0.5.

E8. The fluidic device of any one of embodiments embodiment E12, wherein:
the distal region 822 of the second fluidic channel 22 includes a minimum width (W2),
the constriction 829 includes a width (W),
the second fluidic channel is manufactured to contain a second particle 1040 comprising a diameter (D), the minimum width (W2) is between (a) the product of 2*W, and (b) the larger value of: (i) about the product of 2*D, or (ii) about the product of 4*W.

E9. The fluidic device of any one of embodiments E1-E5, wherein:
the distal region 822 of the second fluidic channel 22 includes a minimum width (W2),
the constriction 829 includes a width (W),
the second particle 1040 includes a diameter (D),
the proximal region includes an axial length (L) between (a) W2, and (b) the larger value of: (i) about the product of 2*D, or (ii) about the product of 4*W.

E10. The fluidic device of any one of embodiments E1-E9, wherein:
the first fluidic channel 902 is manufactured to contain a first particle 1002;
the second channel is manufactured to contain a second particle 1040; and
the first particle 1002 and the second particle 1040 each includes a diameter
independently chosen from about 20 micrometers to about 100 micrometers.

E11. The fluidic device of embodiment E10, wherein the diameter is independently chosen from about 30 micrometers to about 60 micrometers.

E12. The fluidic device of any one of embodiments E1-E11, wherein the constriction 829 includes a width of about 10 micrometers to about 30 micrometers.

E13. The fluidic device of any one of embodiments E1-E12, wherein the second particle 1040 includes a stiffness independently chosen from about 3 kPa to about 100 kPa.

E14. The fluidic device of embodiment E13, wherein the stiffness is independently chosen from about 5 kPa to about 10 kPa.

E15. The fluidic device of any one of embodiments E6-E14, wherein the second particle 1040 is a hydrogel bead.

E16. The fluidic device of any one of embodiments E1-E15, comprising one or more relief channels disposed between the first fluidic channel 812 and the second fluidic channel 820.

E17. The fluidic device of embodiment E16, wherein the one or more relief channels each includes an opening at the distal region 822 of the second fluidic channel 820 and an opening at the first fluidic channel 812.

E18. The fluidic device of embodiment E16 or E17, wherein the fluidic device 800 includes two more relief channels, wherein one of the relief channels includes an opening at the first fluidic channel 812 disposed on one side of the interface 826, and another of the relief channels includes an opening at the first fluidic channel 812 disposed on an opposing side of the interface 826.

E19. The fluidic device of any one of embodiments E16-E18, wherein:
each of the relief channels includes a width (w),
the second particle 1040 includes a diameter (D),
the width (w) of each of the relief channels is greater than 5 micrometers and less than the product of z*D, and
z is about 0.1.

E20. An instrument 1400, comprising:
the device 810 of any one of embodiments E1-E19;
an optics module 1405 manufactured to detect a particle comprising a first detectable feature at the detection zone 850 at the first fluidic channel 812;
an optional pressure generator 1430 in fluid connection with the second fluidic channel 820;
an optional electric field generator 1440 manufactured to generate an electric field at interface 826; and
a controller 1425 manufactured to actuate the optional pressure generator 1430 or the optional electric field generator 1440 in response to detection of the first detectable feature of a particle in the detection zone 850 by the optics module 1405.

E21. The instrument of embodiment E20, comprising the pressure generator 1430.

E22. The instrument of embodiment E21, wherein the pressure generator is manufactured to exert a first pressure in the second fluidic channel 820 in a direction from the distal region 822 to the proximal region 821 of the second fluidic channel 820.

E23. The instrument of embodiment E22, wherein the first pressure is about 1 kPa to about 5 kPa above the pressure in the first fluidic channel 812.

E24. The instrument of embodiment E22 or E23, wherein the pressure generator 1430 is manufactured to exert a pressure differential in the second fluidic channel 820.

E25. The instrument of embodiment E22 or E23, wherein the pressure generator 1430 is manufactured to exert multiple pressure differential pulses in the second fluidic channel 820.

E26. The instrument of embodiment E25, wherein each of the pressure differential pulses includes the first pressure and a second pressure greater than the first pressure.

E27. The instrument of embodiment E26, wherein the pressure differential between the first pressure and the second pressure is about 0.5 kPa to about 10 kPa.

E28. The instrument of embodiment E26, wherein the pressure differential between the first pressure and the second pressure is about 1 kPa to about 20 kPa.

E29. The instrument of embodiment E26, wherein the pressure differential between the first pressure and the second pressure is about 1 kPa to about 50 kPa.

E30. The instrument of any one of embodiments E25-E29, wherein each of the pressure differential pulses is about 1 ms to about 10 ms in duration.

E31. The instrument of any one of embodiments E25-E29, wherein each of the pressure differential pulses is about 5 ms to about 100 ms in duration.

E32. The instrument of any one of embodiments E25-E29, wherein each of the pressure differential pulses is about 1 s or greater in duration.

E33. The instrument of any one of embodiments E25-E29, wherein each of the pressure differential pulses is longer than about 2 milliseconds in duration and lower than about 25 kPa in pressure.

E34. The instrument of any one of embodiments E25-E33, wherein the first pressure is about 1 kPa to about 10 kPa, the second pressure is about 1.5 to about 3 times the first pressure.

E35. The instrument of any one of embodiments E25-E33, wherein each of the pressure differential pulses includes a third pressure less than the second pressure and greater than the first pressure.

E36. The instrument of embodiment E35, wherein the third pressure is about 0.9 to about 1.5 times the first pressure.

E37. The instrument of embodiment E20, comprising the electric field generator 1440.

E38. The instrument of embodiment E37, wherein the electric field generator 1440 is manufactured to generate electric field pulses.

E39. The instrument of embodiment E37 or E38, wherein the electric field generator 1440 is manufactured to generate an electric field that exerts a dielectrophoretic force.

E39.1. The instrument of embodiment E39, wherein the electric field causes a second particle 1040 to release from the second fluidic channel 820, through the constriction 829, into the first fluidic channel 812.

E40. The instrument of any one of embodiment E37-E39.1, wherein the electric field generator 1440 is manufactured to generate an alternating electric field.

E41. The instrument of embodiment E40, wherein the alternating electric field includes a root mean square amplitude of about 50 volts to about 500 volts.

E42. The instrument of embodiment E40 or E41, wherein the alternating electric field includes a frequency of about 20 kHz to about 200 kHz.

E43. The instrument of embodiment E42, wherein the frequency is about 40 kHz to about 70 kHz.

E44. The instrument of any one of embodiments E39-E43, wherein the alternating electric field includes a duration of about 100 microseconds to about 10,000 microseconds.

E45. The instrument of any one of embodiments E39-E44, wherein:
the electric field generator 1440 includes electrodes, and
the electrodes are about 100 micrometers to about 1000 micrometers apart.

F1. A fluidic device 900, comprising:
  a first fluidic channel 902, a second fluidic channel 920, and a third fluidic channel 930 each disposed in a substrate 901, wherein:
  the first fluidic channel 902 includes a proximal region 904, an inlet 906 in the proximal region 904, a distal region 908, and an outlet 807 in the distal region 908;
  the second fluidic channel 920 includes a distal region 922, a proximal region 921 and a proximal terminus 924;
  the second fluidic channel 920 intersects the first fluidic channel 902 at an interface 926 disposed between the inlet 916 and outlet 917;
  the third fluidic channel 930 intersects the first fluidic channel 902 at an interface 936 disposed between (i) the interface 926 of the second fluidic channel 920 and the first fluidic channel 902, and (ii) outlet 917;
  the second fluidic channel 920 includes a minimum width and a maximum width and a constriction 929 disposed at the minimum width of the second fluidic channel 920; and
  the constriction 929 is disposed (i) at the proximal terminus 924, or (ii) between the proximal terminus 924 and the distal region 922 of the second fluidic channel 920.

F2. The fluidic device of embodiment F1, comprising:
  a detection zone 950 at the first fluidic channel 902 disposed between the inlet 906 and the interface 926; and
  a delay region 913 in the first fluidic channel 902 disposed between the detection zone 950 and the interface 926.

F3. The fluidic device of embodiment F1 or F2, wherein:
  the constriction 929 is in the proximal region 921 of the second fluidic channel 920, or at the junction between the proximal region and the distal region 922 of the second fluidic channel 920, and
  the constriction 929 is not in the distal region 922 of the second fluidic channel 920.

F4. The fluidic device of embodiment F4, wherein:
  the proximal region of the second fluidic channel 920 is a frustum,
  the distal region 922 is a cylinder adjoining the frustum, and
  the diameter of the frustum tapers from the distal region 922 to the proximal terminus 924.

F5. The fluidic device of embodiment F4, wherein:
  the proximal region 921 of the second fluidic channel 920 is a first cylinder having a first diameter,
  the distal region 922 is a second cylinder having a second diameter adjoining the first cylinder, and
  the first diameter is less than the second diameter.

F6. The fluidic device of any one of embodiments F1-F5, wherein:
  the constriction 929 includes a width (W),
  the second fluidic channel is manufactured to contain a second particle 1040 comprising a diameter (D),
  the width (W) of the constriction 929 equals the product of y*D, and
  y is about 0.1 to about 0.75.

F7. The fluidic device of embodiment F16, wherein y is about 0.2 to about 0.5.

F8. The fluidic device of any one of embodiments embodiment F12, wherein:
  the distal region 922 of the second fluidic channel 22 includes a minimum width (W2),
  the constriction 929 includes a width (W),
  the second fluidic channel is manufactured to contain a second particle 1040 comprising a diameter (D),
  the minimum width (W2) is between (a) the product of 2*W, and (b) the larger value of: (i) about the product of 2*D, or (ii) about the product of 4*W.

F9. The fluidic device of any one of embodiments F1-F5, wherein:
  the distal region 922 of the second fluidic channel 22 includes a minimum width (W2),
  the constriction 929 includes a width (W),
  the second particle 1040 includes a diameter (D),
  the proximal region includes an axial length (L) between (a) W2, and (b) the larger value of: (i) about the product of 2*D, or (ii) about the product of 4*W.

F10. The fluidic device of any one of embodiments F1-F9, wherein:
  the first fluidic channel 902 is manufactured to contain a first particle 1002;
  the second channel is manufactured to contain a second particle 1040; and
  the first particle 1002 and the second particle 1040 each includes a diameter independently chosen from about 20 micrometers to about 100 micrometers.

F11. The fluidic device of embodiment F10, wherein the diameter is independently chosen from about 30 micrometers to about 60 micrometers.

F12. The fluidic device of any one of embodiments F1-F11, wherein the constriction 929 includes a width of about 10 micrometers to about 30 micrometers.

F13. The fluidic device of any one of embodiments F1-F12, wherein the second particle 1040 includes a stiffness independently chosen from about 3 kPa to about 100 kPa.

F14. The fluidic device of embodiment F13, wherein the stiffness is independently chosen from about 5 kPa to about 10 kPa.

F15. The fluidic device of any one of embodiments F6-F14, wherein the second particle 1040 is a hydrogel bead.

F16. The fluidic device of any one of embodiments F1-F15, comprising one or more relief channels disposed between the first fluidic channel 902 and the second fluidic channel 920.

F17. The fluidic device of embodiment F16, wherein the one or more relief channels each includes an opening at the distal region 922 of the second fluidic channel 920 and an opening at the first fluidic channel 902.

F18. The fluidic device of embodiment F16 or F17, wherein the fluidic device 900 includes two more relief channels, wherein one of the relief channels includes an opening at the first fluidic channel 902 disposed on one side of the interface 926, and another of the relief channels includes an opening at the first fluidic channel 902 disposed on an opposing side of the interface 926.

F19. The fluidic device of any one of embodiments F16-F18, wherein:
each of the relief channels includes a width (w),
the second particle 1040 includes a diameter (D),
the width (w) of each of the relief channels is greater than 5 micrometers and less than the product of z*D, and
z is about 0.1.

F20. An instrument 1400, comprising:
the device 900 of any one of embodiments F1-F19;
an optics module 1405 manufactured to detect a particle comprising a first detectable feature at the detection region 950 at the first fluidic channel 902;
an optional pressure generator 1430 in fluid connection with the second fluidic channel 920; and
an optional electric field generator 1440 manufactured to generate an electric field at interface 926.

F20.1. The instrument of embodiment F20, comprising a controller 1425 manufactured to (i) actuate the pressure generator 1430, or (ii) actuate the electric field generator 1440, in response to detection of the first detectable feature of a particle in the detection zone 950 by the optics module 1405.

F21. The instrument of embodiment F20 or F20.1, comprising the pressure generator 1430.

F22. The instrument of embodiment F21, wherein the pressure generator is manufactured to exert a first pressure in the second fluidic channel 920 in a direction from the distal region 922 to the proximal region 921 of the second fluidic channel 920.

F23. The instrument of embodiment F22, wherein the first pressure is about 1 kPa to about 5 kPa above the pressure in the first fluidic channel 902.

F24. The instrument of embodiment F22 or F23, wherein the pressure generator 1430 is manufactured to exert a pressure differential in the second fluidic channel 920.

F25. The instrument of embodiment F22 or F23, wherein the pressure generator 1430 is manufactured to exert multiple pressure differential pulses in the second fluidic channel 920.

F26. The instrument of embodiment F25, wherein each of the pressure differential pulses includes the first pressure and a second pressure greater than the first pressure.

F27. The instrument of embodiment F26, wherein the pressure differential between the first pressure and the second pressure is about 0.5 kPa to about 10 kPa.

F28. The instrument of embodiment F26, wherein the pressure differential between the first pressure and the second pressure is about 1 kPa to about 20 kPa.

F29. The instrument of embodiment F26, wherein the pressure differential between the first pressure and the second pressure is about 1 kPa to about 50 kPa.

F30. The instrument of any one of embodiments F25-F29, wherein each of the pressure differential pulses is about 1 ms to about 10 ms in duration.

F31. The instrument of any one of embodiments F25-F29, wherein each of the pressure differential pulses is about 5 ms to about 100 ms in duration.

F32. The instrument of any one of embodiments F25-F29, wherein each of the pressure differential pulses is about 1 s or greater in duration.

F33. The instrument of any one of embodiments F25-F29, wherein each of the pressure differential pulses is longer than about 2 milliseconds in duration and lower than about 25 kPa in pressure.

F34. The instrument of any one of embodiments F25-F33, wherein the first pressure is about 1 kPa to about 10 kPa, the second pressure is about 1.5 to about 3 times the first pressure.

F35. The instrument of any one of embodiments F25-F33, wherein each of the pressure differential pulses includes a third pressure less than the second pressure and greater than the first pressure.

F36. The instrument of embodiment F35, wherein the third pressure is about 0.9 to about 1.5 times the first pressure.

F37. The instrument of embodiment F20, comprising the electric field generator 1440.

F38. The instrument of embodiment F37, wherein the electric field generator 1440 is manufactured to generate electric field pulses.

F39. The instrument of embodiment F37 or F38, wherein the electric field generator 1440 is manufactured to generate an electric field that exerts a dielectrophoretic force.

F39.1. The instrument of embodiment F38 or F39, wherein the electric field causes a second particle 1040 to release from the second fluidic channel 920, through the constriction 929, into the first fluidic channel 902.

F40. The instrument of any one of embodiment F37-F39.1, wherein the electric field generator 1440 is manufactured to generate an alternating electric field.

F41. The instrument of embodiment F40, wherein the alternating electric field includes a root mean square amplitude of about 50 volts to about 500 volts.

F42. The instrument of embodiment F40 or F41, wherein the alternating electric field includes a frequency of about 20 kHz to about 200 kHz.

F43. The instrument of embodiment F42, wherein the frequency is about 40 kHz to about 70 kHz.

F44. The instrument of any one of embodiments F39-F43, wherein the alternating electric field includes a duration of about 100 microseconds to about 10,000 microseconds.

F45. The instrument of any one of embodiments F39-F44, wherein:
the electric field generator 1440 includes electrodes, and
the electrodes are about 100 micrometers to about 1000 micrometers apart.

G1: An optics module 30 for use with a microfluidic chip 27 comprising particles flowing from a detection zone 51 to a selection zone 52, the module 30 comprising:
- a first image sensor 110 that defines a first image sensor optical path 135 that intersects the selection zone 52, wherein: the first image sensor optical path 135 comprises an objective 111 with a numeric aperture of less than 0.3; and the first image sensor 110 is constructed to capture images of the particles in the selection zone 52;
- a plurality of lasers 130 that define a laser optical path 150 and intersects the detection zone 51, the plurality of lasers 130 constructed to induce fluorescence excitation in the particles;
- a fluorescence detector assembly 125 that defines a fluorescence detector optical path 145 that intersects the detection zone 51, wherein: a portion of the fluorescence detector optical 145 path is along the laser optical path 150; and the fluorescence detector assembly 125 is constructed to detect the fluorescence excitation in the particles;
- a second image sensor 112 that defines a second image sensor optical path 140 that intersects the detection zone 51, wherein: a portion of the second image sensor optical path 140 is along the laser optical path 150; the second image sensor optical path 140 comprises an objective 113 with a numeric aperture of greater than 0.3; and the second image sensor 112 is constructed to capture images of the particles in the detection zone 51.

G2: The optics module of claim G1, wherein the fluorescence detector assembly 125 comprises a plurality of fluorescence detectors 126 and a plurality of filters 127 constructed to detect the fluorescence excitation in the particles at a plurality of wavelengths.

G3: The optics module of claim G2, wherein the plurality of wavelengths is selected from a group consisting of: 405 nm, 452 nm, 525 nm, 600 nm, and 680 nm.

G4: The optics module of claim G1, wherein the plurality of lasers 130 emit laser light at a plurality of wavelengths.

G5: The optics module of claim G4, wherein the plurality of wavelengths is selected from a group consisting of: 405 nm, 488 nm, 561 nm, and 638 nm.

G6: The optics module of claim G1, further comprising:
- a first light source 152 constructed to illuminate the particles in the selection zone 52, the first light source located on the same optical axis as the first image sensor optical path 135; and
- a second light source 152 constructed to illuminate the particles in the detection zone 51, the second light source located on the same optical axis as the second image sensor optical path 140.

G7: The optics module of claim G6, wherein the first light source 152 and second light source 152 emit infrared light.

G8: The optics module of claim G1, wherein the first and second image sensors (110, 112) are constructed to capture and to transmit at least 2000 image frames/s with a latency time of less than 100 us.

G9: The optics module of claim G1, wherein the fluorescence detector assembly 125 comprises a plurality of fluorescence detectors 126, each in the plurality of fluorescence detectors comprised of a silicon photomultiplier (SiPM).

G10: The optics module of claim G1, further comprising a processor 10 connected to the first image sensor 110, the second image sensor 112, the fluorescence detector assembly 125 and the plurality of lasers 130.

G11: An optics module for use with a microfluidic chip 27 comprising particles flowing there through, the module comprising:
- a plurality of lasers 130 constructed to induce fluorescence excitation in the particles;
- a fluorescence detector assembly 125 with a plurality of silicon photomultiplier (SiPM) fluorescence detectors 126 constructed to detect the fluorescence excitation in the particles;
- a processor connected to the plurality of SiPM fluorescence detectors, the processors configured to perform the following steps for each SiPM in the plurality:
  - a. determine when the SiPM detects a pulse of fluorescence excitation in excess of a discrimination threshold (Steps 305, 310);
  - b. when the threshold is exceeded;
    1. determine the number of photons detected by the SiPM during which the threshold is exceeded (Steps 320, 325, 365);
    2. determine analog signal measurements detected by the SiPM at sample intervals during which the threshold is exceeded (Step 330);
    3. determine a time during which the threshold is exceeded (Steps 315, 340);
  - c. sum the analog signal measurements of step b(2) (Step 345);
  - d. normalize the sum of step (c) by the time in step b(3) (Step 350);
  - e. if the normalized sum of step (d) exceeds a threshold, then output the normalized sum in step (d) (Steps 355, 360) and the time in step b(3); and
  - f. if the normalized sum of step (d) does not exceed a threshold, then:
    1. normalize the number of photos in step b(1) by the time in step b(3) (Step 370);
    2. based on the normalized photon count of step f(1), estimate an analog measurement (Step 375);
    3. output the estimated analog measurement and the time in step b(3) (Step 380).

G12: The optics module of claim G11, wherein step f(2) is based on a lookup table associating total photon counts to estimated analog measurements, wherein the association is not linear.

G13: The optics module of claim G11, wherein the processor performs the following steps:
- estimates a mean fluorescence for the plurality of SiPM fluorescence detectors based on the outputs of steps e and f(3); and
- estimates the particle size based on the time in step b(3) and the mean fluorescence.

G14: The optics module of claim G11, wherein the processor performs the following steps:
- estimate a mean coefficient of variance for the plurality of SiPM fluorescence detectors based on the outputs of steps e and f(3);
- estimate the particle morphology based on the time in step b(3) and the mean coefficient of variance.

G15: A system for selective microfluidic particle processing, comprising:
- a microfluidic chip 27 comprising particles flowing through a detection zone 51;
- a plurality of lasers 130 constructed to induce fluorescence excitation in particles in the detection zone 51;

a plurality of silicon photomultiplier (SiPM) fluorescence detectors 126 constructed to take analog signal measurements and photon counts of the fluorescence excitation in particles in the detection zone.

G16: A method of selective microfluidic particle processing, comprising:
providing laser excitation of the detection zone of the system of claim G15 using the plurality of lasers 130,
simultaneously detecting photons emitted from the detection zone using the SiPM and measuring analog signals using the SiPM, G17: A system for selective microfluidic particle processing, comprising:
a microfluidic chip 27 comprising particles flowing through a detection zone 51;
a plurality of lasers 130 constructed to induce fluorescence excitation in particles in the detection zone 51;
a plurality of silicon photomultiplier (SiPM) fluorescence detectors 126 constructed to detect the fluorescence excitation in particles in the detection zone 51; and
a processor 10 connected to the plurality of SiPM fluorescence detectors 126, the processors 10 configured to perform the following steps for each SiPM in the plurality:
a. determine when the SiPM detects a pulse of fluorescence excitation in excess of a discrimination threshold (Steps 305, 310);
b. when the threshold is exceeded;
  1. determine the number of photons detected by the SiPM during which the threshold is exceeded (Steps 320, 325, 365);
  2. determine analog signal measurements detected by the SiPM at sample intervals during which the threshold is exceeded (Step 330);
  3. determine a time during which the threshold is exceeded (Steps 315, 340);
c. sum the analog signal measurements of step b(2) (Step 345);
d. normalize the sum of step (c) by the time in step b(3) (Step 350);
e. if the normalized sum of step (d) exceeds a threshold, then output the normalized sum in step (d) (Steps 355, 360) and the time in step b(3); and
f. if the normalized sum of step (d) does not exceed a threshold, then:
  1. normalize the number of photos in step b(1) by the time in step b(3) (Step 370);
  2. based on the normalized photon count of step f(1), estimate an analog measurement (Step 375);
  3. output the estimated analog measurement and the time in step b(3) (Step 380).

G18: A system for selective microfluidic particle processing, comprising:
a microfluidic chip 27 having a chip inlet, a detection zone 51, a selection zone 52 and a chip outlet;
a processor 10;
a pressure pulse generator module 20 connected to the processor 10, the pressure pulse generator module 20 constructed to produce a pressure pulse to the chip inlet and to the chip outlet;
an optics module 30 connected to the processor 10, the optics module 30 comprising: a first image sensor 110 that defines a first image sensor optical path 135 that intersects the selection zone 52, wherein: the first image sensor optical path 135 comprising an objective 111 with a numeric aperture of less than 0.3; and the first image sensor 110 is constructed to capture images of the particles in the selection zone 52;
a plurality of lasers 130 that define a laser optical path 130 that intersects the detection zone 51, the plurality of lasers 130 constructed to induce fluorescence excitation in the particles;
a fluorescence detector assembly 125 that defines a fluorescence detector optical path 145 that intersects the detection zone 51, wherein: a portion of the fluorescence detector optical 145 path is along the laser optical path 130; and the fluorescence detector assembly 125 is constructed to detect the fluorescence excitation in the particles;
a second image sensor 112 that defines a second image sensor optical path 140 that intersects the detection zone 51, wherein: a portion of the second image sensor optical path 140 is along the laser optical path 130; the second image sensor optical path 140 comprises an objective 113 with a numeric aperture of greater than 0.3; and the first image sensor 112 is constructed to capture images of the particles in the detection zone 51.
wherein the processor receives data from the optic module 30, processes the data and actuates the pressure pulse generator module 20 based on processed data.

G19: The system of claim G18, wherein the detection zone 51 is separated from the selection zone 52 by a delay line 50, wherein the magnitude of the delay line 50 is sufficient to allow:
(1) the processor 10 to process the data received from the optics module 30;
(2) the processor 10 to actuate the pressure pulse generator module 20; and
(3) the pressure pulse generator module 20 to create a pressure pulse at the chip outlet.

G20: The system of claim G18, wherein the fluorescence detector assembly 125 comprises a plurality of fluorescence detectors 126 and a plurality of filters 127 constructed to detect the fluorescence excitation in the particles at a plurality of wavelengths.

G21: The system of claim G20, wherein the plurality of wavelengths is selected from a group consisting of: 405 nm, 452 nm, 525 nm, 600 nm, and 680 nm.

G22: The system of claim G18, wherein the plurality of lasers 130 emit laser light at a plurality of wavelengths.

G23: The system of claim G18, further comprising:
a first light source 152 constructed to illuminate the particles in the selection zone 52, the first light source located on the same optical axis as the first image sensor optical path 135; and
a second light source 152 constructed to illuminate the particles in the detection zone 51, the second light source located on the same optical axis as the second image sensor optical path 140.

H1: A pressure pulse generator module 20 for use with a microfluidic chip 27 having a chip inlet and a chip outlet, the module 20 comprising:
a processor 10;
a plurality of subassemblies 22, each subassembly comprising: a first pump 62 connected to the processor 10 and constructed to deliver a first pressure to a first solenoid valve 70, which is constructed to allow fluid communication between the first pump 62 and either a vent or a second solenoid valve 75;
a second pump 65 connected to the processor 10 and constructed to deliver a second pressure to the second solenoid valve 75; an outlet connected to the second solenoid valve 75, where the second solenoid valve 75 is constructed to allow fluid communication between the outlet and either the second pump 65 or the first solenoid valve 70; a first solenoid valve control circuit 61 connected to the processor 10 and to the first solenoid valve 70; and a second solenoid valve control circuit 61 connected to the processor 10 and to the second solenoid valve 75; wherein the first pressure is lower than the second pressure;

wherein the outlet of one of the plurality of subassemblies is connected to the chip inlet; and wherein the outlet of one of the plurality of subassemblies is connected to the chip outlet.

H2: The pressure pulse generator module of claim H1, comprising four subassemblies.

H3: The pressure pulse generator module of claim H1, wherein each subassembly further comprises:
a first pressure sensor 90 constructed to detect the pressure between the first solenoid valve 70 and the second solenoid valve 75;
a second pressure sensor 95 constructed to detect the pressure between the second pump 65 and the second solenoid valve 75; and
a third pressure sensor 100 constructed to detect the pressure between the second solenoid valve 75 and the outlet;
wherein the first, second and third pressure sensors are connected to the processor 10.

H4: The pressure pulse generator module of claim H1, wherein each subassembly further comprises:
a first expansion volume 80 fluidly connected to the second pump 65 and the second solenoid valve 75; and
a second expansion volume 85 fluidly connected to the second solenoid valve 75 and the first solenoid valve 70.

H5: The pressure pulse generator module of claim 1, wherein the outlet comprises a microfluidic trap 102.

H6: The pressure pulse generator module of claim 1, wherein the processor 10 is configured to actuate the first solenoid valve and the second solenoid valve to create a pressure pulse that starts at substantially the first pressure and increases to substantially the second pressure and returns to substantially the first pressure.

H7: The pressure pulse generator of claim H6, wherein the difference between the first and second pressure is one of the following:
up to 10 kPa, and the pressure pulse reaches a peak that is within 100 Pa of the second pressure;
up to 20 kPa, and the pressure pulse reaches a peak that is within 150 Pa of the second pressure; or
up to 50 kPa, and the pressure pulse reaches a peak that is within 200 Pa of the second pressure.

H8: The pressure pulse generator of claim H6, wherein:
the difference between the first and second pressure is 30 kPa, the duration of the pressure pulse is up to 10 ms, and the latency between actuating the solenoid valves and achieving the pressure peak is less than 5 ms; or
the difference between the first and second pressure is 40 kPa, the duration of the pressure pulse is up to 100 ms, and the latency between actuating the solenoid valves and achieving the pressure peak is less than 5 ms; or the difference between the first and second pressure is 50 kPa, the duration of the pressure pulse is over 1 s, and the latency between actuating the solenoid valves and achieving the pressure peak is less than 1 s.

H9: A pressure pulse generator module for use with a microfluidic chip comprising:
a first pump 62 connected to the processor 10 and constructed to deliver a first pressure to a first solenoid valve 70, which is constructed to allow fluid communication between the first pump 62 and either a vent or a second solenoid valve 75;
a second pump 65 connected to the processor 10 and constructed to deliver a second pressure to the second solenoid valve 75; an outlet connected to the second solenoid valve 75, where the second solenoid valve 75 is constructed to allow fluid communication between the outlet and either the second pump 65 or the first solenoid valve 70;
a first solenoid valve control circuit 61 connected to the processor 10 and to the first solenoid valve 70; and
a second solenoid valve control circuit 61 connected to the processor 10 and to the second solenoid valve 75;
wherein the first pressure is lower than the second pressure.

H10: The pressure pulse generator module of claim H9, further comprising:
a processor 10;
a first solenoid valve control circuit 61 connected to the processor 10 and to the first solenoid valve 70; and
a second solenoid valve control circuit 61 connected to the processor and to the second solenoid valve 75.

H11: A system for selective microfluidic particle processing comprising:
a microfluidic chip 27;
pressure pulse generator module 20 constructed to apply pressure to the microfluidic chip 27, the pressure pulse generator module 20 comprising: a first pump 62 connected to the processor 10 and constructed to deliver a first pressure to a first solenoid valve 70, which is constructed to allow fluid communication between the first pump 62 and either a vent or a second solenoid valve 75; a second pump 65 connected to the processor 10 and constructed to deliver a second pressure to the second solenoid valve 75; an outlet connected to the second solenoid valve 75, where the second solenoid valve 75 is constructed to allow fluid communication between the outlet and either the second pump 65 or the first solenoid valve 70; a first solenoid valve control circuit 61 connected to the processor 10 and to the first solenoid valve 70; and a second solenoid valve control circuit 61 connected to the processor 10 and to the second solenoid valve 75; wherein the first pressure is lower than the second pressure.

H12: The system of claim H11, further comprising:
a processor 10;
a first solenoid valve control circuit 61 connected to the processor 10 and to the first solenoid valve 70; and
a second solenoid valve control circuit 61 connected to the processor and to the second solenoid valve 75.

H13: A system for selective microfluidic particle processing, comprising:
a microfluidic chip 27 having a chip inlet, a detection zone 51, a selection zone 52, a first chip outlet and a second chip outlet;
a processor 10;

a pressure pulse generator module 20 comprising a plurality of subassemblies, each subassembly comprising:
- a first pump 62 connected to the processor 10 and constructed to deliver a first pressure to a first solenoid valve 70 which is constructed to allow fluid communication between the first pump 62 and either a vent or a second solenoid valve 75;
- a second pump 65 connected to the processor 10 and constructed to deliver a second pressure to the second solenoid valve 75;
- an outlet connected to the second solenoid valve 75, where the second solenoid valve 75 is constructed to allow fluid communication between the outlet and either the second pump 65 or the first solenoid valve 70;
- a first solenoid valve control circuit 61 connected to the processor 10 and to the first solenoid valve 70;
- a second solenoid valve control circuit 61 connected to the processor 10 and to the second solenoid valve 75;
- wherein the first pressure is lower than the second pressure;

wherein the outlet of one of the plurality of subassembly is connected to the chip inlet; and wherein the outlet of one of the plurality of subassembly is connected to the first chip outlet;

an optics module connected to the processor 10, the optics module comprising:
- a first image sensor 110 capturing images from the selection zone 52;
- a second image sensor 112 capturing images from the detection zone 51;
- a plurality of lasers 130 constructed to induce fluorescence excitation in the particles in the detection zone 52; and
- a fluorescence detector assembly 125 constructed to detect the fluorescence excitation in the particles in the detection zone 52;

wherein the processor is configured to perform the following steps:
- a) send signal to the pressure pulse generator module 20 to actuate the first and second solenoid valves of the subassembly connected to the chip inlet to create a pressure pulse that propels the particles through the microfluidic chip;
- b) actuate the plurality of lasers, and capture fluorescence data from the from the fluorescence detector assembly 125;
- c) identify the particles based on the fluorescence data;
- d) based on the identification in step (c), sort the particles by sending a signal to the pressure pulse generator module 20 to actuate the first and second solenoid valves of the subassembly connected to the first chip outlet to create a pressure pulse that prevents the flow of particles through the first chip outlet;
- e) capture image data from the first image sensor 110; and
- f) based on the captured image data from step (e), verify the effectiveness of the sorting operation of step (d).

H14: The system of claim H13, further comprising:
- a high-voltage pulse generator module 35 positioned near the selection zone and configured to produce a high voltage pulse to induce electrophoretic separation of the particles;
- wherein the processor is connected to the high-voltage pulse generator module 35, the processor is configured to perform the following additional step of:
- based on the identification in step (c), sort the particles by actuating the high-voltage pulse generator.

H15: The system of claim H13, wherein the processor is configured to perform the following additional steps of:
- based on the effectiveness determined in step (f), adjust the signals in steps (a) and/or (d):

H16: The system of claim H13, wherein the pressure pulse generator module 20 comprises four channels.

H17: The system of claim H13, wherein each subassembly of the pressure pulse generator module 20 comprises:
- a first pressure sensor 90 constructed to detect the pressure between the first solenoid valve 70 and the second solenoid valve 75;
- a second pressure sensor 95 constructed to detect the pressure between the second pump 65 and the second solenoid valve 75;
- a third pressure sensor 100 constructed to detect the pressure between second solenoid valve 75 and the outlet;
- wherein the first, second and third pressure sensors are connected to the processor 10.

H18: The system of claim H13, wherein each subassembly of the pressure pulse generator module 20 comprises:
- a first expansion volume 80 fluidly connected to the second pump 65 and to the second solenoid valve 75; and
- a second expansion volume 85 fluidly connected to the second solenoid valve 75 and to the first solenoid valve 70.

H19: The system of claim H13, wherein the outlet of the pressure pulse generator module 20 comprises a microfluidic trap 102.

H20: The system of claim H13, wherein either the first solenoid valve control circuit or the second solenoid valve control circuit comprises a MOSFET used in parallel with a Zener diode and in series with a capacitor, wherein the solenoid valve is connected in parallel with the capacitor, and wherein a signal from the processor 10 controls a gate on the MOSFET.

H21: The system of claim H13, wherein either the first solenoid valve control circuit or the second solenoid valve control circuit comprises a spike and hold circuit involving the use of a timer integrated circuit.

I1: A high-voltage pulse generator module 35 for use with a microfluidic chip 27 comprising particles flowing through a selection zone 52, the module comprising:
- a direct digital synthesis (DDS) module 405 constructed to produce a modulated wave form 410;
- a power amplifier 420 connected to the DDS 405 constructed to receive and amplify the modulated wave form 410;
- a high-voltage transformer 425 constructed to produce a high-voltage pulse 430 based on the amplified modulated wave form, wherein the high-voltage pulse 430 is directed at the selection zone 52;

a processor 10/400 connected to the DDS module 405, the power amplifier 420 and the high-voltage transformer 425, the processor constructed to perform the following steps:
provide a control signal to the DDS module 405;
receive current data from the power amplifier 420;
receive voltage data from the high-voltage transformer 425;
adjust the control signal to the DDS module 405 based on the current and voltage data.

I2: The high-voltage pulse generator module of claim I1, further comprising an analog switch 415 constructed to interrupt the reception of the modulated wave form 410 by the power amplifier 420, wherein the analog switch is connected to and controlled by the processor 10/400.

I3: The high-voltage pulse generator module of claim I1, wherein the high-voltage pulse 430 is a sinusoidal voltage output between 100V and 10000V with a frequency between 20 kHz and 200 kHz.

I4: A system for selective microfluidic particle processing, comprising:
a microfluidic device comprising a particles flowing through a selection zone 52;
a direct digital synthesis (DDS) module 405 constructed to produce a modulated wave form 410;
a power amplifier 420 connected to the DDS 405 constructed to receive and amplify the modulated wave form 410;
a high-voltage transformer 425 constructed to produce a high-voltage pulse 430 based on the amplified modulated wave form, wherein the high-voltage pulse 430 is directed at the selection zone 52;
a processor 10/400 connected to the DDS module 405, the power amplifier 420 and the high-voltage transformer 425, the processor constructed to perform the following steps:
provide a control signal to the DDS module 405;
receive current data from the power amplifier 420;
receive voltage data from the high-voltage transformer 425;
adjust the control signal to the DDS module 405 based on the current and voltage data.

I5: A system for selective microfluidic particle processing, comprising:
a microfluidic chip 27 having a chip inlet, a detection zone 51, a selection zone 52 and a chip outlet;
a processor 10;
a pressure pulse generator module 20 connected to the processor 10, the pressure pulse generator module 20 constructed to produce a pressure pulse to the chip inlet and to the chip outlet;
an optics module connected to the processor 10, the optics module comprising:
a first image sensor 110 capturing images from the selection zone 52;
a second image sensor 112 capturing images from the detection zone 51;
a plurality of lasers 130 constructed to induce fluorescence excitation in the particles in the detection zone 52; and
a fluorescence detector assembly 125 constructed to detect the
fluorescence excitation in the particles in the detection zone 52;
a high-voltage pulse generator module 35 positioned near the selection zone 52, a high-voltage pulse generator module 35 comprising:

a direct digital synthesis (DDS) module 405 constructed to produce a modulated wave form 410;
a power amplifier 420 connected to the DDS 405 constructed to receive and amplify the modulated wave form 410;
a high-voltage transformer 425 constructed to produce a high voltage pulse 430 based on the amplified modulated wave form; and
a processor 10 connected to the DDS module 405, the power amplifier 420 and the high-voltage transformer 425;
wherein the processor 10 is configured to perform the following steps:
a) send signal to the pressure pulse generator module 20 to create a pressure pulse at the chip inlet to propels the particles through the microfluidic chip;
b) actuate the plurality of lasers, and capture fluorescence data from the from the fluorescence detector assembly 125;
c) identify the particles based on the fluorescence data;
d) based on the identification in step (c), sort the particles by sending a signal to the high-voltage pulse generator module;
e) capture image data from the first image sensor 110; and
f) based on the captured image data from step (e), verify the effectiveness of the sorting operation of step (d).

I6: The system of claim I5, wherein the processor is configured to perform the following additional step of sending a signal to the pressure pulse generator module 20 to produce a pressure pulse to the chip outlet.

I7: The system of claim I5, wherein the high-voltage pulse generator module 35 further comprises an analog switch 415 constructed to interrupt the reception of the modulated wave form 410 by the power amplifier 420, wherein the analog switch is connected to and controlled by the processor 10.

I8: The system of claim I5, wherein the high-voltage pulse 430 is a sinusoidal voltage output between 100V and 10000V with a frequency between 20 kHz and 200 kHz.

J1: A system for selective microfluidic particle processing, comprising:
a microfluidic chip 27 comprising particles flowing through a detection zone 51;
an optics module 30 with an image sensor constructed to capture and transmit images of particles in the detection zone 51;
a processor 10 connected to the optics module and configured to perform the following steps:
a) obtain a plurality of images from the image sensor 645,650;
b) identify a line within the plurality of images that is central to the flow of the particles 655;
c) from each image in the plurality of images, extract a portion of the images corresponding to the line identified in step (b) 660;
d) plot the portions from step (c) as a kymograph 665;
e) perform a radon transform on the kymograph 670; and
f) estimate the particle speed based on a dominant ling angle in the transformed kymograph 675.

J2: A system for selective microfluidic particle processing, comprising:

a microfluidic chip 27 comprising particles flowing through a detection zone 51;
an optics module 30 with an image sensor constructed to capture and transmit images of particles in the detection zone 51;
a processor 10 connected to the optics module and configured to perform the following steps:
  a) obtain an image from the image sensor 605;
  b) resize the image 610;
  c) apply a regression-based channel segmentation model to the resized image 615;
  d) based on the post-modeled image of step (c), identify within the resized image a channel in the microfluidic chip that contains particles 620;
  e) apply a semantic segmentation model to the identified channel 625; and
  f) based on the post-modeled image of step (e), identify within the resized image the boundary of the particles 630.

K1: A lid hinge 700 for use with an instrument chassis, the hinge comprising:
  a chassis mounting bracket 715 constructed to attach to the instrument chassis;
  a pivoting lid support 710 comprising an arc shape edge with a opened limit groove 730 and a closed limit groove 725, wherein the pivoting lid support 710 pivotally connects to the chassis mounting bracket 715;
  a pivoting roller latch 720 pivotally connected to the chassis mounting bracket 715, the latch comprising:
  a roller 721 constructed to roll along the arc shape edge 711 and at least partially enter the opened limit groove 730 and a closed limit groove 725;
  a spring constructed to apply a force 723 that pushes the roller 721 against the arc shape edge 711;
  wherein the lid hinge is constructed to transition from at least two configurations:
    an opened configuration wherein the roller 721 is at least partially disposed in the opened limit groove 730;
    a closed configuration wherein the roller 721 is at least partially disposed in the closed limit groove 725.

K2: The lid hinge of claim K1, wherein the arc-shaped edge 711 comprises a partially-opened groove 732 between the opened limit groove 730 and a closed limit groove 725, the lid hinge having a partially-opened configuration wherein the roller 721 is at least partially disposed in the partially-opened groove 732.

K3: The lid hinge of claim K1, wherein the pivoting lid support 710 pivotally connects to the chassis mounting bracket 715 at a pivot point 716, wherein the radius from the pivot point to the arc-shaped edge 711 is not constant 733.

K4: The lid hinge of claim K3, further comprising a lid 705 attached to the pivoting lid support 710, the lid having a lid weight.

K5: The lid hinge of claim K4, wherein the force 723 and the non-constant radius 733 of the arc-shaped edge 711 counter balance the lid weight when the hinge transitions from the closed configuration to the opened configuration.

Elements Illustrated in Drawings

Provided in the table below is a non-limiting listing of certain elements illustrated in the drawings.

| callout | element |
| --- | --- |
| 5 | System for Selective microfluidic particle processing |
| 10 | Computer/Processor |
| 15 | Real-time Signal Processing Subsystem |
| 20 | Pressure Pulse Generator Module |
| 22 | Pressure Pulse Subassembly |
| 25A, 25B, 25C | Inlet Fluid Sample Holders |
| 27 | Microfluidic Chip |
| 30 | Optics Module |
| 35 | High-Voltage Pulse Generator Module |
| 40A, 40B | Outlet Fluid Sample Holders |
| 45 | Illumination Module |
| 50 | Microfluidic Delay Line |
| 51 | Detection Zone |
| 52 | Selection Zone |
| 53 | Restrictive Sorting Channel |
| 54 | Non-restrictive Sorting Channel |
| 55 | Image Sensor Trigger Time |
| 56 | Image Transfer Time |
| 57 | Analysis Time |
| 58 | Signal Output Time |
| 59 | Sorting Trigger Time |
| 60 | Spike and Hold Circuit Schematic |
| 61 | Solenoid Valve Control Circuit |
| 62 | First Pump |
| 65 | Second Pump |
| 70 | First Solenoid Valve |
| 75 | Second Solenoid Valve |
| 80 | First Expansion Volume |
| 85 | Second Expansion Volume |
| 90 | First Pressure Sensor |
| 95 | Second Pressure Sensor |
| 100 | Third Pressure Sensor |
| 102 | Microfluidic Trap |
| 104 | Trap Necked Region |
| 106 | Particles (Hydrogel) |
| 106a | Particle Bead |
| 108 | Pressure Force |
| 109 | Outlet Pressure Force |
| 110 | First Image Sensor |
| 111 | Low NA Objective |
| 112 | Second Image Sensor |
| 113 | High NA Objective |
| 115 | Dual Objective Lens Assembly |
| 120 | Objective Lens Assembly Holder and Translator |
| 125 | Fluorescence Detector Assembly (4 Channel) |
| 126 | Fluorescence Detectors |
| 127 | Filters |
| 128 | Multiple Pass Filter |
| 130 | Lasers |
| 135 | First Image Sensor Optical Path |
| 140 | Second Image Sensor Optical Path |
| 145 | Optical Path for Fluorescence Detector |
| 150 | Optical Path for Lasers |
| 152 | Pair of LEDs |
| 154 | Condenser |
| 200 | Light Pulse Profile |
| 205 | Analog Measurements |
| 210 | Pulse Discriminator Threshold |
| 215 | Start Recording Event |
| 220 | End Recording Event |
| 225 | Sample Interval |
| 300 | Pulse Signal Processing Method |
| 305-380 | Steps for Pulse Signal Processing Method |
| 400 | Microcontroller |
| 405 | Direct Digital Synthesis Module |
| 410 | Modulated Wave Form |
| 415 | Analog Switch |
| 420 | Power Amplifier |
| 425 | High-Voltage Transformer |
| 430 | High-Voltage Pulse |
| 435 | Control/clock Line |
| 440 | Gate Trigger Line |
| 445 | Feedback Line |
| 600 | Cropping and Segmenting Individual Particles Method |
| 605-630 | Steps for Cropping and Segmenting Individual Particles Method |
| 640 | Particle Speed Measurement Method |
| 645-675 | Steps for Particle Speed Measurement Method |
| 700 | Hinge |

-continued

| callout | element |
|---|---|
| 705 | Lid |
| 710 | Pivoting Lid Support |
| 711 | Arc-Shaped Edge |
| 715 | Chassis Mounting Bracket |
| 716 | Pivot Point |
| 720 | Pivoting Roller Latch |
| 721 | Roller |
| 722 | Spring |
| 723 | Force |
| 725 | Closed Limit Groove |
| 730 | Opened Limit Groove |
| 732 | Partially-Opened Groove |
| 733 | Radius Arrows |
| 800 | fluidic device |
| 811 | substrate |
| 812 | first fluidic channel |
| 813 | delay region |
| 814 | first fluidic channel proximal region |
| 816 | first fluidic channel inlet |
| 817 | first fluidic channel outlet |
| 818 | first fluidic channel distal region |
| 820 | second fluidic channel |
| 821 | second fluidic channel proximal region |
| 822 | second fluidic channel distal region |
| 824 | second fluidic channel proximal terminus |
| 826 | interface at (junction between) first fluidic channel and second fluidic channel intersection |
| 828 | trap |
| 829 | constriction |
| 1430 | pressure generator module |
| 842 | fluid pressure direction |
| 850 | detection zone |
| 1440 | electric field generator |
| 860 | interior fluid of input vesicle |
| 861 | interior fluid of output vesicle |
| 862 | fluid flow direction in proximal region 814 of the first fluidic channel 812 |
| 863 | fluid flow direction in distal region 818 of the first fluidic channel 812 |
| 864 | first fluid in proximal region 814 of the first fluidic channel 812 |
| 865 | second fluid in second fluidic channel 820 |
| 867 | Second particle movement direction |
| 868 | fluid in distal region 818 of the first fluidic channel 812 |
| 869 | interior of second fluidic channel 820 |
| 900 | fluidic device |
| 901 | substrate |
| 902 | first fluidic channel |
| 904 | first fluidic channel proximal region |
| 906 | first fluidic channel inlet |
| 907 | first fluidic channel outlet |
| 908 | first fluidic channel distal region |
| 910 | junction between first fluidic channel 902 and third fluidic channel 930 |
| 913 | delay region |
| 920 | second fluidic channel |
| 921 | second fluidic channel proximal region |
| 922 | second fluidic channel distal region |
| 924 | second fluidic channel proximal terminus |
| 926 | interface between the first fluidic channel 902 and the second fluidic channel 920 |
| 928 | trap |
| 929 | constriction in second fluidic channel 920 |
| 930 | third fluidic channel |
| 932 | proximal region of third fluidic channel 930 |
| 934 | distal region of third fluidic channel 930 |
| 936, 936' | interface at first fluidic channel 920 and third fluidic channel 930 |
| 937 | fluid interface at interface 139 |
| 938, 938' | inlet of third fluidic channel 930 |
| 939 | junction between first fluidic channel 902 and third fluidic channel 930 |
| 942 | second fluid pressure direction |
| 950 | detection zone |
| 957 | fluid flow direction in distal region 934 of third fluidic channel 930 |
| 958 | second fluid in second fluidic channel 920 |

-continued

| callout | element |
|---|---|
| 959 | region in first fluidic channel 902 between second fluidic channel 920 and third fluidic channel 930 |
| 961 | interior fluid of output vesicle |
| 962 | fluid flow direction in proximal region 904 of the first fluidic channel 902 |
| 963 | fluid flow direction in distal region 908 of the first fluidic channel 902 |
| 964 | first fluid in proximal region 904 of first fluidic channel 902 |
| 965, 965' | third fluid in third fluidic channel 930 |
| 965" | third fluid in distal region 908 of the first fluidic channel 902 |
| 966 | fluid flow direction in proximal region 932 of third fluidic channel 930 |
| 967 | fluid flow direction from proximal terminus 924 of second fluidic channel 920 |
| 968 | fluid flow direction in second fluidic channel 920 |
| 969 | interior of second fluidic channel 920 |
| 1000 | plurality of input particles |
| 1002 | first particle comprising a first detectable feature |
| 1003 | plurality of the first particle 1002 |
| 1004 | particle not comprising the first detectable feature |
| 1005 | plurality of particle 1004 |
| 1030 | plurality of input vesicles |
| 1032 | vesicle comprising the first particle 1002 |
| 1033 | plurality of vesicle 1032 |
| 1034 | vesicles comprising an input particle 1004 not comprising the first detectable feature |
| 1035 | plurality of vesicle 1034 |
| 1036 | vesicle containing no input particle |
| 1037 | plurality of vesicle 1036 |
| 1040 | second particle |
| 1041 | plurality of the second particle 1040 |
| 1060 | plurality of output vesicles |
| 1062 | output vesicle comprising the first particle 1002 and the second particle 1040 |
| 1063 | plurality of the output vesicle 1062 |
| 1064 | output vesicle comprising a particle 1004 not comprising the first detectable feature |
| 1065 | plurality of the output vesicle 1064 |
| 1066 | output vesicle each comprising no particle |
| 1067 | plurality of the output vesicle 1066 |
| 1068 | output vesicle comprising first particle 1002 and not containing the second particle 1040 |
| 1069 | plurality of the output vesicle 1068 |
| 1070 | output vesicle containing no first particle 1002 and comprising the second particle 1040 |
| 1071 | plurality of the output vesicle 1070 |
| 1100 | fluidic device |
| 1101 | substrate |
| 1102 | first fluidic channel |
| 1120 | second fluidic channel |
| 1122 | second fluidic channel distal region |
| 1124 | second fluidic channel proximal terminus |
| 1125 | junction between proximal region 1128 and step 1127 |
| 1126 | interface at first fluidic channel and second fluidic channel intersection |
| 1127 | step |
| 1128 | proximal region of second fluidic channel 1120 |
| 1129 | constriction |
| 1142 | fluid pressure direction |
| 1162 | fluid flow direction in the first fluidic channel 1102 |
| 1190 | width or diameter of proximal region 1128 |
| 1192 | length of proximal region 1128 |
| 1194 | diameter of second particle 1040 |
| 1200 | fluidic device |
| 1201 | substrate |
| 1202 | first fluidic channel |
| 1220 | second fluidic channel |
| 1222 | second fluidic channel distal region |
| 1226 | interface at first fluidic channel and second fluidic channel intersection |
| 1227 | step |
| 1228 | proximal region of second fluidic channel 1220 |
| 1229 | constriction |
| 1242 | fluid pressure direction |
| 1262 | fluid flow direction in the first fluidic channel 1202 |

-continued

| callout | element |
| --- | --- |
| 1270, 1270' | relief line |
| 1272, 1272' | distal region of relief line 1270, 1270' |
| 1274, 1274' | proximal region of relief line 1270, 1270' |
| 1276, 1276' | proximal terminus of relief line 1270, 1270' |
| 1278, 1278' | distal terminus of relief line 1270, 1270' |
| 1300 | fluidic device |
| 1301 | substrate |
| 1302 | first fluidic channel |
| 1320 | second fluidic channel |
| 1322 | distal region of the second fluidic channel 1320 |
| 1324 | proximal terminus of the second fluidic channel 1320 |
| 1326 | fluid interface between first fluidic channel and second fluidic channel |
| 1329 | constriction of the second fluidic channel |
| 1340 | pressure generator |
| 1342 | fluid pressure direction |
| 1362 | fluid flow direction in proximal region 1304 of the first fluidic channel 1302 |
| 1367 | fluid flow direction from proximal terminus 1324 of second fluidic channel 1320 |
| 1368 | second fluid in distal region 1308 of the first fluidic channel 1302 |
| 1369 | interior of second fluidic channel 1320 |
| 1370 | proximal region of second fluidic channel 1320 |
| 1372 | junction between proximal region 1370 and distal region 1322 |
| 1374 | interior of distal region 1322 of second fluidic channel 1320 |
| 1376 | interior of proximal region 1370 of second fluidic channel 1320 |
| 1390 | width or diameter of proximal region 1370 of second fluidic channel 1320 at proximal terminus 1324 |
| 1394 | width or diameter of second fluidic channel 1320 at junction between proximal region 1370 and distal region 1322 |
| 1400 | instrument |
| 1402 | fluidic device mount |
| 1405 | optics module (e.g., optics module 30) |
| 1410 | imaging sensor |
| 1415 | photon detector |
| 1420 | illumination module |
| 1421 | optical path(s) |
| 1422 | communication path between optics module and computer/processor module 1425 |
| 1425 | computer/processor module (e.g., computer/processor 10) |
| 1430 | pressure generator module (e.g., pressure pulse generator module 20) |
| 1432 | Fluid line(s) from pressure generator module 1430 to fluidic device |
| 1435 | communication path between computer/processor module 1425 and pressure generator module 1430 |
| 1440 | electric field generator module (e.g., high-voltage pulse generator module 35) |
| 1445 | communication path between computer/processor module 1425 and electric field generator 1440 |
| 1465, 1465', 1465" | electrodes of electric field generator module 1440 |

The entirety of each patent, patent application, publication and document referenced herein is incorporated by reference. Citation of patents, patent applications, publications and documents is not an admission that any of the foregoing is pertinent prior art, nor does it constitute any admission as to the contents or date of these publications or documents. Their citation is not an indication of a search for relevant disclosures. All statements regarding the date(s) or contents of the documents is based on available information and is not an admission as to their accuracy or correctness.

The technology has been described with reference to specific implementations. The terms and expressions that have been utilized herein to describe the technology are descriptive and not necessarily limiting. Certain modifications made to the disclosed implementations can be considered within the scope of the technology. Certain aspects of the disclosed implementations suitably may be practiced in the presence or absence of certain elements not specifically disclosed herein.

Each of the terms "comprising," "consisting essentially of," and "consisting of" may be replaced with either of the other two terms. The term "a" or "an" can refer to one of or a plurality of the elements it modifies (e.g., "a reagent" can mean one or more reagents) unless it is contextually clear either one of the elements or more than one of the elements is described. The term "about" as used herein refers to a value within 10% of the underlying parameter (i.e., plus or minus 10%; e.g., a weight of "about 100 grams" can include a weight between 90 grams and 110 grams). Use of the term "about" at the beginning of a listing of values modifies each of the values (e.g., "about 1, 2 and 3" refers to "about 1, about 2 and about 3"). When a listing of values is described the listing includes all intermediate values and all fractional values thereof (e.g., the listing of values "80%, 85% or 90%" includes the intermediate value 86% and the fractional value 86.4%). When a listing of values is followed by the term "or more," the term "or more" applies to each of the values listed (e.g., the listing of "80%, 90%, 95%, or more" or "80%, 90%, 95% or more" or "80%, 90%, or 95% or more" refers to "80% or more, 90% or more, or 95% or more"). When a listing of values is described, the listing includes all ranges between any two of the values listed (e.g., the listing of "80%, 90% or 95%" includes ranges of "80% to 90%," "80% to 95%" and "90% to 95%").

Certain implementations of the technology are set forth in the claim that follows.

We claim:

1. An optics module for use with a microfluidic chip comprising particles flowing from a detection zone to a selection zone, the optics module comprising:
a first image sensor that defines a first image sensor optical path that intersects the selection zone, wherein the first image sensor optical path comprises an objective with a numeric aperture of less than 0.3; and wherein the first image sensor captures images of the particles in the selection zone;
a plurality of lasers that define a laser optical path and intersects the detection zone, wherein the plurality of lasers induces fluorescence excitation in the particles;
a fluorescence detector assembly that defines a fluorescence detector optical path that intersects the detection zone, wherein a portion of the fluorescence detector optical path is along the laser optical path; and wherein the fluorescence detector assembly detects fluorescence excitation in the particles;
a second image sensor that defines a second image sensor optical path that intersects the detection zone, wherein a portion of the second image sensor optical path is along the laser optical path; wherein the second image sensor optical path comprises an objective with a numeric aperture of greater than 0.3; wherein the second image sensor captures images of the particles in the detection zone; and wherein the first image sensor and the second image sensor capture and transmit at least 2000 image frames per second with a latency time of less than 100 microseconds.

2. The optics module of claim 1, wherein the fluorescence detector assembly comprises a plurality of fluorescence detectors and a plurality of filters that detect the fluorescence excitation in the particles at a plurality of wavelengths.

3. The optics module of claim 2, wherein the plurality of wavelengths is selected from a group consisting of: 405 nm, 452 nm, 525 nm, 600 nm, and 680 nm.

4. The optics module of claim 1, wherein the plurality of lasers emit laser light at a plurality of wavelengths.

5. The optics module of claim 4, wherein the plurality of wavelengths is selected from a group consisting of: 405 nm, 488 nm, 561 nm, and 638 nm.

6. The optics module of claim 1, further comprising: a first light source that illuminates the particles in the selection zone, the first light source located on the same optical axis as the first image sensor optical path; and a second light source that illuminates the particles in the detection zone, the second light source located on the same optical axis as the second image sensor optical path.

7. The optics module of claim 6, wherein the first light source and second light source emit infrared light.

8. The optics module of claim 1, wherein the fluorescence detector assembly comprises a plurality of fluorescence detectors, each of the plurality of fluorescence detectors comprising a silicon photomultiplier (SiPM).

9. The optics module of claim 1, further comprising a processor connected to the first image sensor, the second image sensor, the fluorescence detector assembly and the plurality of lasers.

10. The optics module of claim 1, wherein the fluorescence detector comprises a photon detector.

11. The optics module of claim 1, wherein the optics module is positioned adjacent to a first fluidic channel of a fluidic device.

12. The optics module of claim 2, wherein the plurality of wavelengths is selected from within a range spanned by 405 nm and 680 nm.

13. The optics module of claim 9, wherein the processor estimates a mean fluorescence for the plurality of detectors.

14. A system for selective microfluidic particle processing, the system comprising: a microfluidic chip having a chip inlet, a detection zone, a selection zone and a chip outlet; a processor; a pressure pulse generator module connected to the processor, the pressure pulse generator module constructed to produce a pressure pulse to the chip inlet and to the chip outlet; an optics module connected to the processor, the optics module comprising: a first image sensor that defines a first image sensor optical path that intersects the selection zone, wherein: the first image sensor optical path comprising an objective with a numeric aperture of less than 0.3; and the first image sensor is constructed to capture images of the particles in the selection zone; a plurality of lasers that define a laser optical path that intersects the detection zone, the plurality of lasers constructed to induce fluorescence excitation in the particles; a fluorescence detector assembly that defines a fluorescence detector optical path that intersects the detection zone, wherein: a portion of the fluorescence detector optical path is along the laser optical path; and the fluorescence detector assembly is constructed to detect the fluorescence excitation in the particles; a second image sensor that defines a second image sensor optical path that intersects the detection zone, wherein a portion of the second image sensor optical path is along the laser optical path; the second image sensor optical path comprises an objective with a numeric aperture of greater than 0.3; and the second image sensor is constructed to capture images of the particles in the detection zone, wherein the processor receives data from the optic module, processes the data and actuates the pressure pulse generator module based on processed data; and wherein the detection zone is separated from the selection zone by a delay line, wherein the magnitude of the delay line is sufficient to allow:
(1) the processor to process the data received from the optics module;
(2) the processor to actuate the pressure pulse generator module; and
(3) the pressure pulse generator module to create a pressure pulse at the chip outlet.

15. The system of claim 14, wherein the fluorescence detector assembly comprises a plurality of fluorescence detectors and a plurality of filters constructed to detect the fluorescence excitation in the particles at a plurality of wavelengths.

16. The system of claim 15, wherein the plurality of wavelengths is selected from a group consisting of: 405 nm, 452 nm, 525 nm, 600 nm, and 680 nm.

17. The system of claim 14, wherein the plurality of lasers emit laser light at a plurality of wavelengths.

18. The system of claim 14, further comprising: a first light source constructed to illuminate the particles in the selection zone, the first light source located on the same optical axis as the first image sensor optical path; and a second light source constructed to illuminate the particles in the detection zone, the second light source located on the same optical axis as the second image sensor optical path.

* * * * *